June 2, 1959 R. B. TROUSDALE 2,889,407

TELEPHONE SYSTEM

Filed Feb. 11, 1953 28 Sheets-Sheet 1

INVENTOR.
Robert B. Trousdale
BY T. L. Bowes
Att'y

June 2, 1959 R. B. TROUSDALE 2,889,407

TELEPHONE SYSTEM

Filed Feb. 11, 1953 28 Sheets-Sheet 2

INVENTOR.
Robert B. Trousdale
BY
T. L. Bowes
Att'y

INVENTOR.
Robert B. Trousdale
BY T. L. Bowes
Attorney

June 2, 1959 R. B. TROUSDALE 2,889,407

TELEPHONE SYSTEM

Filed Feb. 11, 1953 28 Sheets-Sheet 4

INVENTOR.
Robert B. Trousdale
BY T. L. Bowes
Att'y

INVENTOR.
Robert B. Trousdale
BY
T. L. Bowes
Att'y

June 2, 1959 R. B. TROUSDALE 2,889,407

TELEPHONE SYSTEM

Filed Feb. 11, 1953 28 Sheets-Sheet 6

INVENTOR.
Robert B. Trousdale
BY
J. L. Bowes
Att'y

INVENTOR.
Robert B. Trousdale
BY
T. L. Bowes
Att'y

Connector 12b

INVENTOR.
Robert B. Trousdale
BY
T. L. Bowes
Att'y

June 2, 1959 R. B. TROUSDALE 2,889,407

TELEPHONE SYSTEM

Filed Feb. 11, 1953 28 Sheets-Sheet 9

Connector-12b

INVENTOR.
Robert B. Trousdale
BY T. L. Bowes
Att'y

Connector-12b

INVENTOR.
Robert B. Trousdale
BY J. L. Bowes
Att'y

June 2, 1959 R. B. TROUSDALE 2,889,407

TELEPHONE SYSTEM

Filed Feb. 11, 1953 28 Sheets-Sheet 11

Connector -12b

INVENTOR.
Robert B. Trousdale
BY J. L. Bowes
Att'y

June 2, 1959 R. B. TROUSDALE 2,889,407

TELEPHONE SYSTEM

Filed Feb. 11, 1953 28 Sheets-Sheet 12

Connector-12b

INVENTOR.
Robert B. Trousdale
BY
J. L. Bowes
Att'y

INVENTOR.
Robert B. Trousdale
BY
T. L. Bowes
Att'y

June 2, 1959 R. B. TROUSDALE 2,889,407

TELEPHONE SYSTEM

Filed Feb. 11, 1953 28 Sheets-Sheet 14

INVENTOR.
Robert B. Trousdale
BY
J. L. Bowes
Att'y

INVENTOR.
Robert B. Trousdale
BY
T. L. Bowes
Att'y

June 2, 1959 R. B. TROUSDALE 2,889,407

TELEPHONE SYSTEM

Filed Feb. 11, 1953

28 Sheets-Sheet 16

INVENTOR.
Robert B. Trousdale
BY
T. L. Bowes
Att'y

INVENTOR.
Robert B. Trousdale
BY
J. L. Bowes
Att'y

June 2, 1959 R. B. TROUSDALE 2,889,407

TELEPHONE SYSTEM

Filed Feb. 11, 1953 28 Sheets-Sheet 18

INVENTOR.
Robert B. Trousdale
BY
J. L. Bowes
Att'y

INVENTOR.
Robert B. Trousdale
BY
T. L. Bowes
Att'y

Robert B. Trousdale
INVENTOR
BY
J. L. Bowes
Att'y

INVENTOR.
Robert B. Trousdale
BY
J. L. Bowes
Att'y

Timing Pulse Generator -57

INVENTOR.
Robert B. Trousdale
BY
J. L. Bowes
Att'y

June 2, 1959 R. B. TROUSDALE 2,889,407

TELEPHONE SYSTEM

Filed Feb. 11, 1953 28 Sheets-Sheet 23

INVENTOR.
Robert B. Trousdale
BY
J. L. Bowes
Attorney

INVENTOR.
Robert B. Trousdale
BY
J. L. Bowes
Attorney

June 2, 1959 R. B. TROUSDALE 2,889,407

TELEPHONE SYSTEM

Filed Feb. 11, 1953 28 Sheets-Sheet 25

INVENTOR.
Robert B. Trousdale
BY
J. L. Bowes
Attorney

June 2, 1959 R. B. TROUSDALE 2,889,407

TELEPHONE SYSTEM

Filed Feb. 11, 1953 28 Sheets-Sheet 26

INVENTOR.
Robert B. Trousdale
BY
T. L. Bowes
Attorney

INVENTOR.
Robert B. Trousdale
BY
T. L. Bowes
Attorney

INVENTOR.
Robert B. Trousdale
BY
J. L. Bowes
Attorney

United States Patent Office
2,889,407
Patented June 2, 1959

2,889,407

TELEPHONE SYSTEM

Robert B. Trousdale, Webster, N.Y., assignor, by mesne assignments, to General Dynamics Corporation, a corporation of Delaware Application February 11, 1953, Serial No. 336,316
46 Claims. (Cl. 179—15)

The present invention relates to improved methods and apparatus for selectively setting up signal transmission connections between the lines of a signalling system, and, more particularly, to improved methods and apparatus for setting up two-way communication connections between the lines of an automatic telephone system wherein facilities are provided for setting up a revertive call connection between different substations associated with the same line. Specifically, the present invention is directed to improvements in a fully automatic electronic telephone system of the type disclosed and claimed in a copending application of Robert B. Trousdale and Frank A. Morris, Serial No. 134,974, filed December 24, 1949, and my copending applications, Serial No. 257,712, filed November 23, 1951, and Serial No. 301,215, filed July 28, 1952, which are assigned to the same assignee as the present invention, whereby party line service on a revertive call basis is provided.

Many types of automatic switching apparatus have been proposed and developed for transmitting signals between the lines of telephone, telegraph and other communication systems. In the main, the apparatus proposed and developed for this purpose utilizes electromechanical devices embodying moving mechanical parts, such, for example, as relays, stepping switches and the like, to perform the line selecting, line interconnecting and ancillary functions required in selectively interconnecting any two lines of a large group of lines. While apparatus of this type and embodying switching devices of various forms has been developed to provide thoroughly reliable service, it is inherently subject to several limitations, including that of insufficient operating speed. To overcome these limitations, various proposals have been made for utilizing electronic facilities, such, for example, as cathode ray tubes, for the purpose of transmitting signals between the lines of a signalling system on a selective basis. However, most, if not all, of these proposals are limited to arrangements for providing one-way signal transmission between two lines.

In the improved systems disclosed in the above-identified copending applications, a system of multiplexing, namely, pulse sampling effectively at an ultrasonic rate of the control and intelligence signals produced at each substation of the system, is utilized to provide signal channel separation. Specifically, each line of the system is assigned a particular pulse time position in each of repetitive pulse frames each comprising one hundred pulse time positions. Intelligence and control signals developed on any one line of the system are sampled only in the particular pulse time position assigned to the particular line and the samples are carried through the signal transmitting components of the system as far as the connector stage on multiplexer signal pulses occurring in this particular time position. In the connector stage, the control and intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation. In the copending applications, Serial No. 257,712 and Serial No. 301,215, identified above, there are also disclosed party line ringing systems whereby party line service is provided and in the copending application, Serial No. 301,215, there is also disclosed a system for providing special services such as trunk hunting and conversation timing. While these systems are entirely satisfactory in operation, no provisions are made therein for setting up a revertive call connection between different party line substations associated with the same line.

Accordingly, it is an object of the present invention to provide new and improved methods and apparatus for selectively setting up two-way communication connections between the lines of a signalling system wherein revertive party line calls between different substations associated with the same line may be established.

It is another object of the present invention to provide an automatic telephone system capable of providing the services of an electromechanical switch-type system, including party line service on a revertive call basis, but which consists exclusively of electron conducting devices such, for example, as electron tubes, gas tubes, crystal rectifiers, semi-conductors, and the like, together with interconnecting circuit components therefor.

It is a further object of the present invention to provide a new and improved electronic telephone system wherein uniform directory numbering is employed and revertive party line calls between different substations associated with the same line may be established.

It is a still further object of the present invention to provide a new and improved electronic telephone system wherein revertive calls between different substations associated with the same line may be established and wherein a special revertive call busy tone is transmitted to the calling party after he has completed dialing to inform him that he should hang up to permit completion of the revertive call.

Another object of the present invention resides in the provision of a new and improved electronic telephone system wherein revertive calls between different substations associated with the same line may be established and wherein the first party to answer the revertive call hears a special revertive call tone which lasts for a relatively short interval and indicates to the answering party the nature of the call.

A further object of the present invention resides in the provision of a new and improved electronic telephone system wherein revertive calls between different substations associated with the same line may be established and wherein the linkage employed to establish a revertive call is released after a predetermined time interval when the revertive call is unanswered to prevent tie-up of linkage in unanswered revertive calls.

A still further object of the present invention resides in the provision of a new and improved electronic telephone system wherein revertive calls between different substations associated with the same line may be established and wherein facilities are provided for timing the conversation period of the revertive call.

It is another object of the present invention to provide a new and improved electronic telephone system wherein revertive calls between different substations associated with the same line may be established and wherein a supervisory tone signal is transmitted to the revertive call parties at the end of a predetermined conversation period to discourage continuance of the revertive call.

It is a further object of the present invention to provide a new and improved electronic telephone system wherein revertive calls between different substations associated with the same line may be established and wherein the linkage employed to establish a revertive call may also be employed to set up a non-revertive call, on either a private or a party line basis.

It is a still further object of the present invention to provide a new and improved electronic telephone system wherein revertive calls between different substations associated with the same line may be established and wherein the linkage employed to establish a revertive call may also be employed to set up a non-revertive call, on either a private or a party line basis, and trunk hunting and conversation timing facilities are available in the linkage for any non-revertive call.

It is another object of the present invention to provide a new and improved electronic telephone system wherein the length of time the called line is rung on either revertive or non-revertive calls, is limited to prevent tie-up of linkage in unanswered calls.

The invention, both as to its organization and method of operation, together with further objects and advantages thereof, will best be understood by reference to the following specification taken in connection with the accompanying drawings, in which:

Figs. 1 to 4, inclusive, when arranged in the manner shown in Fig. 5, diagrammatically illustrate a telephone system embodying the features of the present invention;

Figs. 2A, 2B and 2C, when laid side by side in the order named, diagrammatically illustrate the circuits of one of the finder-connector links of the system of Figs. 1 to 4, inclusive:

Figs. 6 to 10, inclusive, and 13 to 19, inclusive, when arranged in the manner shown in Fig. 20, schematically illustrate the circuits of one of the finder-connector links in the system shown in Figs. 1 to 4, inclusive;

Figs. 11 and 12, when laid side by side, graphically illustrate certain potentials developed on different conductors in the system shown in Figs. 1 to 4, inclusive;

Fig. 21 schematically illustrates the circuit arrangement of a portion of the common equipment in the system shown in Figs. 1 to 4, inclusive;

Figs. 22 to 25, inclusive, when laid side by side in the order named, graphically illustrate the time relationships between certain wave forms produced in the system of Figs. 1 to 4, inclusive; and Figs. 26 and 27 graphically illustrate certain other wave forms developed in the system shown in Figs. 1 to 4, inclusive.

In general, the electronic telephone system herein disclosed is capable of serving one hundred lines, each of which lines may have associated therewith a number of party line substations up to a maximum of ten such party line substations for each line. More specifically, the system is capable of providing two-way communication between any two lines of a one hundred line group and on either a private or party line basis, and includes entirely novel facilities for performing the functions of:

(1) Performing a revertive call test operation to determine whether a revertive call has been initiated at the calling substation.

(2) Transmission of a revertive busy tone over the calling line, in the event the revertive call test operation indicates that a revertive call is in progress, to inform the calling subscriber that he should hang up to permit completion of the revertive call.

(3) Ringing of the called party line substation associated with the calling line in accordance with the party line ringing signal assigned thereto after the calling party has hung up and without releasing the revertive call establishing linkage.

(4) Transmission of a revertive call tone of relatively short duration over the calling line when the revertive call is answered to inform the called party, if he answers first, that he is involved in a revertive call and should wait for the calling party to complete the connection; or, to inform the calling party, if he answers first, that the called party has not yet answered and he should wait for the called party to complete the connection.

(5) Releasing the linkage involved in a revertive call after a predetermined time interval in the event the revertive call is unanswered.

(6) Timing the conversation period of the revertive call and transmitting a supervisory tone to the calling and called parties at the end of a conversation period to discourage continuance of the revertive call.

(7) Provision of conversion timing and trunk hunting facilities for non-revertive calls in the same linkage employed to set up a revertive call connection.

All of the above functions are accomplished on a fully automatic basis without the use of any relays, stepping switches, or other equivalent mechanical devices having moving parts. With the exception of the line circuits, all equipment provided in the system to perform the described functions is common to the lines of the system, whether private or party, thus minimizing duplication of system components.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

In order to provide for harmonic ringing of different ones of the substations associated with any one of the lines of the system in accordance with party line ringing signals of different frequencies which are assigned to these substations on a decimal basis, a party line ringing signal cycle having a duration of approximately 7½ seconds is established during which five different pairs of coded party line ringing signals of different frequencies are produced and may be selected in the connector on a third or party line digit basis to effect ringing of different pairs of substations associated with the called line in accordance with the particular party line code ring assigned to the particular called substation.

GENERAL DESCRIPTION OF THE SYSTEM

Referring now to the drawings and more particularly to Figs. 1, 2, 3 and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13 and 14, a distributor 15 of which only one is required in the system and the common equipment indicated generally at 17 in Fig. 4 of the drawings. Each of the finder-connector links is comprised of a finder and a connector, the illustrated links respectively comprising finders 12*a*, 13*a* and 14*a* and connectors 12*b*, 13*b* and 14*b*. It will be understood that the number of finder-connector links employed in the system may be chosen as required to handle the traffic. Although only three links 12, 13 and 14 have been illustrated, from seven to ten links will normally be required in actual practice to handle the traffic of a one hundred line exchange. Inclusion of the additional links in the system may easily be accomplished by connecting appropriate terminals of additional links to the indicated multiple points.

As shown, the line circuits 10 and 16 respectively terminate two two-conductor lines which are respectively identified by the designations 23 and 32. The lines 23 and 32 may be used for either private or party line service. In the illustrated embodiment, the line 23 is shown as a private line and accordingly extends only to the single substation A having the directory number designation No. 231, the last digit "1" being added to provide uniform directory numbering. On the other hand, the line 32 is shown as a party line and extends to a series of ten parallel connected substations A′, B′, C′–J′, inclusive, having respectively assigned thereto the directory number designations No. 321, No. 322, No. 323—No. 320, inclusive.

In the system of the present invention facilities are provided for setting up revertive calls between different party line substations associated with the same line. Furthermore, revertive call connections may be set up while employing a uniform directory numbering of all the substations of the system. Thus, the substation B′ associated with the line 32 may be called from the substation A′ associated with the line 32 by dialing successive digits of "3," "2" and "2" at the substation A′.

Also, in the system of the present invention facilities compatible with said revertive call facilities are provided for party line ringing on either a fully selective or semi-selective harmonic ringing basis. Thus, if a maximum of five substations are connected to one of the lines of the system, a fully selective harmonic party line ringing system is employed wherein each of the substations is provided with ringing facilities which respond to different ringing frequencies. Each of the five substations is assigned a different ringing period of 1½ seconds duration, which ringing periods recur in successive ringing cycles of 7½ seconds duration. Thus, any one of the five substations is rung for a period of 1½ seconds followed by a period of six seconds of silence and only the particular substation which responds to the ringing frequency transmitted during a particular ringing period is rung.

If more than five substations, up to a maximum of ten substations, are associated with one of the lines of the system, a semi-selective harmonic ringing service is provided wherein pairs of substations are provided with ringing facilities which respond to the same ringing frequency, and each ringing period is coded to provide either one long ring or two short rings during the particular ringing period assigned to each pair of substations. With this arrangement two substations are rung simultaneously with either a long ring of 1½ seconds or two short rings of ½ second duration separated by ½ second of silence, and the called line subscribers distinguish between their own calls and that of the other subscriber assigned the same ringing frequency by determining whether it is one long or two short rings.

In the system of the present invention, facilities compatible with said revertive call facilities are provided for private branch exchange operation wherein a plurality of lines are designated as private branch exchange trunks and a trunk hunting operation is performed in response to a call directed to one of the private branch exchange trunks to select an idle line within the called trunk group. To this end different groups of lines of the system may be designated as private branch exchange trunk groups and all but the last line in each trunk group is marked as a private branch exchange trunk by means of the common trunk marking pulse generator 56 shown in Fig. 4, as will be described in more detail hereinafter.

Each line circuit performs the functions of repeating intelligence or control signals from its associated substation or substations to a corresponding one of the gate circuits in the multiplexer 11, repeating intelligence signals derived from a particular gate circuit of the distributor 15 to its associated substation or substations, and of responding to party line ringing control signals derived from one of the connectors **12*b*, 13*b* or 14*b* by way of the distributor 15 to transmit ringing current at a particular selected frequency to the associated substation or substations on a call incoming thereto. To perform these functions, the line circuit 10 is connected by way of the conductors 53*a* and 53*b* to one of the gate circuits provided in the multiplexer 11, and is connected by way of the conductor 44 to the corresponding gate circuit provided in the distributor 15. The line circuit 10 is also connected to certain components of the common equipment 17 in the manner described below. Similarly, the line circuit 16 is connected by way of the conductor 54 to one of the gate circuits in the distributor 15 and by way of the conductors 45*a* and 45*b*, which form the illustrated cable 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and the distributor 15 and on a common basis to certain components of the common equipment 17**.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders **12*a*, 13*a* and 14*a* and also to the multiplexer input terminals of each of the connectors 12*b*, 13*b* and 14*b*. In reverse manner, the distributor 15 performs the function of repeating intelligence signals derived from the connectors 12*b*, 13*b* and 14*b* in pulse time positions corresponding to particular calling and called lines to the line circuits respectively terminating the lines. To this end, the input terminals of the distributor 15 are connected by way of the common conductor 51 to the output terminals of each of the connectors 12*b*, 13*b* and 14*b*. In performing the described functions, the multiplexer 11 and the distributor 15 are controlled by certain components of the common equipment 17** in the manner hereinafter explained.

The finders of the various links, such, for example, as the finder **12*a*, do not perform any intelligence transmission functions. On the contrary, they function strictly as control units. Specifically, the finder 12*a* is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line to handle the call initiated on the line. This is accomplished through operation of the finder 12*a* to impress operating anode potential upon a plurality of the tubes in the connector 12*b* over the +B switch conductor 12*c*. When operatively associated with a particular calling line, the finder 12*a* also performs the function of guarding the calling line against intrusion on an incoming call to the line. This is accomplished through operation of the finder 12a to feed busy pulses occuring in the particular pulse time position assigned to the calling line with which the finder is operatively associated over the common busy pulse out conductor 52a to the link coupling circuits 24 in the common equipment 17. From the link coupling circuits 24 the busy pulses are fed to the common busy pulse in conductor 52b which is multiplied to each of the finders and connectors of the system. The finder 12a further performs the function of supplying an allotting signal to the finder 13a of the next succeeding link 13 when the finder 12a** is taken into use so as to provide a self-allotting system for the finder-connector links of the system.

When a revertive call is initiated on the calling line, the finder 12a responds to a revertive call hold signal developed in the associated connector 12b by remaining operatively associated with the calling line while the calling party goes on hook to permit ringing of the called party over the same line. During this period the finder 12a continues to guard the calling line by developing busy pulses in the time position assigned thereto. The finder 12a also responds to the transmission of a first disconnect signal over the calling line, when the calling party goes on hook to permit completion of the revertive call, by sending a revertive ring start signal to the associated connector 12b indicating that the calling party has hung up and that the calling line should be rung in accordance with the party line ringing signal assigned to the called substation. The finder 12a also responds to termination of the revertive call hold signal developed in the connector 12b by conditioning itself to release the link 12 in response to the next disconnect signal transmitted over the calling line so that the link 12 will be released upon termination of the revertive call.

To perform the above functions in the manner fully explained below, the finder 12a comprises (see Fig. 2A), a pulse input circuit 200, a +B switching circuit 201, a pulse combining circuit 202, tens and units coincidence tube circuits 203 and 204, a finder pulse forming circuit 205 and a self-allotting circuit 206. The finder 12a and connector 12b are connected on an individual link basis by five conductors, namely the +B switch conductor 12c, the finder gate pulse conductor 12d, the revertive call ring start conductor 12e, the revertive call hold conductor 12f, and the conversation timing control pulse conductor 12g.

Each of the connectors 12b, 13b, and 14b performs a plurality of different functions, including those functions related to the setting up of revertive calls and the special service features of trunk hunting, conversation timing, and fully selective or semi-selective harmonic ringing. Thus the connector 12b, for example, is controlled by finder gate pulses delivered thereto over the conductor 12d to accept and respond to signal bearing multiplexer pulses occurring in the pulse time position corresponding to the calling line with which the link is associated. It also responds to the application of operating anode potential to the conductor 12c and to the finder gate pulses appearing on the conductor 12d to feed a dial tone signal to the distributor 15 on connector signal pulses occurring in the pulse time position assigned to the calling line with which it is operatively associated, thereby to return the usual dial tone signal to the calling subscriber.

As discussed previously above, the connector 12b includes facilities for trunk hunting to select an idle line within a called trunk group in response to a call directed to one of the lines in this trunk group. Thus, the connector 12b responds to dial pulses accurring during a first, or tens, digit and a second, or units, digit which originate at the calling line with which the link 12 is operatively associated to select the particular pulse time position assigned to the called line. After the third digit has been dialed, the connector then tests the pulse time position assigned to the called line to determine the idle or busy condition of that line and transmits busy tone carrying pulses to the distributor 15 in the pulse time position assigned to the calling line in the event the called line tests busy. If the called line tests busy and is a member of a private branch exchange trunk group, the connector 12b selects the pulse time position next adjacent the time position assigned to the called line, i.e., the time position assigned to the next line of the system and tests successive adjacent pulse time positions until either an idle line is found or the last line in the called trunk group is reached. In the event that all of the lines in the called trunk group test busy, the connector 12b transmits busy tone carrying pulses to the distributor 15 in the pulse time position assigned to the calling line.

Incident to the selection of an idle time position the connector 12b conditions itself to accept signal carrying pulses from the multiplexer 11 which occur in the pulse time position corresponding to the selected idle called line, to store the intelligence carried by these pulses and to transmit the intelligence to the distributor 15 on connector signal pulses occurring in the time position corresponding to the calling line with which the link 12 is operatively associated. In effect, therefore, the connector functions to shift signal carrying pulses from the pulse time position assigned to the calling line to the pulse time position assigned to the called line and also to shift return signal pulses carrying intelligence derived from the called line from the particular pulse time position assigned to the called line to the particular pulse time position corresponding to the calling line.

In addition, the connector 12b performs the auxiliary function of terminating dial tone transmission to the calling substation when the first line selecting impulse is dialed into the connector and feeding busy pulses occurring in the pulse time position assigned to the idle called line over the common busy pulse out conductor 52a to the link coupling circuits 24 and from the link coupling circuits 24 over the common busy pulse in conductor 52b to the other links of the system thereby to guard the called line against seizure through another link.

The connector 12b responds to dial pulses which occur during a third, or party line ringing digit originating at the calling line with which the link 12 is operatively associated by transmitting a party line ringing signal by way of the distributor 15 to the called line at the ringing frequency assigned to the called substation associated with the called line in the event the called line tests idle and concurrently therewith the connector 12b transmits pulses which are modulated with an interrupted ringback tone signal corresponding to the selected party line ringing signal, to the distributor 15 in the pulse time position assigned to the calling line thereby to signal the calling subscriber that the called substation associated with the called line is being rung. The connector 12b terminates the party line ringing signal and concurrently terminates ringback tone signal transmission to the calling substation in response to answering of the call at the called party line substation.

When a revertive call is initiated on the calling line, the time position selected in response to the first and second digits is the same as the time position assigned to the calling line and the connector 12b responds by setting up a revertive call condition which overrides the normal busy test facilities in the connector 12b and permits completion of the revertive call. The connector 12b responds to this revertive call condition by transmitting a revertive busy tone signal to the distributor 15 on connector signal pulses occurring in the time position assigned to the calling line to inform the calling subscriber that he should hang up to permit completion of the revertive call. At the same time the connector 12b transmits a revertive call hold signal over the conductor 12f to the finder 12a to condition the finder 12a to remain operatively associated with the calling line even though a calling condition does not exist on this line. The connector 12b then responds to a revertive ring start signal transmitted over the conductor 12e from the finder 12a by transmitting a party line ringing control signal, corresponding to the party line ringing signal assigned to the called substation, to the distributor 15 on connector signal pulses occurring in the time position assigned to the calling line. When a party answers the revertive ring and a seizure signal is transmitted over the calling line, the connector 12b responds thereto by transmitting a revertive call tone to the distributor 15 on the connector signal pulses to inform the answering party that he is involved in a revertive call and should wait until the other party also comes off hook.

If the revertive call is unanswered, the connector 12b responds after a ringing time-out interval by removing the revertive hold signal from the conductor 12f so that the finder 12a may release the link 12 if no party is off hook on the previously calling line.

When the called subscriber answers, on either a revertive or non-revertive call, the connector 12b initiates a conversation timing cycle and at the end of the conversation timing period the connector 12b is arranged to release the link 12 completely from the calling and called lines and a supervisory tone is returned to the calling and called subscriber. The connector 12b is also arranged to transmit warning tone carrying pulses to the distributor 15 in the pulse time positions assigned to the called and called lines a predetermined interval before the end of the conversation timing period to inform the calling and called line subscribers that the conversation period has almost expired.

To perform the above-mentioned functions in the manner fully explained below, the connector 12b, as diagrammatically illustrated in Figs. 2B and 2C and as shown in detail in Figs. 6 to 10, inclusive, and 13 to 17, inclusive, is provided with a calling line in gate circuit 207 which responds to finder gate pulses transmitted to the connector over the conductor 12d to repeat signal bearing pulses delivered thereto from the multiplexer 11 in the pulse time position assigned to the calling line, and a calling line reconstructor circuit 208 having the function of detecting or reconstructing and storing the intelligence carried by signal bearing pulses transmitted to the connector from the multiplexer 11 in the pulse time position assigned to the calling line. The connector 12b further comprises a called line out gate circuit 224 for gating to the distributor 15 connector signal pulses carrying the intelligence reconstructed by the circuit 208 in the time position assigned to a particular called line. In addition, the connector 12b includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12d to gate to the distributor 15 signal bearing connector pulses which occur in the pulse time position assigned to the calling line. More generally, on nonrevertive calls the three circuits 207, 208 and 224 function to repeat intelligence from the calling line to the called line, whereas the three corresponding circuits 223, 222 and 226 function to repeat to the calling line intelligence derived from the called line.

The connector 12b additionally comprises a plurality of components for responding to three digits of dial impulses repeated to the connector on multiplexer pulses occurring in the pulse time position assigned to the calling line, the third digit identifying the particular party line ringing signal assigned to the called party line substation. In general, the dial impulse responsive equipment of the connector 12b comprises a dial impulse integrator circuit 209 which receives dial impulses from the reconstructor circuit 208; the tens, units and party inverter circuits 260, 261 and 262 to which impulses are repeated by the dial impulse integrator circuit 209, the units and party inverter circuits 261 and 262 also acting as start gate circuits for the units and party digit channels, respectively; the tens, units and party digit registers 211, 215 and 265 which are respectively controlled in accordance with the numerical values of the tens, units and party digits repeated to the circuits 260, 261 and 262 from the integrator circuit 209; the tens, units and party register pulsers 210, 214 and 263 which are respectively interposed between the inverter circuit and the digit register of the tens, units and party digit channels, and the tens, units and party sequence timing circuits 212, 216 and 264 which in effect function as the digit counting components of the connector, i.e., initiate certain operations at the ends of the first, second and third digits dialed into the connector.

The connector 12b further comprises a connector pulse forming circuit 217 which is controlled in accordance with the settings imparted to the tens and units digit registers 211 and 215 at the end of the second digit to produce connector pulses which are employed to control the circuits 222, 223 and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy pulse in conductor 52b, a busy lock circuit 219 and a busy gate circuit 220.

The revertive call facilities of the connector comprise a revertive call test circuit 296, a revertive call tone gate circuit 297, a revertive call busy tone gate circuit 298 and a ringing time-out circuit 299. The circuit 296 is jointly controlled by finder gate pulses appearing on the conductor 12d, connector pulses produced by the circuit 217 and a control signal from the units sequence timing circuit 216 and functions to impress a revertive call hold signal on the conductor 12f which is transmitted to the finder 12a to maintain this finder operatively associated with the calling line while the revertive call is being set up. The circuit 296 also transmits a revertive call signal over the conductor 296a to the circuits 207, 226, 218, 297, 298 and 299 which is used in setting up the revertive call. The ringing time-out circuit 299 is jointly controlled by the circuit 296, the code start circuit 268, and ringing time-out pulses transmitted to the circuit 299 over the conductor 57b from the timing generator 57 in the common equipment 17 and functions to terminate ringing on either revertive or non-revertive calls, after a predetermined ringing interval so that the link 12 is released on unanswered calls.

The trunk hunting facilities of the connector comprise a trunk hunting control circuit 283 jointly controlled by the connector pulse forming circuit 217, the party sequence timing circuit 264, busy pulses transmitted to the connector over the common busy pulse in conductor 52b, and trunk marking pulses transmitted to the connector 12b over the common trunk marking pulse conductor 56a; a units register advancer 281 and a tens register advancer 280.

The conversation timing facilities of the connector 12b comprise a conversation timing warning tone circuit 284 jointly controlled by the party digit register 265, the ring trip circuit 221 and a warning tone signal transmitted to the connector over the common conductor 58a; a party register advancer 282 and a conversation timing control circuit 285, the circuit 285 operating to produce a control pulse at the end of a predetermined conversation period which is used to effect release of the link 12.

In addition, the connector 12b comprises supervisory tone gate circuits 225 having the function of gating dial and busy tones to the calling line and including a ringback tone gate circuit having the functions of gating a particular party line ringback tone signal selected by the party digit register 265 in accordance with the identity of the called substation to the calling line, and transmitting a ringing control signal to the called line out gate circuit 224; a code start circuit 268 which performs the function of delaying the transmission of the selected party line ringback tone signal through the ringback tone gate circuit until the start of each party line ringing period, and a ring trip circuit 211 which, on non-revertive calls, is assigned the function of terminating ringing current transmission to the called substation, concurrently initiating the conversation timing period when a call answering operation is performed at the called substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network. As controlled by the phase shifter and pulse former network 19, the units pulse ring circuit 20 functions sequentially to develop the positive unit pulses which define the pulse time positions of the pulse frames, appear on the conductorss within the cable 31, and are fed by way of these conductors to the various intelligence transmitting and control components of the system. More specifically, the cable 31 comprises ten units pulse conductors 31a, 31b–31j over which positive unit pulses are sequentially transmitted in the order named to the units coincidence tube circuits 204 of the finders 12a, 13a and 14a, the units digit registers 215 of the connectors 12b, 13b and 14b, and the units gate circuits of the trunk marking pulse generator 56, as described in more detail hereinafter. The positive units pulses developed upon the two conductors 31a and 31f are also employed to control a supervisory carrier supply circuit 26.

The positive units pulses are sequentially developed on the units conductors 31 at a frequency rate of 100 kilocycles and each tenth positive units pulse, i.e., each pulse appearing on the units pulse conductor 31j, is used to step, or trigger, a tens pulse ring circuit 21 having the function of developing the positive tens pulses, each of which spans the time interval of ten units pulses. The positive tens pulses as sequentially produced by the ring circuit 21 on the tens pulse conductors 32a, 32b–32j, forming the illustrated cable 32, are impressed upon the gate circuits of the multiplexer 11, the tens pulse gate circuits of the distributor 15, the tens coincidence tube circuits 203 of the finders 12a, 13a and 14a, and the tens pulse gate circuits of the trunk marking pulse generator 56, in the manner more fully explained below. In this connection it will be noted that all of the components of the system are arranged to operate with tens and units pulses of only one polarity, i.e., positive tens and units pulses, thereby materially simplifying the system and reducing the number of conductors between the various units of the system.

As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34a, 34b–34j forming the cable 34, which are fed to the gate circuits of the multiplexer 11. These channel pulses occur at the same frequency as the units pulses, but are much narrower in width. For example, the channel pulses appearing on the conductor 34a are much narrower than the units pulses appearing on the positive units pulse lead 31a and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12b, 13b and 14b.

In order to provide facilities for effecting party line ringing of the called substation on either a fully selective or a semi-selective harmonic ringing basis, the common equipment 17 further includes a harmonic ringing oscillator 97, which operates independently of the other components of the system, and is designed to operate at an audio frequency (preferably 1200 cycles) which is suitable for subdivision into a group of harmonically related ringing frequencies. The oscillator 97 is connected over the conductor 102 to a harmonic ringing frequency generator 98 which operates under the control of the 1200 cycle signal from the oscillator 97 to develop five continuous wave ringing signals of different frequencies which are suitable for exciting the ringing facilities of five different substations connected to one of the lines of the system. In the illustrated embodiment the ringing frequencies developed by the generator 98 correspond to the frequencies of the conventional harmonic ringing series so that conventional frequency sensitive ringers may be employed in the substations of the system. Thus, continuous wave signals having the frequencies 16⅔ c.p.s., 25 c.p.s., 33⅓ c.p.s., 50 c.p.s., and 66⅔ c.p.s. are respectively impressed upon the conductors 103–107, inclusive. However, it will be understood that either of the two other series of ringing frequencies, in the synchromonic and the decimonic series may be developed in substantially the same manner as will be described in more detail hereinafter.

The common equipment 17 further comprises the harmonic ringing code forming circuit 99 which operates independently of the other components of the system to develop two different party line code ringing signals during each of five successive ringing periods which recur during repetitive ringing cycles established by the circuit 99. In the illustrated embodiment each ringing period lasts for approximately 1½ seconds and is separated from the adjacent ringing periods by a short guard interval, the over-all ringing cycle being approximately 7½ seconds long. During each of the five ringing periods the code forming circuit 99 produces both a long ringing pulse, which lasts for 1½ seconds, and two short ringing pulses each of ½ second duration separated by a ½ second silent period. The series of ten coded ringing pulses formed by the circuit 99 are used to control a harmonic ringing modulator circuit 100 wherein the 1½ second ringing pulses are used as gating pulses sequentially to gate to a common output conductor 108 the different ringing frequencies impressed on the conductors 103–107, inclusive, by the generator 98, and the multiplexed ringing frequencies thus impressed on the conductor 108 are transmitted to a harmonic ringing amplifier and supply circuit 101.

The common equipment 17 also includes a ringback tone generator 29c which performs the function of developing a continuous audible ringback tone signal (preferably 200 c.p.s.) which is supplied over the conductor **27*b* to the harmonic ringing modulator circuit 100. Each one of the ten codes formed by the circuit 99 is used to develop corresponding pulses of ringback tone on the ten ringback tone conductors 48*a*–48*j*, inclusive, which form the illustrated ringback tone cable 48. These ringback tens pulses are transmitted over the cable 48 to the party digit registers 265 of the connectors 12*b*, 13*b*, and 14*b*. The harmonic ringing amplifier and supply circuit 101 filters and amplifies the multiplexed ringing frequencies transmitted thereto over the conductor 108, and includes a combined bias voltage and multiplex ringing current source which is connected to each of the line circuits 10, 16, etc., over the common multiple conductors 61*a* and 61*b* forming the illustrated cable 61**.

In order to mark certain consecutively numbered groups of the lines of the system as private branch exchange trunks, the common equipment 17 includes the trunk marking pulse generator 56 which is jointly controlled by the positive units pulses transmitted thereto over the cable 31 and the positive tens pulses transmitted thereto over the cable 32 and develops on the common output conductor **56*a* thereof trunk marking pulses which appear in the time positions assigned to each of the lines in each trunk group with the exception of the last line in each group which is unmarked. The trunk marking pulses produced on the conductor 56*a* are impressed upon the trunk hunting control circuits 283 in each of the connectors 12*b*, 13*b* and 14*b*** of the system.

To provide a trunk hunting arrangement wherein the tens and units digit registers are successively driven to different settings to hunt for an idle line, there is provided in the common equipment 17 a trunk hunting drive pulse generator 55 which operates independently of the other components of the system to develop positive trunk hunting drive pulses of relatively short duration which recur at a relatively low rate (preferably in the order of 100 pulses per second) which are impressed on the common conductor **55*a* and are connected by way of this conductor to the units register advancers 281 in each of the connectors 12*b*, 13*b*, and 14*b***.

In order to provide facilities for timing the ringing interval and the conversation period and for warning the calling and called line subscribers when the call is about to be terminated, the common equipment 17 includes a timing pulse generator 57 and a conversation timing warning tone generator 58. The timing pulse generator 57 operates independently of the other components of the system to develop relatively narrow positive conversation timing pulses which preferably have a repetition rate of about one every 40 seconds and are connected by way of the common conductor **57*a* to the party register advancers 282 in each of the connectors 12*b*, 13*b*, and 14*b*. The timing generator 57 also develops ringing time-out pulses, preferably at a rate of one every two minutes which are connected by way of the common conductor 57*b* to the ringing time-out circuit 299 in each of the connectors of the system. The conversation timing warning tone generator 58 also operates independently of the other components of the system to develop a continuous wave warning tone signal (preferably 400 c.p.s.) which is connected by way of the common conductor 58*a* to the conversation timing warning tone circuits 284 in each of the connectors 12*b*, 13*b*, and 14*b***.

The common equipment also includes a busy tone generator **29*a* and a dial tone generator 29*b* which are respectively connected by way of the common conductors 46 and 47 to the supervisory tone gate circuits 225 in each of the connectors 12*b*, 13*b* and 14*b*. Also, the common equipment includes a revertive call busy tone generator 29*e* connected by way of the conductor 49*a* to the revertive call busy tone gate circuits 298 in each of the connectors, and a revertive call tone generator 29*g*, connected by way of the conductor 49*b* to the revertive call tone gate circuits 297 in each of the connectors of the system. The common equipment 17 further comprises the link coupling circuits 24 which include a busy pulse drive channel for repeating busy pulses applied thereto over the common busy pulse out conductor 52*a* to the busy pulse in conductor 52*b* which is multipled to the finders and connectors of all the links of the system, and a supervisory carrier drive channel for repeating the 100 kc. supervisory carrier supplied thereto over the conductor 37 from the supervisory carrier supply circuit 26 to the self-allotting circuit 206 of the finder 12*a* over the conductor 36*a* to permit the finder 12*a*** to handle the first incoming call.

In order to render the mode of operation of the system more readily understandable, a pulse chart has been illustrated in Figs. 22 to 25, inclusive, to show the relative widths of the pulses developed by the common equipment components 19, 20, 21 and 22 during two successive pulse frames, as well as the time or phase relationship between the pulses. As there shown, the units pulse ring drive pulses **95*a*, appearing on the conductor 40 are produced by the phase shifter and pulse former circuit 19 along the zero potential reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i.e., persist for very short time intervals, and that the pulses 96*a* are so displaced in time relative to the pulses 95*a* that each commutator drive pulse 96*a* occurs approximately at the middle of the period separating the preceding and succeeding units pulse ring drive pulses 95*a*. The positive units pulses appearing respectively on the units pulse conductors 31*a*, 31*b*–31*j* are produced along the zero potential reference lines 62, 63–71. It will be noted that the units pulses are produced by the units pulse ring circuit 20** at the fundamental frequency rate of one megacycle. However, due to diversion of the pulses successively to different ones of the units pulse conductors *a*, *b–j*, the pulse along any particular zero potential reference line, such, for example, as the line 62, recur only at a frequency rate of one hundred kilocycles. It will also be noted that the units pulses are successively produced on the units pulse conductors **31*a* to 31*j*, inclusive, in the order of alphabetical designation of these conductors. Thus, successive positive units pulses produced along any particular zero potential reference line, as, for example, those occurring during the units pulse periods 62*a*, 62*b*, 62*c*, etc., along the potential reference line 62**, are separated by a time interval equaling the sum of nine units pulse time positions and during which units pulses are produced successively along each of the nine other zero potential reference lines.

The positive tens pulses successively produced by the tens pulse ring circuit 21 on the tens pulse conductors **32*a*, 32*b*–32*j* are illustrated as appearing along the ten zero potential reference lines 72 to 81, inclusive. It will be noted that each tens pulse persists for a time interval exactly equaling the time required to produce ten units pulses. Thus, the tens pulse period 72*a* persists for the duration of the interval in which the ten units pulses 62*a*–71*a* are successively produced by the units pulse ring circuit 20. It will also be noted that the starting point of each tens pulse period 72*a*, 73*a*, 74*a*, etc., is exactly coincident with the starting points of the units pulses 62*a*, 62*b*, 62*c*, etc., appearing along the zero potential reference line 62 and impressed upon the units pulse conductor 31*a*, by the units pulse ring circuit 20. Further, each tens pulse period terminates at the exact instant of termination of the units pulses 71*a*, 71*b*, 71*c*, etc., appearing along the zero potential reference line 71** and produced by the units pulse ring circuit 20 on the conductor.

The channel pulses which are successively produced on the ten channel pulse conductors 34*a*, 34*b*–34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the units pulses, the channel pulses are produced at the fundamental frequency rate of one megacycle, but due to the action of the commutator 22 in diverting these pulses successively to the conductors 34*a*, 34*b*–34*j* recur only on each of these conductors at a rate of one hundred kilocycles. Thus the channel pulses 82*a*, 82*b*, 82*c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors 34*b*, 34*c*–34*j*. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, to open the gating circuits of the channel pulse commutator 22. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 22 to 25, inclusive, in mind, it will readily be understood that each pulse frame is divided into one hundred readily identifiable pulse time positions. Thus, the first ten pulse time positions of each pulse frame, which are respectively assigned to the lines of the system having the directory number designations 11, 12, 13—10, are defined by the first tens pulse period 72*a* of the frame within which the ten units pulse periods 62*a*, 63*a*, 64*a*–71*a* occur. Similarly, the second ten pulse time positions, which are respectively assigned to the lines of the system having the directory number designations 21, 22, 23—20, are defined by the second tens pulse period 73*a* during which the ten units pulse periods 62*b*, 63*b*, 64*b*–71*b* occur. Again, the third ten pulse time positions, which are respectively assigned to the lines of the system having the directory number designations 31, 32, 33—30, are marked out by the third tens pulse time period 74*a* during which the ten units pulse periods 62*c*, 63*c*, 64*c*–71*c* occur. Thus, it will be understood that the pulse time position of each pulse frame which is assigned to the illustrated line 23 occurs during the second tens pulse interval 73*a* of each pulse frame and is coincident with the units pulse period 64*b* of each pulse frame. It will also be apparent that the corresponding channel pulse 84*b* occurs well within the limits of this pulse time position. Similarly, the pulse time position assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular pulse time position assigned to the line 32 in each pulse frame.

In order further to render the mode of operation of the disclosed fully selective or semi-selective harmonic ringing system more readily understandable, a harmonic code sequence chart has been illustrated in Fig. 26 to show the time and phase relationship of the signals developed by the harmonic ringing code forming circuit 99 and the harmonic ringing modulator circuit 100 in the common equipment 17 during one harmonic ringing cycle. As there shown, the code forming circuit 99 develops a series of long ringing pulses 165, 166, 167, 168, and 169 on five different output code buses thereof which recur in succession during successive harmonic ringing cycles of approximately 7½ seconds duration. The long ringing pulses 165–169, inclusive, define a succession of five ringing periods which are separated by guard intervals 186 of relatively short duration. The code forming circuit 99 also operates to produce on five other code buses thereof a pair of short ringing pulses during each ringing period. Thus, the circuit 99 develops the short ringing pulses 170 and 171 during the first ringing period, the pulses 172 and 173 during the second ringing period, the pulses 174 and 175 during the third ringing period, etc. In addition, the code forming circuit 99 develops the positive code start pulses 180 (Fig. 26 (11)) which occur substantially at the end of each of the guard intervals 186. The code start pulses 180 are transmitted over the common conductor 5 to each of the connectors 12*b*, 13*b*, and 14*b* to delay the selection of a particular party line ringing signal until the end of a particular ringing period.

The long ringing pulses 165 are employed in the harmonic ringing modulator circuit 100 successively to gate different ringing frequencies to the common output conductor 108 and the composite or multiplexed ringing frequency signal is filtered in the harmonic ringing amplifier and supply circuit 101 so as to provide a ringing voltage wave form substantially as shown in Fig. 26 (12). Thus, during the first ringing period the ringing pulse 165 is used to gate a 66⅔ c.p.s. ringing voltage to the common conductor 108. After the guard interval 186, the ringing pulse 166 is employed to gate a 50 c.p.s. ringing voltage to the conductor 108 during the second ringing period. Likewise, the successive ringing pulses 167, 168, and 169 are employed successively to gate to the common output conductor 108 ringing voltages having frequencies of 33⅓ c.p.s., 25 c.p.s., and 16⅔ c.p.s.

In order to produce ringing control signals which may be used to control the application of ringing current to the called line during the particular ringing period and in accordance with the particular ringing code assigned to the called substation connected thereto, and also to produce concurrently therewith corresponding ringback tone signals which may be used to advise the calling line subscriber that the called line is being rung in a particular code sequence, the long and short ringing pulses (Figs. 26 (1)–(10), inclusive) developed by the harmonic ringing code forming circuit 99 are used individually to gate to the output conductors 48*a*–48*j*, inclusive, a ringback tone signal for the duration of the ringing pulse. Thus, the ringing pulse 165 developed in the code forming circuit 99 is used to develop a ringback tone signal 165*a* which persists for the duration of the first ringing period. Likewise, the short ringing pulses 170 and 171 are employed to produce the ringback tone signals 170*a* and 171*a* which have a duration of one-half second and are separated by a one-half second interval, the signals 170*a* and 171*a* also occurring during the first ringing period. In the same manner the pulses 166, 172, and 173 are employed to develop the corresponding ringback tone signals shown in Figs. 26 (15) and (16) during the second ringing period. In a similar manner the long and short ringing pulses which are produced during the third, fourth, and fifth ringing periods are employed to produce the ringback tone signals shown in Figs. 26 (17)–(22), inclusive.

With the above general description of the harmonic code sequence chart illustrated in Fig. 26 in mind, it will readily be understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately 7½ second intervals. In the event that a maximum of five substations are associated with any one line of the system, only the long ringing pulses 165–169, inclusive, need be employed and under these conditions the first substation would be provided with ringing facilities which are responsive to a 66⅔ c.p.s. ringing current, the second substation would be provided with ringing facilities which are responsive to 50 c.p.s. ringing current, the third substation would be provided with ringing facilities responsive to 33⅓ c.p.s. ringing current, the fourth substation would be provided with ringing facilities responsive to 25 c.p.s. ringing current, and the fifth substation would be provided with ringing facilities responsive to 16⅔ c.p.s ringing current. The five substations would be assigned different third digit directory number designations and one of the ringback tones **165*a*–169*a*, inclusive, would be selected in the connector in response to the dialing of a third digit at the calling substation. If, for example, a substation having ringing facilities responsive to 66⅔ c.p.s. ringing current is selected in the connector, the ringback tone signal 165*a* is selected and is used to control the application of ringing current so that only the 66⅔ c.p.s. signal 181** (Fig. 26 (12)) is applied to the called line, and only the substation having ringing facilities which respond to this ringing frequency will be rung.

In the event that more than five substations up to a maximum of ten are associated with one of the lines of the system, the group of substations is divided into pairs, and each pair of substations is provided with ringing facilities responsive to the same ringing frequency. Thus, the substations A′ and B′ associated with the line 32 and assigned the directory number designations 321 and 322 would both be provided with ringing facilities responsive to the same ringing current, for example a 66⅔ c.p.s. ringing current. If the calling subscriber wishes to call substation A′ he dials 321 and the connector responds to the third digit of "1" by selecting the ringback tone signal **165*a* so that a 66⅔ c.p.s. ringing current is transmitted over the called line 32 during the entire first ringing period. Only the ringers at the substations A′ and B′ will then be rung for a period of approximately 1½ seconds and the subscriber at the substation A′ will know that the call is intended for him. On the other hand, if the calling subscriber wishes to call the substation B′ associated with the line 32, he dials the number 322 and the connector responds to the third digit of "2" by selecting the ring-back tone signal consisting of the short pulses 170*a* and 171*a* which control the application of 66⅔ c.p.s ringing current to the line 32** so that the ringing facilities at both the substations A′ and B′ are rung in two short rings. The subscriber at the substation B′ is then notified that his substation is being rung.

In a similar manner the substations C′ and D′ are provided with ringing facilities responsive to 50 c.p.s ringing current, the substations E′ and F′ are provided with ringing facilities responsive to 33⅓ c.p.s. ringing current, etc. However, it will be understood that certain ones of the lines of the system may be adapted for private service, in which case the private line will, of course, have only one substation associated therewith. Thus, in the illustrated embodiment the line 23 is adapted for private service and has associated therewith only the one substation A to which is assigned the directory number designation 231. When the line 23 is called by dialing the number 231, the connector responds to the third digit of "1" by transmitting a 66⅔ c.p.s. ringing current over the line 23 and the substation A is provided with ringing facilities responsive to this ringing current so that the substation A is rung during the first ringing period of each harmonic ringing cycle.

In order to render the mode of operation of the trunk hunting facilities more readily understandable, a trunk marking pulse chart has been illustrated in Fig. 27 to show the time and phase relationship of the trunk marking pulses developed by the trunk marking pulse generator 56 in the common equipment 17. Referring to this figure, the one hundred time positions which comprise one pulse frame are illustrated as a series of ten horizontal strings of blocks corresponding to the ten tens digit levels of the lines of the system. In each of the blocks there is shown the directory number designation of the line which is assigned the corresponding units time position. Thus, the first units time position **62*a* in each time position frame is assigned to the line having the directory number designation "11," the second units time position 63*a* in each time position frame is assigned to the line having the directory number designation "12," the third units time position 64*a* in each time position frame is assigned to the line having the directory number designation "13," and the tenth units time position 71*a* is assigned to the line having the directory number designation "10." In the second tens digit level the eleventh units time position 62*b* in each time position frame is assigned to the line having the directory number designation "21," and the twentieth units time position 71*b* in each time position frame is assigned to the line having the directory number designation "20." Likewise, in the tenth tens digit level the ninety-first units time position 62*j* in each time position frame is assigned to the line having the directory number designation "01" and the one-hundredth units time position 71*j*** is assigned to the line having the directory number designation "00."

In order to mark certain lines of the system as private branch exchange trunks, the trunk marking pulse generator 56 selects certain ones of the units pulses supplied thereto over the multiple conductor cable 31 and gates the selected units pulses by means of appropriate tens pulses supplied thereto over the multiple conductor cable 32 to provide trunk marking pulses which occur once in each time position frame in particular units pulse time positions. As will be described in more detail hereinafter, the last line in each trunk group is unmarked.

In the trunk marking pulse chart of Fig. 27 there are shown nine different private branch exchange trunk groups. One of these trunk groups is comprised of the lines having the directory number designations 32–42, inclusive, and the trunk marking pulse generator 56 operates to develop trunk marking pulses during each of the time positions assigned to these lines except the last line 42. It will be evident from Fig. 27 that this trunk group includes lines which are positioned in different tens digit levels. Thus, the lines 32–39, inclusive, and 30 are located in the third digit level, whereas the lines 41 and 42 are located in the fourth tens digit level. Since the line 42 is the last line in this trunk group, no trunk marking pulse is produced in the time position **63*d* assigned thereto. A second trunk group is shown as comprising a group of thirty-two lines starting with the line 45 and ending with the line 76. Accordingly, trunk marking pulses are produced in all of the consecutive time positions assigned to these lines except the last line 76. It will be noted that this trunk marking group of thirty-five lines includes lines having four different tens digit directory number designations. A third trunk group is illustrated as comprising the lines 91, 92, and 93, the lines 91 and 92 being marked by trunk marking pulses. In a similar manner the lines 94, 95, and 96 comprise a fourth trunk group, and the lines 97, 98, and 99 comprise a fifth trunk group. The lines 90, 01, and 02 comprise a sixth trunk group, only the lines 90 and 01** being marked by corresponding trunk marking pulses produced in their respective time positions. A two-line trunk group is shown as comprising the lines 03 and 04 constituting the seventh trunk group. The eighth trunk group includes a plurality of lines in the tenth tens digit level and also a plurality of lines in the first tens digit level. Thus, the eighth trunk group comprises the lines 05–09, inclusive, 00, and 11–15, inclusive. It will be noted that the eighth trunk group includes lines in the last tens digit level as well as the first tens digit level so that the trunk hunting facilities of the system are capable of hunting not only through different tens digit levels but from the last time position to the first time position, i.e., from the time position 71j to the time position 62a. A ninth trunk group is illustrated as comprising the three lines 26, 27 and 28, the lines 26 and 27 being marked by corresponding trunk marking pulses.

*Operation of the system as a whole*

Briefly to consider the general mode of operation of the system, in order to illustrate the operation of the revertive call system of the present invention a revertive call will first be traced in which it is assumed that the party line substation B′ is called from the party line substation A′, both of which substations are associated with the line 32, during a period when the finder-connector link 12 is idle. Also, in order to illustrate the compatible operation of the system for non-revertive calls wherein the special service features of trunk hunting and conversation timing are provided, a non-revertive call will be traced in which it is assumed that the party line substation B′ is called from the private substation A during a period when the finder-connector link 12 is idle. However, the non-revertive call will be described only in sufficient detail to illustrate the different functions of the system components for revertive and non-revertive calls, reference being had to my copending application, Serial No. 301,215, identified above, for a complete and detailed description of a similar non-revertive call.

*Revertive call operation*

Considering first the general operations which must be performed by the calling party in order to complete a revertive call in the present system, it will be understood that each substation of the system has assigned thereto a different directory number so that any calling subscriber may reach any other subscriber by dialing the directory number thereof. After the calling party has received dial tone and has dialed the directory number of the called substation, a revertive busy tone signal is transmitted over the calling line. This informs the calling party that a revertive call is being made to another substation on the same calling line and reminds him to hang up to permit completion of the revertive call. This revertive busy tone may be identical to the conventional busy tone, but is preferably a tone distinctive from the conventional busy tone so that the calling party will know that the revertive call is being carried out successfully and he should wait for the call to be completed.

When the calling party hangs up, the calling line is rung in accordance with the party line ringing signal corresponding to the third digit dialed by the calling party. If code ringing is employed all of the substation ringers associated with the calling line are rung in accordance with the selected party line ringing code and cessation of ringing is an indication to the calling party that the call has been answered at the called substation and that he may come back off hook. If fully selective harmonic ringing is employed only the ringer at the called substation will ring and the calling party must wait a suitable period of time to allow the called party to answer the call. If semi-selective harmonic ringing is employed the calling party may or may not hear the ring depending whether or not the calling substation ringer responds to the same harmonic frequency as the called substation ringer.

The first party to answer the revertive call hears a special revertive tone signal immediately upon answering, this tone lasting only long enough to allow the subscriber to get the receiver to his ear, i.e. about one or two seconds. If the calling party answers first, a condition which may readily occur with fully selective harmonic ringing since the calling party has no indication as to when the call is answered, this special revertive tone signal indicates to the calling party that the call has not yet been answered and that he should wait for the called party to come to the telephone. If the called party answers first, the revertive tone signal indicates to him that a revertive call is being made and that he should wait until the calling party comes back on the line.

If the revertive call is abandoned without either party coming back on the line, ringing of the substation ringers is terminated after a period of from two to four minutes. Upon answering of the revertive call, the subscribers may talk for a predetermined time interval, for example, seven minutes, after which a supervisory tone signal is returned to the line to discourage further conversation over this line.

Considering now the placement of a revertive call from the substation A′ to the substation B′, when the receiver or handset at the substation A′ is lifted from its hook or cradle to initiate the call, a loop circuit including the conductors of the line 32 is closed to the line circuit 16, with the result that this line circuit immediately operates to change the magnitude of the bias potential which it delivers over the conductor 45b to the gating circuit of the multiplexer 11 which individually corresponds to the line 32. The multiplexer 11 responds to this change in magnitude of the controlling bias potential supplied thereto from the line circuit 16 by opening this gate circuit. Accordingly, only the signal pulses 83c occurring during the pulse time positions 63c of successive pulse frames, are permitted to pass over the common conductor 50 to the pulse input circuits 200 of the finders 12a, 13a, and 14a and the in gate circuits 207 and 223 of the connectors 12b, 13b, and 14b in parallel. At this point the pulses transmitted from the multiplexer 11 over the common conductor in the pulse time position 63c may be regarded as multiplexer pulses 83c.

In the illustrated embodiment, the finder-connector links of the system are arranged in a predetermined sequence and are allotted one at a time to successive calling lines of the system by means of the self-allotting circuits 206 contained in each of the finders 12a, 13a, and 14a. Initially, only the link 12 is conditioned by means of the self-allotting circuit 206 in the finder 12a to handle a call placed on a calling line of the system. However, when the link 12 is taken into use, the self-allotting circuit 206 in the finder 12a diverts a supervisory carrier signal to the finder 13a of the line 13 to condition this link to handle the next succeeding call. Accordingly, only the link 12 is conditioned to handle the first call and the connector 12b of this link is as yet inoperative so that only the finder 12a initially responds to the multiplexer pulses 83c delivered thereto from the multiplexer 11 over the conductor 50 in the described pulse time position 63c.

In the finder 12a the multiplexer pulses 83c are repeated by the pulse input circuit 200 to effect substantially immediate operation of the +B switching circuit 201 embodied in this finder, whereby operating anode potentials are delivered to the tubes of the circuits 209, 211, 213, 215, 216, 218, 219, 264, 265, 285, 296 and 299 of the connector 12b over the +B switch conductor 12c with the result that the connector 12b is conditioned for operation, i.e., conditioned to respond to signal carrying multiplexer pulses delivered thereto from the multiplexer 11 over the conductor 50. Operation of the +B switching circuit in the finder 12a also has the effect of conditioning the tens and units coincidence tube circuits 203 and 204 of this finder for operation under the joint control of the multiplexer pulses 83c repeated by the input circuit 200, the positive ten pulses developed by the tens pulse ring circuit 21 and the positive units pulses developed by the units pulse ring circuit 20.

In responding to the tens and units pulses impressed thereon coincidentally with the multiplexer pulses 83c, the tens and units coincidence tube circuits 203 and 204 of the finder 12a cooperate with the finder pulse forming circuit 205 and the combining circuit 202 of this finder to produce finder gate pulses which are transmitted over the conductor 12d to the circuits 207, 208, 226 and 296 of the connector 12b and have the effect of initially limiting the response of the connector only to multiplexer pulses 83c appearing in the pulse time position 63c. The combining circuit 202 of the finder 12a also gates busy pulses in the pulse time position 63c which are fed over the common busy pulse out conductor 52a to the link coupling circuits 24 wherein the busy pulses are amplified and supplied over the common busy pulse in conductor 52b to all of the finders and connectors of the system to prevent these finders from responding to multiplexer pulses occurring in this time position. Thus, the line 32 is guarded against intrusion on an incoming call. In addition, the pulses gated by the circuit 202 to the conductor 12d are impressed upon the pulse input circuit 200, thereby to render the finder 12a responsive only to multiplexer pulses 83c appearing in the pulse time position 63c.

Operation of the +B switching circuit in the finder 12a has the further effect of causing the self-allotting circuit 206 of the finder 12a to divert the supervisory carrier control signal, normally supplied thereto over the conductor 36a, to the self-allotting circuit in the finder 13a of the next succeeding link 13 over the conductor 36b to condition the link 13 to handle the next incoming call. In an entirely similar manner, operation of the +B switching circuit in the finder 13a of the link 13 when this link is operatively associated with the next calling line has the effect of diverting the supervisory carrier control signal to the finder of the next succeeding finder-connector link 14 so that as one link is taken into use the seized link automatically allots the next succeeding link in the sequence to handle the next incoming call. After the finder 12a has operated to perform the described functions, continued holding of the finder 12a, if the call is non-revertive, is dependent upon continued acceptance and transmission of multiplexer pulses 83c by the pulse input circuit 200, which of course means that the finder will remain associated with the calling line 32 only so long as a calling condition persists on this line. However, in the illustrated revertive call, the finder 12a continues to be operatively associated with the calling line 32, and continues to transmit busy pulses in the time position 63c and accept multiplexer pulses only this time position even though a calling condition does not exist on the calling line 32 during certain periods while the revertive call is being set up. Thus, in a revertive call, continued holding of the finder 12a is dependent also on the transmission of a revertive call hold signal over the conductor 12f from the connector 12b, as will be described in more detail hereinafter. Holding of the finder 12a may also be dependent upon the conversation timing control circuit 285 in the connector 12b, as will be described in more detail hereinafter.

As indicated above, when the +B switching circuit 201 of the finder 12a operates to apply operating anode potential to the conductor 12c, the circuits 210, 211, 212, 215, 216, 218, 219, 264, 265, 286, 296 and 299 of the connector 12b are conditioned for operation. The tens digit register 211 in turn supplies a bias potential to the dial tone gate tube of the network 225 and this network then functions to transmit a dial tone signal, derived from the dial tone generator 29b over the conductor 47, to the calling line out gate circuit 226 over the conductor 244. This circuit in responding to the dial tone signal and also to the finder gate pulses delivered thereto over the conductor 12d and the commutator drive pulses 96a delivered thereto over the conductor 35, functions to repeat over the channel conductor 51 to the distributor 15 connector signal pulses modulated in accordance with the dial tone signal in the pulse time position 63c assigned to the calling line. The distributor 15 responds to the connector signal pulses thus transmitted thereto by repeating the same through the gate circuit thereof associated with the line circuit 16, reconstructing the dial tone and transmitting the reconstructed dial tone over the conductor 54 to the line circuit 16. In the line circuit 16, the dial tone signal is transmitted over the line 32 to signal the calling subscriber at the substation A' that the dialing operation may be initiated.

Two digits of dial impulses must be dialed into the connector 12b in order to effect selection in the connector of the pulse time position assigned to the called line, which in the illustrated revertive call is the same time position 63c assigned to the calling line since in a revertive call the calling and called lines are one and the same, and a third successive digit, called a party line digit, must be dialed into the connector 12b in order to effect selection on a decimal basis of the particular party line ringing signal assigned to the called substation B' having the assigned directory number designation "322." More specifically, the directory number digits "3," "2" and "2" must be dialed successively into the connector 12b to effect selection of the pulse time position 63c and the code #2 party line ringing signal assigned to the called substation B'. During the open circuit period of each dial impulse, the control bias supplied by the line circuit 16 to the gate circuit of the multiplexer 11 which corresponds to the calling line 32 is returned to its on hook value to interrupt the transmission of mulitplexer pulses 83c over the conductor 50 to the pulse input circuit 200 of the finder 12a and to the in gate circuits 223 and 207 of the connector 12b.

During the make period of each impulse dialed at the calling substation A', multiplexer signal pulse transmission from the multiplexer 11 to the finder 12a and the connector 12b in the pulse time position 63c is resumed. As controlled by the finder gating pulses delivered to the circuits 207 and 208 from the circuit 202 over the conductor 12d, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A', the impulse integrator circuit 209 develops coincident impulses which are impressed upon the tens, units and party inverter circuits 260, 261 and 262 over the conductor 227.

Pending operation of the tens sequence timing circuit 212, the units inverter circuit 261, which also performs the function of a units digit start gate, and the party inverter circuit 262, which also performs the function of a party digit start gate, are held non-responsive to the three impulses transmitted thereto by the dial impulse integrator circuit 209 during dialing of the first digit "3" at the calling substation. However, the tens register pulser 210 responds to these three impulses repeated thereto by the tens inverter circuit 260 over the conductor 231 by developing three coincident register drive pulses of uniform amplitude and duration which are supplied to the tens digit register circuit 211 and the tens sequence timing circuit 212 over the conductor 230. In responding to the three register drive pulses thus transmitted thereto, the tens digit register 211 is driven to a setting wherein tens pulses appearing on the positive tens pulse conductor 32c in the third tens pulse time position 74a of each pulse frame may be transmitted through the third tens gate of this register and over the conductor 232 to the connector pulse forming circuit 217. Transmission of the three register drive pulses individually corresponding to the three break periods of the first digit dialed at the calling substation over the conductor 230 to the tens sequence timing circuit 212 has the effect of conditioning this circuit to block the tens register pulser 210 from developing register drive pulses during dialing of the second and third digits and to render the units inverter circuit 261 operative to repeat the pulses delivered thereto by the dial impulse integrator circuit 209 during dialing of the second digit at the calling substation. Immediately the first register drive pulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, transmission of the dial tone signal to the calling substation A′ is arrested.

During the interdigit pause which separates dialing of the first and second digits at the calling substation, the tens sequence timing circuit 212 assumes a stable operating condition wherein a controlling potential is impressed upon the conductor 234 to bias the tens register pulser 210 against developing further register drive pulses in response to impulses transmitted thereto through the tens inverter circuit 260 from the dial impulse integrator circuit 209. The above-described control potential is also supplied over the conductor 234 to the units inverter circuit 261 to render this circuit operative to repeat impulses delivered thereto from the dial impulse integrator circuit 209 to the units register pulser 214 and the units sequence timing circuit 216 over the conductor 238.

During dialing of the second digit "2" at the calling substation A′, the dial impulse integrator circuit 209 responds by transmitting two impulses to each of the inverter circuits 260, 261 and 262. As noted above, however, the party inverter circuit 262 is still held non-responsive to these impulses and the tens register pulser 210 is now blocked against responding to these impulses. Thus, only the units inverter circuit 261 repeats the two impulses to the units register pulser 214 over the conductor 238 and the latter circuit responds to these impulses by developing corresponding register drive pulses of uniform amplitude and duration which are supplied to the units digit register 215 and the units sequence timing circuit 216 over the conductor 236. As a consequence, the units digit register 215 is operated or driven to open the second units gate circuit therein, thereby to establish a path for the transmission of units pulses appearing in the time positions **63*a*, 63*b*, 63*c*, etc., to the connector pulse forming circuit 217 over the conductor 245. The two pulses repeated to the units sequence timing circuit 216 over the conductor 236** serve to condition this circuit for operation at the end of the second digit.

During the interdigit pause which separates dialing of the second and third digits at the calling substation, the units sequence timing circuit 216 assumes a stable operating condition wherein a controlling potential is impressed upon the conductor 235 to bias the units register pulser 214 against development of register drive pulses in response to further impulses repeated thereto through the units inverter circuit 261 from the dial impulse integrator circuit 209. This controlling potential is also supplied over the conductor 235 to the party inverter circuit 262 to render this circuit operative to repeat impulses delivered thereto from the dial impulse integrator circuit 209 during a third digit to the party register pulser 263 and the party sequence timing circuit 264 over the conductor 237. The potential impressed upon the conductor 235 is also supplied to the revertive call test circuit 296 to render this circuit operative to perform the functions described below in the event that a revertive call is in progress.

The connector pulse forming circuit 217 operates to mix the tens and units pulses respectively transmitted thereto from the registers 211 and 215 over the conductors 232 and 245 to produce a resultant connector pulse which appears on the conductors 239, **239*a*, 239*b* and 239*c*. More specifically, the tens pulses 74*a* appearing on the positive tens pulse conductor 32*c* and gated by the tens digit register 211 are transmitted to the connector pulse forming circuit 217 over the conductor 232 where they are mixed with the positive units pulses appearing in the time position 63*c* which are gated by the units register 215 and transmitted to the circuit 217 over the conductor 245. Mixing of these pulses in the circuit 217 results in the production of a connector pulse which occurs during each pulse frame in the pulse time position 63*c* assigned to the called line. These pulses are transmitted over the conductor 239 to the connector components 224 and 283, over the conductor 239*b* to the connector component 220, and over the conductors 239*c* to the connector components 222 and 296. The connector pulse forming circuit 217 also operates to select one of the commutator drive pulses 96*a* which occurs in the time position 63*c* assigned to the called line and the selected narrow commutator drive pulses are transmitted to the busy test circuit 218 over the conductor 239*a***.

In order to determine whether the call is revertive or non-revertive there is provided facilities for comparing the time position assigned to the calling line with the time position assigned to the called line. When the time positions of the calling and called lines coincide a revertive call is indicated since each line is individually assigned a different time position in each pulse frame. More specifically, there is provided the revertive call test circuit 296 which in the illustrated embodiment is jointly controlled by finder gate pulses appearing on the conductor **12*d* and connector pulses developed by the circuit 217 on the conductor 239*c*. In the illustrated call, the finder gate pulses appearing on the conductor 12*d* occur in the time position 63*c* assigned to the calling line 32 and the connector pulses appearing on the conductor 239*c* also occur in the time position 63*c* when successive tens and units digits of "3" and "2" are dialed into the connector 12*b***.

The potential impressed upon the conductor 235 by the circuit 216 at the end of the second digit is converted into an enabling bias potential of relatively short duration in the circuit 296. As controlled by this enabling bias potential, the circuit 296 responds to coincidence of the pulses appearing on the conductors **12*d* and 239*c* by assuming a revertive call condition wherein a controlling potential is impressed upon the conductor 296*a* and is transmitted to the calling line out gate circuit 226, the revertive call busy tone gate circuit 298, the busy test circuit 218, the revertive call tone gate circuit 297, the calling line in gate circuit 207, and the code start circuit 268 to condition these circuits for proper operation in setting up a revertive call, as will be described in more detail in connection therewith. Also, when the circuit 296 assumes a revertive call condition it operates to transmit a revertive call hold signal over the conductor 12*f* to the finder 12*a* to prevent this finder from releasing the link 12 when the calling party hangs up and multiplier pulses 83*c* in the time position assigned to the line 32 cease to be transmitted to the finder 12*a*. While the illustrated revertive call test circuit 296 compares the time positions of finder gate pulses and connector pulses to determine whether a call is revertive or non-revertive, it will be understood that any other suitable signals representing the calling and called line time positions may be employed by the circuit 296** for revertive call test purposes.

In order to provide revertive call facilities which are fully compatible with other special features such, for example, as trunk hunting, which may be performed by the connector 12*b* in setting up a non-revertive call, the normal busy test operation and the trunk hunting operation are not performed until after the third digit has been dialed at the calling sub-station, so that trunk hunting will not interfere with the revertive call test operation. Also, the revertive call test operation is completed before the end of the third digit so that if the call is non-revertive the normal operations of busy testing, cut through, trunk hunting, etc., may be performed in the connector 12*b*. Thus, the described enabling bias potential derived from the conductor 235 is of relatively short duration so that the revertive call test interval will not extend beyond the end of the third digit. Accordingly, if the call is not revertive no change in the potential on the conductor 296 occurs at the end of the second digit and the units 207, 218, 226, 268, 297 and 298 controlled thereby remain in a non-revertive call condition.

During dialing of the third digit "2" at the calling substation A′ the dial impulse integrator circuit 209 responds by transmitting two impulses to each of the inverter circuits 260, 261 and 262. As noted above, however, the tens and units register pulsers 210 and 214 are now prevented from responding to these impulses. Thus, only the party inverter circuit 262 repeats the two impulses to the party register pulser 263 over the conductor 237 and the latter circuit responds to these impulses by developing corresponding register drive pulses which are supplied over the conductor 240 to the party digit register 265 and the party sequence timing circuit 264. As a consequence, the party digit register is operated or driven to open the second party gate circuit therein, thereby to establish a path for the transmission of the interrupted ringback tone signal (Fig 26 (14)) which corresponds to the code #2 party line ringing signal assigned to the called substation B′, over the conductor 275 to the ringback tone gate tube in the network 225.

At the end of the third digit dialed into the connector 12*b* the party sequence timing circuit 264 assumes a stable operating condition wherein a controlling potential is impressed upon the conductor 242 to bias the party register pulser 263 against development of register drive pulses in response to further impulses developed on the line 32. This controlling potential is also supplied to the trunk hunting control circuit 283, the busy test circuit 218 and the busy lock circuit 219 to render these circuits operative to perform their respective functions as will be described in more detail hereinafter.

Effectively, the busy test circuit 218 and the busy lock circuit 219 cooperate to perform the normal or non-revertive busy test operation in the connector 12*b*. More specifically, if the called line is busy, i.e., occupied with a call, busy pulses are present on the common busy pulse in conductor 52*b* in the time position assigned to the called line. These busy pulses are impressed upon the busy test circuit 218 simultaneously with commutator drive pulses 96*a* appearing in the time position 63*c* assigned to the line 32; which, it will be recalled, are developed by the connector pulse forming circuit 217 and impressed upon the busy test circuit 218 over the conductor 239*a*. Coincidence between the selected commutator drive pulses and the busy pulses normally has the effect of preventing the busy test circuit from operating so that the busy condition of the called line is indicated.

In the illustrated revertive call, the finder 12*a* develops busy pulses in the time position 63*c* assigned to the calling line 32 and the connector pulse forming circuit 217 responds to the first two digits of "3" and "2" by producing connector pulses in the same time position. Accordingly, for a revertive call the busy test circuit 218, under normal operation, would always indicate that the called line is busy and the call would be blocked at this point in the system.

In order to prevent blocking of the revertive call in the busy test circuit 218 there is provided means responsive to the revertive call test operation for so controlling the busy test operation that the revertive call may be completed. More specifically, the controlling potential produced in the conductor 296*a* by the revertive call test circuit 296 when a revertive call is in progress, is employed in the busy test circuit 218 to shift this circuit to a revertive call setting in which the busy test circuit operates to impress a positive potential on the cut-through conductors 251 and 251*a*, irrespective of any busy pulses present on the busy pulse in conductor 52*b*. The potential impressed upon the conductor 251*a* is applied to the busy lock circuit 219 to prevent this latter circuit from operating at the end of the normal or non-revertive busy test interval, as will be described in more detail in connection with the non-revertive operation of the circuits 218 and 219. At the same time, the circuit 218 impresses a potential on the conductor 289 which blocks the units register advancer 281 from responding to trunk hunting drive pulses with the result that the trunk hunting facilities are disabled upon cut-through for either revertive or non-revertive calls.

The potential impressed upon the conductor 251 is also transmitted to the called line out gate 224 to condition this circuit to repeat connector signal pulses in the time position 63*c* to the distributor 15, these connector signal pulses being employed to transmit a ringing control signal to the line circuit 16 associated with the revertive calling line 32.

In order to prevent speech transmission through the link 12 during the illustrated revertive call, which is not only unnecessary but is undesirable from the standpoint of oscillation and regeneration within the link 12 since all of the signal transmission gate circuits 207, 223, 224, 226 would be opened simultaneously in the time position 63*c* during a revertive call, the cut-through potential produced on the conductor 251 is also transmitted to the calling line in gate circuit 207. The circuit 207 responds to the simultaneous occurrence of a cut-through potential on the conductor 251 and a revertive call potential on the conductor 296*a* by blocking both itself and the calling line reconstructor circuit 208 so as to prevent speech transmission in the calling-to-called line direction during a revertive call. In this connection it will be recalled that the calling line out gate circuit 226 is blocked incident to the revertive call test operation so that speech transmission in both directions through the link 12 is cut off after cut-through. However, it will be noted that blocking of speech transmission through the circuits 207 and 226 does not interfere with the use of the circuit 207 to transmit a dial tone signal at the start of the call and does not interfere with the functioning of the circuits 223 and 224 in the manner described in more detail hereinafter.

In addition, the cut-through potential impressed upon the conductor 251 is transmitted to the code start circuit 268, the busy pulse gate circuit 220, and the ring trip circuit 221 to condition these circuits to perform their respective functions in setting up either a revertive or non-revertive call. The cut-through potential impressed upon the conductor 251 is also transmitted to the revertive call busy tone gate circuit 298 to condition this circuit to gate a revertive busy tone signal to the called line out gate circuit 224.

The circuit 224 remains unblocked after cut-through for both revertive and non-revertive calls and responds to connector pulses delivered thereto over the conductor 239 and commutator drive pulses 96*a* delivered thereto over the conductor 35, by transmitting over the conductor 51 to the distributor 15 connector signal pulses which are modulated in accordance with the revertive busy tone signal and occur in the time position 63*c* assigned to the revertive calling line 32. The distributor 15 responds to the connector signal pulses thus transmitted thereto by repeating the same through the gate circuit thereof associated with the line circuit 16, reconstructing the revertive busy tone signal and transmitting the reconstructed revertive busy tone signal to the line circuit 16. In this connection it will be noted that the called line out gate circuit 224 is revertively connected to the line circuit 16, since, on a revertive call, the connector pulses are produced in the time position 63*c* assigned to the revertive calling line 32.

In the line circuit 16, the revertive busy tone signal is transmitted over the line 32 to signal the calling party at the substation A′ that a revertive call is in progress and that he should hang up for a short period of time while his line is being rung in accordance with the party line ringing signal assigned to the called substation B′ and then come back off hook to complete the revertive call. In the illustrated embodiment wherein semi-selective harmonic ringing is employed, both substations A′ and B′ respond to the same harmonic ringing frequency and hence the calling subscriber at substation A′ will hear the party line ring and will know by termination of ringing that the call has been answered at the substation B′ and that he should come back off hook.

When the calling subscriber at the substation A′ hangs up in response to the above described revertive call busy tone signal, the loop circuit including the conductors of the line 32 is broken and the line circuit 16 immediately operates to increase the negative bias potential on the conductor 45*b* so that the corresponding gate circuit of the multiplexer 11 is closed and transmission of multiplexer pulses over the conductor 50 in the time position 63*c* assigned to the line 32 is terminated.

Normally, the finder 12*a* responds to cessation of multiplexer pulse transmission in the time position assigned to the seized calling line by releasing the link 12 after a predetermined time interval determined by the +B switching circuit 201 therein. In order to prevent the link 12 from releasing in response to multiplexer pulse termination when the calling subscriber hangs up to permit completion of the revertive call, there is provided means for holding the finder operatively associated with the calling line 32 independently of multiplexer pulse transmission in the time position 63*c*. More specifically, when the revertive call test circuit 296 in the connector 12*b* indicates that a revertive call is being made, a revertive call hold signal is transmitted over the conductor 12*f* to the +B switching circuit 201 in the finder 12*a* so as to prevent this circuit from releasing the link 12 in response to cessation of multiplexer pulse transmission in the time position 63*c*. As a result, the coincidence tube circuits 203 and 204 in the finder 12*a* remain at a setting corresponding to the line 32, the circuit 202 in the finder 12*a* continues to impress busy pulses on the conductor 52*a* in the time position 63*c* assigned to the line 32 to prevent other links from seizing the line 32 and continues to impress finder gate pulses on the conductor 12*d* in the time position 63*c* to hold the connector 12*b* operatively associated with the finder 12*a*, the +B switching circuit 201 continues to supply operating potential over the conductor 12*c* to the indicated circuits of the connector 12*b* so that the settings of these circuits will not be destroyed, and the pulse input circuit 200 in the finder 12*a* continues to be conditioned so as to accept only multiplexer pulses which occur in the time position 63*c* assigned to the line 32 so that the finder 12*a* remains in a condition to respond to multiplexer pulse transmission in the time position 63*c* when the revertive call is answered at the calling or called substation and multiplexer pulse transmission is resumed.

In order that the line 32 will not be rung until the calling subscriber has hung up, so that the shunting effect of the closed loop circuit will be removed and the ringers on the line will be able to respond to transmission of ringing current over the line, there is provided means responsive to the transmission of a first disconnect signal over the calling line for initiating ringing on a revertive call. More specifically, the +B switching circuit 201 in the finder 12*a* is arranged to change the potential on the conductor 12*e* when the calling subscriber hangs up, i.e., when a disconnect signal is transmitted over the calling line 32. This change in potential on the conductor 12*e*, which may be called a revertive ring start signal, is transmitted to the code start circuit 268 in the connector 12*b*.

The code start circuit 268 is jointly controlled by the cut-through potential produced on the conductor 251, the revertive call test potential produced on the conductor 296*a* and the code start pulses produced on the conductor 5, and responds to the revertive ring start signal produced on the conductor 12*e* by developing a control potential on the conductor 241 in response to the code start pulse which occurs immediately following initiation of the revertive ring start signal on the conductor 12*e*. The control potential impressed upon the conductor 241 is transmitted to the ringback tone gate tube in the network 225 so as to render this tube operative to gate therethrough, the interrupted ringback tone signal corresponding to the code #2 party line ringing signal and selected in the party digit register 265.

The ringback tone signal which is interrupted or keyed in accordance with the ringing intervals of the code #2 ringing signal assigned to the called substation B′, and which is gated by the ringback tone gate circuit in the manner described above, is used to control the ringing operation at the line circuit 16 and the transmission of ringing current over the revertive calling line 32. Thus, the interrupted ringback tone signal gated by the ringback tone gate circuit is rectified to reproduce the code #2 party line ringing signal originally developed in the harmonic ringing code forming circuit 99 and consisting of two short ringing pulses. These ringing pulses are supplied as positive pulses over the conductor 295 to the called line out gate circuit 224 for the duration of each positive ringing pulse. The called line out gate circuit 224 is thus controlled to release connector signal pulses to the distributor 15 in the pulse time position 63*c* which are approximately 50 percent larger in amplitude than those used normally to convey intelligence signals to the distributor 15 during non-revertive calls. These large amplitude signal pulses are diverted by the distributor 15 to the line circuit 16 and serve to control the ringing control facilities in this line circuit. More specifically, the large amplitude connector signal pulses which appear on the conductor 51 during the ringing intervals of the selected party line ringing signal are detected in the distributor 15 so as to reproduce the ringing pulses, and the ringing pulses are impressed upon a line ringing circuit in the line circuit 16. Opening of the line ringing circuit in the line circuit 16 during each ringing pulse results in the transmission of ringing current over the revertive calling line 32 during each short ringing pulse interval. Since the ringing pulses 170 and 171 (Fig. 26 (2)) occur during the first ringing period when a 66⅔ c.p.s. ringing current is impressed upon the common ringing cable 61, the frequency of the ringing current transmitted to the line 32 during these two short ringing intervals is 66⅔ c.p.s. As discussed generally above, the substations A′ and B′ associated with the line 32 are both provided with ringing facilities which respond to 66⅔ c.p.s. ringing current so that both ringers at these substations are rung for two short pulses during the first ringing period of each harmonic ringing cycle.

Ringing of both the party line substations A′ and B′ persists until the call is answered at one of these substations. However, in the illustrated revertive call, the link 12 is held operatively associated with the line 32 independently of whether or not a calling condition exists on this line so that the revertive call may be completed after the calling party hangs up. Accordingly, if the revertive call is abandoned at the calling substation A′ and is not answered at the called substation B′, the ringers at these substations would continue to be rung indefinitely.

In order to prevent the linkage of the system from being tied up in unanswered calls, there is provided ringing timeout facilities which operate to release the involved linkage a predetermined time interval after ringing is initiated. Furthermore, these ringing timeout facilities are operative for either revertive or non-revertive calls. More specifically, when the code start circuit 268 develops a potential on the conductor 241 in the manner described above, a corresponding potential is transmitted over the conductor 268a to the ringing timeout circuit 299 and the revertive busy tone gate circuit 298. The ringing timeout circuit 299 responds to the control potential transmitted thereto over the conductor 268a, and ringing timeout pulses developed on the conductor 57b by the timing generator 57 in the common equipment 17, by impressing a control signal on the conductor 253 a predetermined time interval, which is preferably between two and four minutes, after ringing is initiated. This control signal is transmitted to the ring trip circuit 221.

The ring trip circuit 221 is enabled by the cut-through potential developed on the conductor 251 and responds to the control signal impressed upon the conductor 253 by the ringing timeout circuit 299 by developing a ring trip potential on the conductor 253 which is transmitted to the ringback tone gate circuit in the network 225 and operates to prevent transmission therethrough of the interrupted ringback tone signal corresponding to the code #2 party line ringing signal assigned to the substation B′. As a result, the pulse height of the connector signal pulses released by the called line out gate circuit 224 is reduced to normal and the line ringing facilities in the line circuit 16 respond to this reduction in pulse height by terminating transmission of ringing current over the line 32. Accordingly, ringing of the line 32 is terminated automatically by the described ringing timeout facilities, in the event the illustrated revertive call is abandoned at the substation A′ and is unanswered at the substation B′.

In the illustrated revertive call, the finder 12a is held operatively associated with the line 32 by means of the described revertive call hold signal, even though a calling condition does not exist on this line. Accordingly, the link 12 would remain operatively associated with the line 32 and prevent this line and the link 12 from being used even though ringing is terminated by the ringing timeout circuit in the manner described above. To prevent this, the ring trip potential produced on the conductor 253 by the circuit 221 in the manner described above, is impressed upon the revertive call test circuit 296 and this latter circuit responds to this ring trip potential by changing the potential on the revertive call hold conductor 12f back to its initial or non-controlling value. The +B switching circuit 201 is thus permitted to release the link 12 if no calling condition exists on the line 32.

The ring trip potential produced on the conductor 253 by the circuit 221 is also transmitted to the revertive call tone gate circuit 297, the conversation timing warning tone circuit 284, and the party register advancer 282. However, since the link 12 is released on an abandoned call in the manner described above, these circuits are not, under these conditions, permitted to respond to the ring trip potential on the conductor 253.

Assuming that the illustrated revertive call is answered at either the substation A′ or the substation B′ during the ringing timeout interval, the line circuit 16 functions to change the magnitude of the control potential supplied over the conductor 45b to the multiplexer 11 with the result that the gate circuit assigned to the line circuit 16 in the multiplexer 11 is opened to permit multiplexer pulses 83c occurring in the pulse time position 63c of each pulse frame to be transmitted through the multiplexer 11 and over the conductor 50 to the multiplexer input terminals of each of the finders and connectors of the system.

The multiplexer pulses 83c are impressed upon the calling and called line in gate circuits 207 and 223 in the connector 12b. As described above, the circuit 207 is blocked by the cut through potential developed on the conductor 251 when a revertive call is in progress, so that these multiplexer pulses are not transmitted through the circuit 207. However, the called line in gate circuit 223 is enabled by the potential developed on the conductor 268a by the code start circuit 268. Accordingly, in the called line in gate circuit 223 the multiplexer pulses 83c occur in time coincidence with the connector pulses impressed upon the circuit 223 over the connector pulse conductor 239c from the connector pulse forming circuit 217. As a consequence, the call answering signal carried thereby is gated by the circuit 223 and impressed upon the reconstructor circuit 222 where it is detected to produce a potential on the conductor 252 which is transmitted to the ring trip circuit 221.

The ring trip circuit 221 is arranged to respond to the potential developed on the conductor 252 by developing a ring trip potential on the conductor 253. This ring trip potential is identical to the potential produced on the conductor 253 by the circuit 221 in response to a control signal impressed upon the conductor 253 by the ringing timeout circuit 299. However, it will be understood that if the call is answered during the ringing timeout interval, the ring trip circuit 221 responds to the above described call answering potential on the conductor 252, since this potential is produced before the circuit 299 impresses a control signal on the conductor 253. Furthermore, impression of this control signal on the conductor 253 at the end of the ringing timeout interval has no effect upon the circuit 221, or the ring trip potential developed thereby on the conductor 253.

The ring trip potential developed on the conductor 253 by the circuit 221 in response to a call answering potential on the conductor 252 is impressed upon the circuits 282, 284, 296 and 297, as described previously in connection with the abandonment of a revertive call. The revertive call tone gate circuit 297 responds to the ring trip potential produced on the conductor 253 by gating a revertive tone signal of relatively short duration, which is derived from the revertive call tone generator 29g in the common equipment 17 by way of the conductor 49b, to the called line out gate circuit 224. The circuit 224 remains unblocked after cut-through and transmits connector signal pulses in the time position 63c, which are modulated in accordance with the revertive tone signal, to the distributor 15 over the conductor 51. This revertive tone signal is reconstructed in the distributor 15 and transmitted by way of the line circuit 16 to the line 32. If the called subscriber at the substation B′ has answered the revertive call, this revertive tone signal informs him that he is involved in a revertive call and that he should wait for the calling party to come back on the line. On the other hand, if the calling subscriber at the substation A′ answers first this revertive tone signal informs him that the called party has not yet answered and that he should give the called party time to get to his receiver. It will be understood that the described revertive tone signal lasts for only a second or two and conversation over the line 32 is permitted as soon as this signal is terminated.

Following the described revertive call operations in the connector 12b, a two-way talking circuit over the line 32 between the substations A′ and B′ is established. Thus, voice or other signals developed at either one of these substations are transmitted over the conductors of the line 32 to the receiver on the subset at the other substation so that a direct wire talking circuit between substations is provided.

The ring trip potential on the conductor 253 is impressed upon the revertive call test circuit 296 when the revertive call is answered and the circuit 296 responds thereto by changing the potential on the revertive call hold conductor 12*f* so that the link 12 may be released at the end of the revertive call. When the revertive call is terminated normally by both parties on the line 32 hanging up, the transmission of multiplexer pulses 83*c* in the time position 63*c* to the finder 12*a* is terminated. Since the +B switching circuit 201 in the finder 12*a* is reset to its normal or non-revertive setting by means of the above described change in potential on the conductor 12*f*, the circuit 201 responds to cessation of multiplexer pulse transmission by releasing the link 12. More specifically, operating anode potential is removed from the conductor 12*c* and the circuits in the finder 12*a* and connector 12*b* controlled thereby are returned to their initial or quiescent settings.

In order to guard the line 32 against intrusion on a call incoming thereto during the revertive call and to provide conversation timing facilities for the revertive call the link 12 is held operatively associated with the line 32 for the duration of the revertive call. Accordingly, the circuit 202 in the finder 12*a* continues to impress busy pulses occurring in the time position 63*c* on the conductor 52*a* for the duration of the revertive call to prevent other links from seizing the line 32.

In order to provide conversation timing facilities, for the revertive call, the ring trip potential which is impressed upon the conductor 253 by the circuit 221 is transmitted to the party register advancer 282 and this latter circuit is thereby conditioned to respond to conversation timing pulses impressed upon the conductor 57*a*. Concurrently with the conditioning of the party register advancer 282, the party digit register 265 is reset to zero since this register is no longer required for the gating of a ringback tone signal after the call is answered and a two-way talking circuit is established in the manner described above. The conversation timing pulses are produced at periodic intervals and the party register advancer responds to each conversation timing pulse by producing a register drive pulse which is supplied to the party digit register 265 over the conductor 291 to advance this register one step for each conversation timing pulse. The conversation timing pulses may occur, for example, at 40 second intervals so that the party digit register is advanced one stage for each 40 second interval of the call. When the ninth counting tube of the party digit register 265 is extinguished by the tenth register drive pulse produced by the party register advancer 282, a positive potential is developed on the conductor 292 which is transmitted to the conversation timing warning tone circuit 284.

The conservation timing warning tone circuit 284 is conditioned to respond to the above-described positive potential developed on the conductor 292 when the ninth counting tube in the party digit register 265 is extinguished, and transmits therethrough a short pulse of the warning tone signal impressed on the circuit 284 from the warning tone generator 58 over the conductor 58*a*. This short pulse of warning tone is transmitted over the conductor 294 to the called line out gate circuit 224 wherein it is modulated on the connector signal pulses gated by the circuit 224 to the output conductor 51 and these modulated connector signal pulses are transmitted to the distributor 15 wherein they are detected and sent to the line circuit 16 so that the calling and called subscriber on the line 32 are informed that the revertive call conversation period has almost expired.

When the tenth counting tube of the party digit register 265 is extinguished by the eleventh register drive pulse produced by the party register advancer 282, a positive control potential is developed on the conductor 293 which is transmitted to the conversation timing control circuit 285. The circuit 285 responds to the positive potential produced on the conductor 293 by producing a positive pulse on the conductor 12*g* which is transmitted back to the finder 12*a* and is applied to the +B switching circuit 201. The circuit 201 responds by removing operating anode potential from the controlled circuits in the finder 12*a* and the connector 12*b* so that the link 12 is released from the line 32 even though a calling condition still exists on this line. Since a calling condition still exists on the line 32 after the link 12 is released, a new finder-connector link is called in and becomes operatively associated with the line 32 in identically the same manner as that described above in connection with the link 12. Assuming that the link 13 is called in, when the finder 13*a* becomes operatively associated with the line 32 and transmits operating potential over the conductor 13*c* to the associated connector 13*b*, this connector functions to transmit a dial tone signal over the line 32 by way of the calling line out gate circuit 226, the distributor 15 and the line circuit 16. This dial tone signal overrides the speech signals being transmitted between the substations A′ and B′ on the line 32 and discourages further continuance of the revertive call. Once both parties on the line 32 have hung up, the link 13 is immediately released for use in setting up other connections.

In order to render the operation of the revertive call system more readily understandable, there is shown in Figs. 11 and 12 the time relationships of the potentials produced on certain conductors of the system during a revertive call. Thus, referring to these figures, when the calling party at the substation A′ comes off, as indicated by the arrow 2600, the loop circuit including the conductors of the line 32 is completed so that current in the line 32 changes from zero to a relatively positive value, indicated at 2601 in Fig. 11(1). When this occurs the finder 12*a* is seized and the potential on the +B switch conductor 12*c* is changed from zero to a positive value as indicated at 2602 in Fig. 11(2). When the finder is seized the potential on the revertive ring start conductor 12*e* is changed from a value 2603, substantially equal to ground potential, to a value 2604 which is highly negative with respect to ground.

When the connector 12*b* is operatively associated with the line 32, a dial tone signal 2605 is gated by the dial tone gate tube in the network 225 and this dial tone signal is transmitted over the line 32 to signal the calling party to start dialing. This dial tone signal persists until the first impulse 2606 of the first, or tens digit, is transmitted over the line 32 as shown in Figs. 11(1) and (5). After the tens digit comprising the three impulses 2606, 2607 and 2608 has been dialed, the tens sequence timing circuit 212 operates to change the potential on the conductor 234 from zero to a relatively positive value 2609 as shown in Fig. 11(4). After the units digit comprising the two impulses 2610 and 2611 is transmitted over the line 32, the units sequence timing circuit 216 operates to change the potential on the conductor 235 from zero to a relatively positive value 2612, as shown in Fig. 11(6).

At the end of the units digit the revertive call test operation is performed and in the illustrated revertive call the revertive call test circuit 296 operates to reduce the potential on the conductor 296*a* from a relatively high positive value 2613 to a relatively small positive value 2614, as shown in Fig. 11(7) and also operates to reduce the potential on the conductor 12*f* from a value 2632 substantially equal to ground potential to a highly negative value 2631, as shown in Fig. 11(20). At the same time the calling line out gate circuit 226 is blocked by the above described potential change on the conductor 296*a*, as shown in Fig. 11(14).

After the third or party digit comprising the two impulses 2615 and 2616 is transmitted over the line 32, the party sequence timing circuit 264 operates to change the potential on the conductor 242 from zero to a relatively positive value 2617, as shown in Fig. 12(8), to condition the busy test circuit 218 for operation. In the illustrated revertive call, the busy test circuit 218 operates substantially immediately to develop a positive cut through potential 2618 on the conductor 251, as shown in Fig. 12(9). At the same time, the calling line in gate circuit 207 is blocked as shown in Fig. 12(10), the called line out gate circuit 226 is enabled as shown in Fig. 12(13) and the revertive call busy tone gate circuit 298 operates to gate a revertive busy tone signal 2619, as shown in Fig. 12(15), which is transmitted over the line 32.

The calling party responds to this revertive busy tone signal by hanging up, as indicated by the arrow 2620, so that a first disconnect signal 2621 is transmitted over the line 32. The finder 12a responds to this first disconnect signal by changing the value of the potential on the conductor 12e from the highly negative value 2604 back to the value 2603, as indicated at 2622 in Fig. 12(3). The code start circuit 268 responds to the change in potential 2622 by developing a positive code start potential 2633 on the conductor 268a, as shown in Fig. 12(11). Substantially immediately thereafter the called line in gate circuit 223 is enabled, as shown in Fig. 12(12), and a ringing current is transmitted over the line 32 for a period of time indicated by the bracket 2623 until the revertive call is answered as indicated by the arrow 2624.

When the revertive call is answered, the revertive call tone gate circuit 297 operates to gate a revertive call tone 2625 for a few seconds, as shown in Fig. 12(17), which is transmitted over the line 32 to inform the answering party that he is involved in a revertive call. At the same time the ring trip circuit 221 operates to develop a positive ring trip potential 2628 on the conductor 253, as shown in Fig. 12(16), so that the ringing operation is terminated. Concurrently therewith the potential on the conductor 12e is changed back to the value 2604, as indicated at 2629 in Fig. 12(3). When the revertive call is terminated by both parties on the line 32 hanging up, a second disconnect signal 2626 (Fig. 12(1)) is transmitted over the line 32. The finder 12a responds to this second disconnect signal, after a predetermined delay interval determined by the +B switching circuit 201, by releasing the link 12, as indicated by the arrow 2627.

In the event the revertive call is unanswered and is abandoned, the ringing timeout circuit 299 operates to develop a positive enabling bias potential 2634, as shown in Fig. 12(18), a period of from zero to two minutes after the code start potential 2633 is developed on the conductor 268a, and two minutes later a negative control signal 2635 (Fig. 12(19)) is developed by the circuit 299 which has the effect of terminating ringing. At the same time the potential on the conductor 12f is changed from the highly negative value 2631 to a value 2632 substantially equal to ground potential, as shown in Fig. 12(20). Accordingly, the finder 12a is permitted to release the link in the manner described above, since a calling condition does not exist on the line 32. It will be understood that when the revertive call is answered and ringing is terminated, as indicated at 2624, the potential on the conductor 12f is also changed from the value 2631 to the value 2632 so as to permit the finder 12a to respond to the second disconnect signal in the manner described above.

*Non-revertive call operation*

Considering now the placement of a non-revertive call from the substation A associated with the line 23 to the substation B′ associated with the line 32, when the loop circuit including the conductors of the line 23 is closed to the line circuit 10, the bias potential on the conductor 53b is changed and the multiplexer 11 responds thereto by impressing multiplexer pulses 84b in the time position 64b assigned to the line 23 on the common conductor 50. These multiplexer pulses effect seizure of the finder 12a and operative association of the link 12 with the calling line 23. When operating anode potential is transmitted over the conductor 12c to the connector 12b, a dial tone signal is returned to the calling subscriber to signal him that dialing may be initiated.

The connector 12b responds to the first two digits of "3" and "2" dialed at the calling substation A in substantially the same manner as that described in connection with a revertive call and the connector pulse forming circuit 217 develops connector pulses in the time position 63c assigned to the called line 32. However, these connector pulses do not coincide with the finder gate pulses which are developed on the conductor 12d by the circuit 202 in the finder 12a. As a result, the revertive busy test circuit 296 is not operated and the potential on the conductors 296a and 12f does not change. Furthermore, the enabling bias potential derived from the conductor 235 at the end of the second digit does not persist after the end of the third digit. Accordingly, if coincidence between finder gate pulses and connector pulses does occur during the trunking hunting operation, the revertive busy test circuit 296 will not respond thereto and a false revertive busy test indication is avoided. Since the potential on the conductor 296a does not change during a non-revertive call the calling line out gate circuit 226 and the calling line in gate circuit 207 remain open for the duration of the call.

When the third digit of "2" is dialed into the connector 12b, the party digit register is operated or driven to open the second party gate circuit therein so that the interrupted ring-back tone signal corresponding to the code #2 party line ringing signal assigned to the substation B′ is transmitted over the conductor 275 to the network 225. Also, at the end of the third digit the party sequence timing circuit 264 develops a busy test start potential on the conductor 242 which is transmitted to the trunk hunting control circuit 283, the busy test circuit 218 and the busy lock circuit 219 to initiate the trunk hunting and non-revertive busy test operations in the connector.

If the called line 32 is busy, the busy pulses appearing on the conductor 52b coincide with the commutator drive pulses transmitted to the circuit 218 over the conductor 239a by the connector pulse forming circuit 217 with the result that the busy test circuit 218 is prevented from operating and the busy condition of the line 32 is indicated. It will be noted that since the potential on the conductor 296a does not change during a non-revertive call the busy test circuit 218 remains fully operative to perform a normal busy test operation.

In the event the called line is busy, the busy lock circuit 219 as controlled over the conductor 242 from the party sequence timing circuit 264 measures a predetermined time interval, i.e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone generator 29a by way of the conductor 46, the busy gate circuit in the network 225, the conductor 244, the calling line out gate circuit 226, the channel conductor 51, the distributor 15 and the line circuit 10 to the calling line 23. Thus, the calling subscriber is advised of the busy condition of the called line.

Assuming that the called line 32 is idle at the time the pulse time position 63c assigned thereto is selected in the connector in the manner explained above, such busy pulses as may be present on the common busy pulse in conductor 52b do not occur coincidentally with the selected commutator drive pulses generated by the connector pulse forming circuit 217 in the pulse time position 63c assigned to the called line. When coincidence between the selected commutator drive pulses and the busy pulses is lacking, the busy test circuit operates immediately the first commutator drive pulse appearing in the time position 63c is impressed thereon from the connector pulse forming circuit 217 over the conductor 239a. In operating, the circuit 218 impresses a positive potential upon the cut-through conductor 251*a* which is applied to the busy lock circuit 219 to prevent the latter circuit from operating at the end of the busy test interval. The positive potential applied to the cut-through conductor 251*a* in the busy test circuit 218 when this circuit operates is also applied to the units register advancer 281 over the conductor 289 to prevent this unit from responding to trunk hunting drive pulses as will be described in more detail hereinafter. When the busy test circuit 218 operates, it also impresses a positive potential upon another cut-through conductor 251 which is applied to the called line out gate circuit 224 to condition the latter circuit to repeat connector signal pulses in the time position 63*c* to the distributor 15, and is also applied to the busy gate circuit 220 so that connector pulses are released to the common busy pulse out conductor 52*a*. The positive cut-through potential on the conductor 251 is also impressed upon the calling line in gate circuit 207. However, in the illustrated non-revertive call the circuit 207 is not blocked since no change in potential on the conductor 296*a* is produced by the revertive busy test circuit 296 for non-revertive calls. The cut-through potential is also impressed upon the revertive busy tone gate circuit 298 but since this circuit is also controlled by the potential on the conductor 296*a* no revertive busy tone signal is gated through the circuit 298. The cut through potential is also impressed upon the ring trip circuit 221 and the code start circuit 268 to condition these circuits to perform the functions described heretofore.

In the event the called line 32 tests busy and the called line is a member of one of the private branch exchange trunk groups discussed generally heretofore, the trunk hunting facilities in the connector 12*b* operate to hunt for an idle trunk within the remaining lines in the called trunk group. Effectively, the trunk hunting control circuit 283, the tens register advancer 280, and the units register advancer 281 cooperate to perform the trunk hunting operation in the connector 12*b*. More specifically, if the called line 32 is busy, i.e., occupied with a call, busy pulses are present on the common busy pulse in conductor 52*b* in the time position 63*c* assigned to the called line, and these busy pulses are impressed upon the trunk hunting control circuit together with connector pulses which also appear in the time position 63*c* assigned to the called line, the connector pulses being impressed upon the trunk hunting control circuit 283 over the conductor 239. Simultaneously with the transmission of busy pulses and connector pulses to the trunk hunting control circuit 283, the trunk marking pulses produced in the manner described generally above in connection with Fig. 27 are also impressed upon the trunk hunting control circuit 283 over the conductor 56*a*. Coincidence of the connector pulses, the busy pulses, and the trunk marking pulses indicates that the called line is busy and is a member of a trunk group. The trunk hunting control circuit 283 responds to the coincidence between the connector pulses, the busy pulses, and the trunk marking pulses by developing a control potential which is transmitted over the conductor 288 to the units register advancer 281 to enable the advancer 281 to respond to trunk hunting drive pulses which are developed by the trunk hunting drive pulse generator 55 in the common equipment 17 and are transmitted to the units register advancer 281 over the conductor 55*a*. The units register advancer 281, once it is enabled, produces register drive pulses of uniform amplitude and duration in response to each trunk hunting drive pulse transmitted thereto over the conductor 55*a*, and each register drive pulse is transmitted to the units digit register 215 over the conductor 290. Each register drive pulse produced by the units register advancer 281 operates to advance the setting of the units digit register 215 by one time position so that the time position of the connector pulses produced on the conductor 239 by the connector pulse forming circuit 217 is advanced one units time position for each trunk hunting drive pulse impressed upon the enabled units register advancer 281. Each time the time position of the connector pulses is advanced by the units register advancer in the manner described above, the busy test circuit 218 compares the new time position of the connector pulses with the busy pulses which are impressed upon the busy test circuit 218 over the conductor 52*b*. If the new position of the connector pulses coincides again with busy pulses impressed upon the conductor 52*b*, thereby indicating that the next line in a called trunk group is busy, the busy test circuit is prevented from operating and the units register advancer 281 continues to advance the setting of the units digit register under the control of the trunk hunting drive pulses until the connector pulses are shifted to a time position in which they do not coincide with busy pulses impressed on the common busy pulse in conductor 52*a* or until the time position assigned to the last line in a called trunk group is reached, in which case no trunk marking pulse is present. Under these conditions, coincidence between the connector pulses, the busy pulses, and the trunk marking pulses ceases so that the trunk hunting control circuit 283 removes the control potential from the conductor 288 thus preventing the units register advancer from responding to further trunk hunting drive pulses and terminating further increase in the setting of the units digit register 215. In the event the last line in the called trunk group is busy, the busy lock circuit 219 functions in the manner described above at the end of the busy test interval to feed a bias potential back over the conductor 248 which has the effect of positively blocking the busy test circuit 218 from subsequent operation. However, the busy test interval is of sufficient duration to permit the trunk hunting facilities to advance the time position of the connector pulses in the manner described above through substantially the entire pulse time position frame, if necessary, before the busy lock circuit 219 operates to lock up the connector and advise the calling subscriber of the busy condition of all of the lines of the called trunk group.

In order to provide for trunk hunting through a group of consecutive time positions which are positioned in different tens digit levels, facilities are provided in the units digit register 215 for recycling this register each time the register is driven beyond a setting of 10. Simultaneously therewith there is produced a control pulse in the units digit register 215 which is transmitted over the conductor 286 to the tens register advancer 280. The tens register advancer 280 responds to the pulses impressed thereon over the conductor 286 by advancing the setting of the tens digit register 211 by one tens pulse interval each time the units digit register 215 is recycled.

In order to provide for trunk hunting through a group of lines such as the eighth trunk group illustrated in Fig. 27, i.e., wherein some of the lines occur in the last tens digit level and other succeeding lines occur in the first tens digit level, the tens digit register 211 is also provided with facilities for recycling this register after it has been advanced to a setting of 10.

Considering, for example, the operation of the trunk hunting facilities during the above-described call to the line 32, this line is a member of the trunk group including the lines 32–39, inclusive, 30, 41, and 42. The lines 32–39 and 30 are included in the third tens digit level, whereas the lines 41 and 42 are included in the fourth tens digit level. When the two digits "3" and "2" are successively dialed into the connector 12*b*, connector pulses are produced in the time position 63*c* assigned to the line 32 in the manner described above. Trunk marking pulses are produced by the trunk marking pulse generator 56 in this same time position and if busy pulses are also impressed upon the common busy pulse in conductor 52*b* in the time position 63*c*, the coincidence of the connector pulses, busy pulses, and trunk marking pulses causes the units register advancer to advance the setting of the units digit register 215 by one time position so that the connector pulses are shifted to the time position 64c, i.e., the time position assigned to the line 33. Since the line 33 is also marked by trunk marking pulses appearing in the time position 64c, the above-described coincidence may still occur if busy pulses are impressed on the conductor 52 in the time position 64c, thus indicating that the line 33 is also busy. Continued coincidence of the connector pulses, busy pulses, and trunk marking pulses permits the units register advancer to respond to successive trunk hunting drive pulses so that the connector pulses are advanced to the time position 71c, i.e., the time position assigned to the line 30. If the line 30 is also busy the coincidence between the trunk marking pulses, connector pulses, and busy pulses continues and the units register advancer continues to respond to trunk hunting drive pulses. The next trunk hunting drive pulse operates to recycle the units digit register 215 and simultaneously therewith the tens digit register 211 is advanced one setting to the tens pulse time position 75a so that the connector pulses are shifted from the thirtieth time position in each pulse frame to the thirty-first time position, i.e., the time position 62d assigned to the line 41. If the line 41 also tests busy, the connector pulses are again shifted to the time positon 63d, i.e., the time position assigned to the line 42. However, since the line 42 is not marked by a trunk marking pulse, the units register advancer is prevented from responding to further trunk hunting drive pulses and the connector pulses remain in the time position assigned to the line 42 regardless of the idle or busy condition of this line. If the line 42 is idle, the busy test circuit 218 functions in the manner described above to impress a positive potential upon the cut-through conductors 251, 251a and 289 whereupon the connector continues with the placement of the call. On the other hand, if the line 42 also tests busy, the busy test circuit is prevented from operating and the busy lock circuit 219 operates at the end of the busy test interval to block the busy test circuit 218 against subsequent operation and advise the calling subscriber of the busy condition of all of the lines of the called trunk group.

Assuming again that the line 32 is idle when called, when the called line out gate 224 is conditioned for operation through application of the described positive potential to the cut-through conductor 251, it responds to the connector pulses impressed upon the connector pulse conductor 239 by the connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position 63c assigned to the called line 32, whereby very narrow connector signal pulses are released over the conductor 51 to the distributor 15 which are well within the limits of the pulse time position 63c assigned to the called line. However, it will be understood that until ringing of the called line is effected, the above described connector signal pulses supplied to the distributor 15 in the pulse time position 63c are ineffective to establish talking communication with any of the substations associated with the called line. The positive potential applied to the cut-through conductor 251 is also impressed upon the ring trip circuit 221 to enable this circuit to terminate ringing at the proper time and is applied to the code start circuit 268.

When the cut-through potential is impressed upon the conductor 251, the code start circuit 268 is conditioned to respond to the next code start pulse transmitted thereto over the conductor 5 from the code forming circuit 99. The code start circuit 268 is also controlled by the potentials on the conductors 296a and 12e. However, for a non-revertive call the potential on the conductor 296a does not change to its revertive call value and the potential on the conductor 12e does not change since a calling condition is continuously present on the calling line 23. Accordingly, the potential on the conductors 296a and 12e are such that the code start circuit 268 develops a code start potential on the conductors 241 and 268a in response to the first code start pulse after cut-through.

The code start potential developed on the conductor 241 is transmitted to the ringback tone gate circuit in the network 225 and this circuit responds by gating therethrough the interrupted ringback tone signal developed on the conductor 275 in the manner described above. This gated interrupted ringback tone signal is transmitted over the conductor 244 to the calling line out gate circuit 226. The circuit 226 is open for non-revertive calls, since no change in potential is produced on the conductor 296a. Accordingly, the interrupted ringback tone signal is modulated on the connector signal pulses released by the circuit 226 in the time position 64b assigned to the calling line 23 and is transmitted by way of the distributor 15 and the line circuit 10 to the calling line 23 to inform the calling subscriber that the called line is being rung. At the same time, the interrupted ringback tone signal is rectified and employed to control the amplitude of the connector signal pulses released by the called line out gate circuit 224 in the time position 63c assigned to the called line 32. The line ringing facilities in the line circuit 16 respond to the above described change in amplitude of the called line connector signal pulses by transmitting a ringing current over the called line 32 in the manner described in detail above in connection with a revertive call. Ringing of the substations A′ and B′ persists until either the call is answered at the called substation B′, or the call is abandoned at the calling substation A, or the ringing timeout circuit 299 functions to terminate ringing.

Assuming that the non-revertive call is answered at the substation B′ before the end of the ringing timeout interval, the loop circuit including the conductors of the line 32 is closed to the line circuit 16 and the multiplexer 11 responds thereto by developing multiplexer pulses 83c in the time position 63c which are impressed upon the calling and called line in gate circuits 207 and 223 in the connector 12b. Although the circuit 207 is held open for non-revertive calls, due to the above described combination of potentials on the conductors 251 and 296a, the multiplexer pulses 83c are not in coincidence with the finder gate pulses impressed upon the circuit 207 over the conductor 12d and hence are not repeated through the circuit 207. However, in the called line in gate circuit 223, the multiplexer pulses 83c occur in time coincidence with the connector pulses impressed upon the circuit 223 over the conductor 239c from the connector pulse forming circuit 217.

The circuit 223 is also controlled by the code start potential developed on the conductor 268a by the code start circuit 268 to block the circuit 223 during the initial stages of a revertive call and prevent ring trip prior to answering of the revertive call. However, in the illustrated non-revertive call, the code start potential on the conductor 268a is produced prior to transmission of a ringing current over the called line and no multiplexer pulses are produced in the time position 63c until the called line answers in response to ringing so that the circuit 223 is able to repeat the multiplexer pulses 83c to the called line reconstructor circuit 222, over the conductor 254. The circuit 222 is controlled in the same manner as the circuit 223 by the signals developed on the conductors 239c and 268a and hence is conditioned to respond to the multiplexer pulses 83c transmitted thereto over the conductor 254 by detecting the call answering signal carried thereby, the detected call answering signal being transmitted over the conductor 252 to the ring trip circuit 221. It will be noted that by controlling the circuits 222 and 223 in accordance with the code start potential developed by the code start circuit 268, so that these circuits are not opened prior to initiation of ringing, the calling subscriber, on a non-revertive call, is prevented from listening in on a conversation being held on the called line when the called line is busy, while at the same time the above described feature of preventing ring trip prior to answering is provided for revertive calls.

The ring trip circuit 221 is enabled by the cut-through potential on the conductor 251 and responds to the call answering signal on the conductor 252 by developing a ring trip potential on the conductor 253. This ring trip potential is employed to control the circuits 282, 265, 284, 285 and the ringback tone gate circuit in the network 225 in the manner described above in connection with a revertive call so that the ringing operation is terminated and the conversation timing facilities are conditioned for operation. The ring trip potential on the conductor 253 is also transmitted to the revertive call tone gate circuit 297 and the revertive call test circuit 296. However, the circuit 297 is not enabled by the potential on the conductor **296*a* and hence is prevented from gating a revertive tone signal therethrough in response to the ring trip potential developed on the conductor 253. Also, the +B switching circuit 201 in the finder 12*a* is provided with facilities for preventing a change in potential on the revertive call hold conductor 12*f* in response to the ring trip potential transmitted to the circuit 296 so that the finder 12*a*** continues to operate in a normal manner for the duration of the non-revertive call.

Following the described operations in the connector **12*b*, a two-way talking or communication circuit is fully established between the calling substation A and the party line called substation B'. Thus, voice or other signals developed at the substation A and transmitted over the line 23 to the line circuit 10 serve to vary directly the bias voltage impressed upon the gate circuit of the multiplexer 11 over the conductor 53*a* in accordance with the instantaneous amplitude of such signals. As a consequence, the multiplexer pulses 84*b* released by the multiplexer 11 over the conductor 50 to the finders and connectors of the system in the pulse time position 64*b* are modulated in accordance with the voice or other signals developed at the calling substation A. These signal modulated multiplexer pulses cannot be accepted by any finder of the system other than the finder 12*a* or any connector of the system other than the connector 12*b* because of the busy pulses fed to the busy pulse out conductor 52*a* from the circuit 202. In the finder 12*a*, the multiplexer pulses 84*b* maintain the +B switching circuit 201 operated to hold the link 12 associated with the line circuit 10. The signal modulated multiplexer pulses 84*b* are also transmitted through the calling line in gate circuit 207 and over the conductor 255 to the calling line reconstructor circuit 208, which circuits are not blocked for non-revertive calls, where they occur in time coincidence with the finder gating pulses impressed upon the reconstructor circuit over the conductor 12*d* in the pulse time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the outgate circuit 224 in the pulse time position 63*c* assigned to the called line. These modulated signal pulses are transmitted to the distributor 15 over the conductor 51 wherein the signal components of the connector signal pulses are detected and released by the distributor 15 to the line circuit 16. In the line circuit 16, the detected signals are transmitted over the line 32** to the called substation B' where they are audibly reproduced by the receiver of the telephone instrument provided at this substation.

Voice signals developed at the called party line substation B' and transmitted over the line 32 to the line circuit 16 cause the bias potential delivered over the conductor **45*a* to the gate circuit of the multiplexer 11 which corresponds to the line circuit 16 to vary in exact accordance therewith. As a consequence, the voice signals are modulated upon the multiplexer pulses 83*c* occurring within the pulse time position 63*c* and released through the gate circuit of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy pulse out conductor 52*b* in the time position 63*c* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling line in gate circuit 207, which circuit is held open for non-revertive calls, and the called line in gate circuit 223 which is enabled after code start, and these multiplexer pulses are repeated by the circuit 223 over the conductor 254 to the called line reconstructor circuit 222, this latter circuit also being enabled after code start in the manner described above. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83*c*. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12*d*. The voice signal modulated pulses developed in the calling line out gate circuit 226 are supplied to the distributor 15 over the conductor 51 wherein the signal components thereof are detected and released to the line circuit 10. In the line circuit 10, the detected signals are transmitted over the line 23** to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation.

The conversation timing facilities are prepared by the ring trip potential developed on the conductor 253 and function in substantially the same manner as described heretofore in connection with a revertive call to develop a warning tone signal a predetermined time interval before the end of the conversation timing period. However, since both the out gate circuits 224 and 226 are open for non-revertive calls, this warning tone signal is transmitted to both the calling and called subscribers on their respective lines. Thus, the warning tone circuit 284 develops a warning tone signal which is transmitted over the conductor 244 to the calling line out gate circuit 226 wherein this signal is modulated upon pulses gated by this circuit in the time position 64b assigned to the line 23 and the signal carried by these pulses is transmitted by way of the distributor 15 and the line circuit 10 to the line 23 to inform the calling subscriber that the nonrevertive call will be terminated shortly. At the same time the warning tone signal is transmitted by way of the conductor 294, the out gate circuit 224, the distributor 15 and the line circuit 16 to the line 32 so that the called subscriber is similarly apprised.

When the conversation timing period is over, the conversation timing control circuit 285 develops a control pulse on the conductor 12g which is transmitted back to the +B switching circuit 201 in the finder 12a and effects release of the link 12 in a manner similar to that described above in connection with a revertive call. However, on a non-revertive call the talking path between the calling and called lines is broken when the link 12 is released so that further conversation is impossible. Also, since the calling and called lines have different time positions assigned thereto on a non-revertive call, and a calling condition exists on both of these lines, both of these lines call in new linkage and a dial tone signal is returned to both the calling and called subscribers to tell them that they should hang up.

In describing the manner in which the system components 10, 11, 12a, 12b, 15 and 16 are partially or wholly released upon termination of the non-revertive call by either party and independently of the above-described conversation timing facilities, it may be assumed first that the called party at the party line substation B′ is the first to hang up. In such case, the bias potential delivered from the line circuit 16 over the conductor 45b to the gating circuit of the multiplexer 11 individually assigned to the line circuit 16 is restored to its normal value when the called line loop circuit is opened, with the result that multiplexer pulses 83c appearing in the pulse time position 63c are no longer transmitted over the conductor 50 to the finders and connectors of the system. Such termination of multiplexer pulse transmission in the time position 63c to the finders and connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63c assigned to the called line continue to be fed to the busy pulse out conductor 52b from the busy gate circuit 220 of the connector 12b, thereby to prevent substations associated wtih the called line 32 from originating a call or accepting an incoming call. This, of course, means that if the subscriber at any one of the substations associated with the called line picks up his receiver or hand set before the connection is released at the calling substation A, a two-way talking circuit between the calling and called lines is reestablished.

When the calling line subscriber disconnects by replacing the receiver or hand set at the substation A on its supporting hook or cradle, the loop circuit extending by way of the line 23 to the line circuit 10 is opened, with the result that the bias potential applied over the conductor 53b to that gate circuit of the multiplexer 11 which individually corresponds to the line circuit 10 is restored to its normal value. As a consequence, this gate circuit is biased to terminate the transmission of multiplexer pulses 84b occurring in the pulse time position 64b over the conductor 50 to the various finders and connectors of the system. When the transmission of multiplexer pulses 84b to the pulse input circuit 200 of the finder 12a is thus terminated, this circuit is rendered inactive to repeat pulses to the finder circuits, 201, 203, and 204. After a predetermined time interval, measured by the overall time constant of the +B switching circuit 201, this circuit responds to cessation of multiplexer pulse transmission thereto by removing the operating anode potential from the conductor 12c. As a consequence, the tens and units coincidence tube circuits 203 and 204 of the finder 12a are restored to normal to interrupt the production of finder gate and busy pulses in the pulse time position 64b by the finder pulse forming circuit 205. Thus, the application of pulses to the combining circuit 202 and hence to the busy pulse out conductor 52a in the pulse time position 64b assigned to the calling line 23 is arrested. Removal of the operating anode potential from the conductor 12c has the effect of rendering the self-allotting circuit 206 of the finder 12a operative to reassociate the link 12 with another calling line to handle another call. Cessation of busy pulse transmission to the busy pulse out conductor 52a in the pulse time position 64b has the effect of marking the calling line 23 as idle to permit initiation of a second call on this line or seizure of the line on a call incoming thereto.

Removal of operating anode potential from the conductor 12c also has the effect of restoring the controlled circuits of the connector 12b to normal, thereby to condition the connector 12b to handle another call. Concurrently therewith, connector pulse production on the conductor 239 in the pulse time position 63c assigned to the called line 32 is terminated to arrest the application of busy pulses to the common busy pulse out conductor 52a by the busy gate circuit 220 in this pulse time position. Thus, the called line is unguarded to free the same for use in initiating another call or accepting a call incoming thereto. It will be noted that normalizing of the identified circuits of the connector 12b has the effect of restoring all components of this connector to the condition which prevailed at the time the link 12 was taken into use to handle the call just described. It will be noted that if the calling subscriber is the first to release the connection, i.e., hang up, the link 12 is immediately released under the control of the +B switching circuit 201 embodied in the finder 12a. However, in such case, the line circuit 16 associated with the called line 32 immediately assumes a setting indicating that the line 32 is calling, with the result that a link is reassigned to the called line and the usual dial tone signal is returned to the called subscriber. This signal has the effect of indicating to the called subscriber that the connection has been released at the calling substation and that he should hang up.

DETAILED DESCRIPTION OF THE SYSTEM

Figures 1, 5:
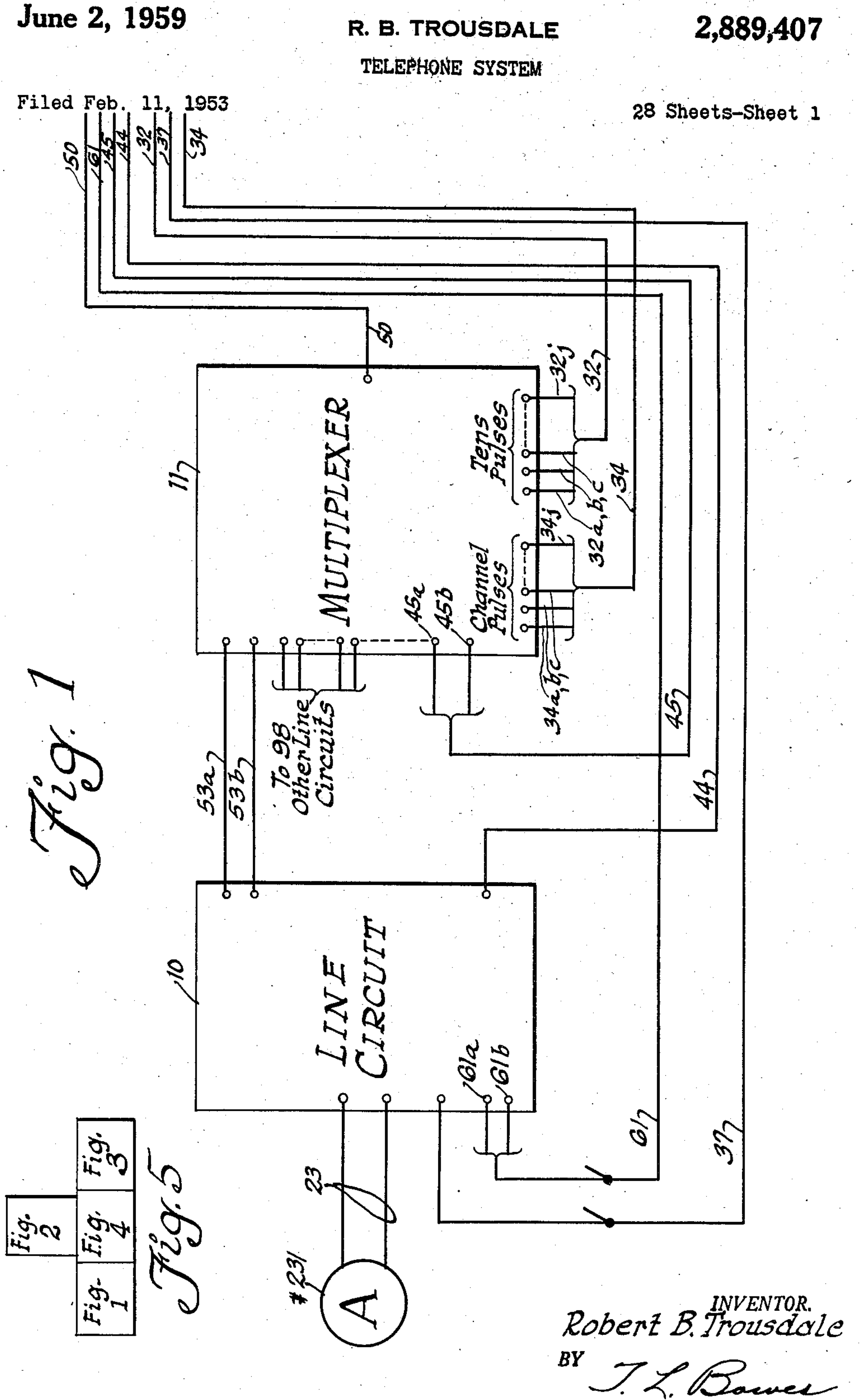

In considering the detailed circuitry of the system components described generally above, operation of these components will be analyzed insofar as possible in terms of the functions which they perform in establishing the above-described revertive call connection between the substations A′ and B′ in response to a call initiated at the substation A′, and in establishing the above-described non-revertive call connection between the substation A and the substation B′ in response to a call initiated at the substation A. Before considering the details of the system components, however, it is pointed out generally that corresponding reference characters have been used throughout the drawings to identify corresponding circuit elements of the system. It is also pointed out that all pulse carrying conductors, such for example, as the signal pulse transmission conductors 50 and 51, are in the form of coaxial cables or transmission lines having low pulse attenuating properties at the pulse frequencies employed. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuit, namely, functions which will be readily understood by those skilled in the art have not been identified in the drawings or referred to in the following description of the system components.

As used in this specification, the terms "electronic" and "electronic means" refer to and are intended to define means comprising electron conducting devices such, for example, as electron tubes, gas tubes, crystal rectifiers, semi-conductors and the like, together with interconnecting circuit components therefor, and to exclude all electro-mechanical devices embodying moving mechanical parts such, for example, as relays, stepping switches and the like.

Also, in order to reduce the complexity of this specification, those system components which are substantially identical to the corresponding system components of my co-pending applications, Serial No. 301,215, filed July 28, 1952, and Serial No. 301,087, filed July 26, 1952, which are assigned to the same assignee as the present invention, will be only briefly described in this specification, reference being had to these co-pending applications for a complete and detailed description of these system components. However, in order to facilitate an understanding of all of the system components in the revertive call system of the present invention, these components will be discussed in such detail as is necessary to bring out the functions of these units in this system.

*Common equipment 17*

The component circuits of the common equipment 17, with the exception of the timing pulse generator 57, the revertive call busy tone generator **29*e* and the revertive call tone generator 29*g*, may all be substantially identical to the corresponding component circuits described in detail in my co-pending application, Serial No. 301,215, identified above, and reference may be had to this copending application for a complete and detailed description of these circuit components. However, it is pointed out that different phase shifter and pulse former circuits may be employed to drive the channel pulse commutator and to provide commutator drive pulses for the connectors of the system so that the phase relationships of these pulses may be adjusted independently as described in detail in my Patent 2,769,085, issued October 30, 1956, and a copending application of Frank A. Morris and Robert B. Trousdale Serial No. 326,213, filed on December 16, 1952, both of which applications are assigned to the same assignee as the present invention. In the above identified applications the pulses supplied to the connectors of the system are referred to as linkage sampling pulses and may be phased differently than the commutator drive pulses supplied to the circuit 22. It will also be understood that a code ringing system, such as shown and described in detail in my copending application Serial No. 257,712, identified above may be employed instead of the illustrated harmonic ringing system, in which case the components 97, 98, 99, 100 and 101 in the common equipment 17 are replaced by the components identified by the reference characters 27, 27*a* and 60** in the copending application Serial No. 257,712 identified above.

*Timing pulse generator 57*

Figure 21:
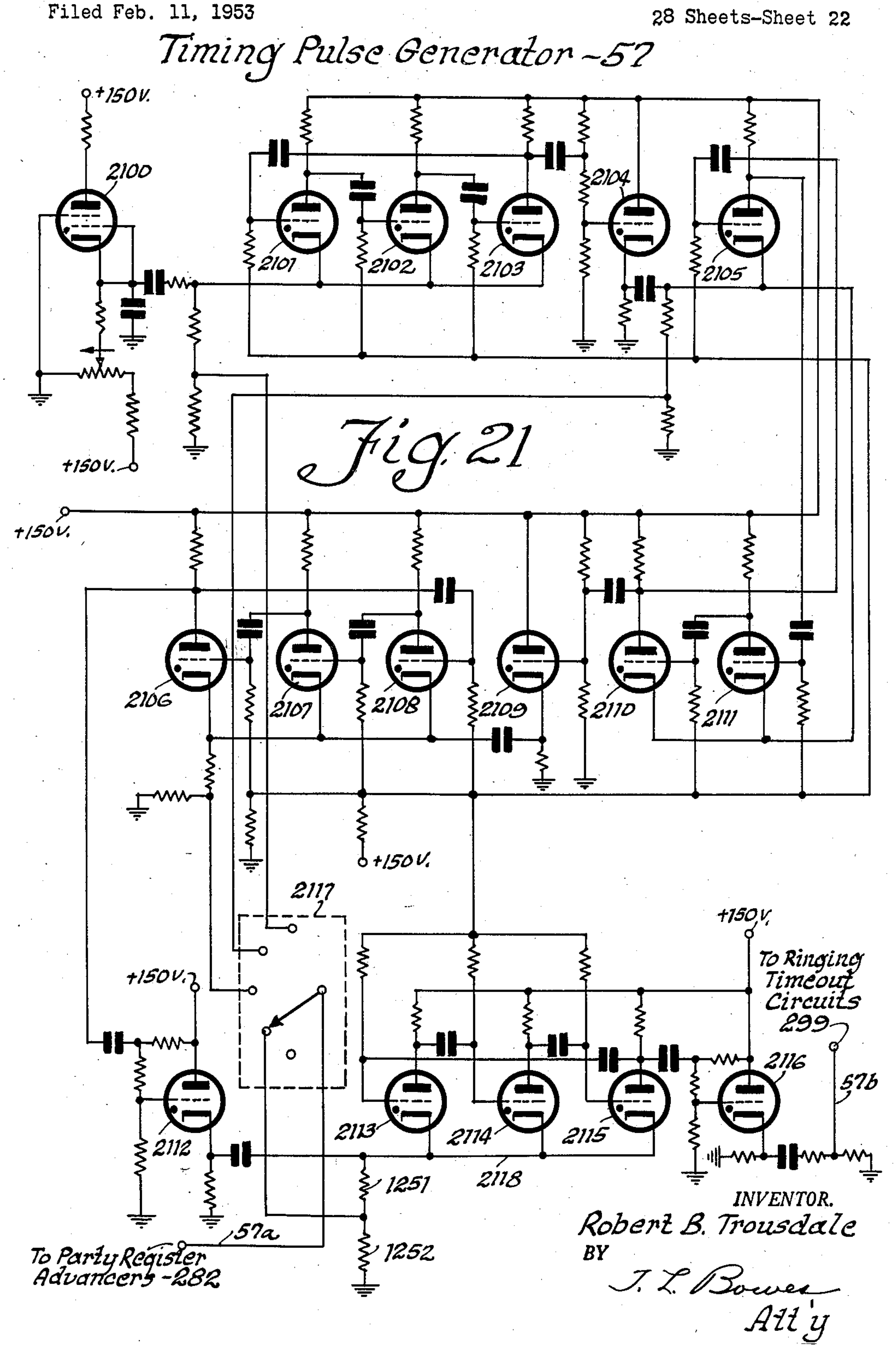
Figure 22:
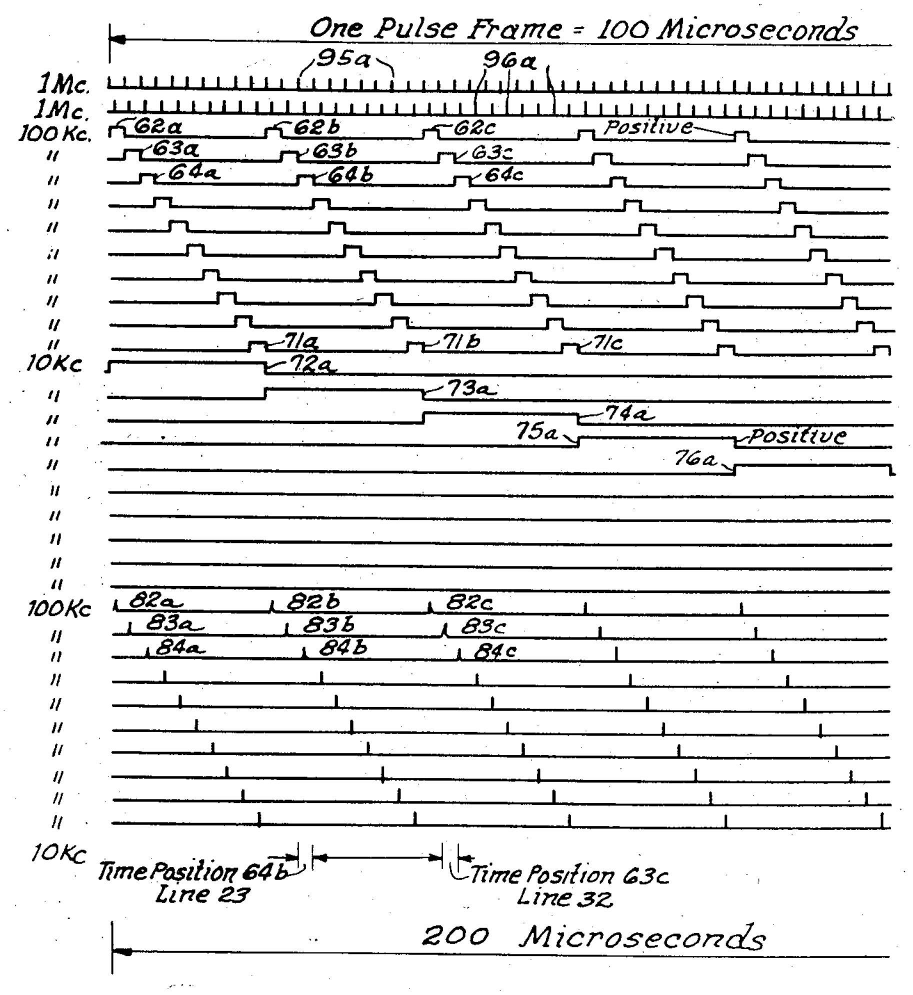
Figure 23:
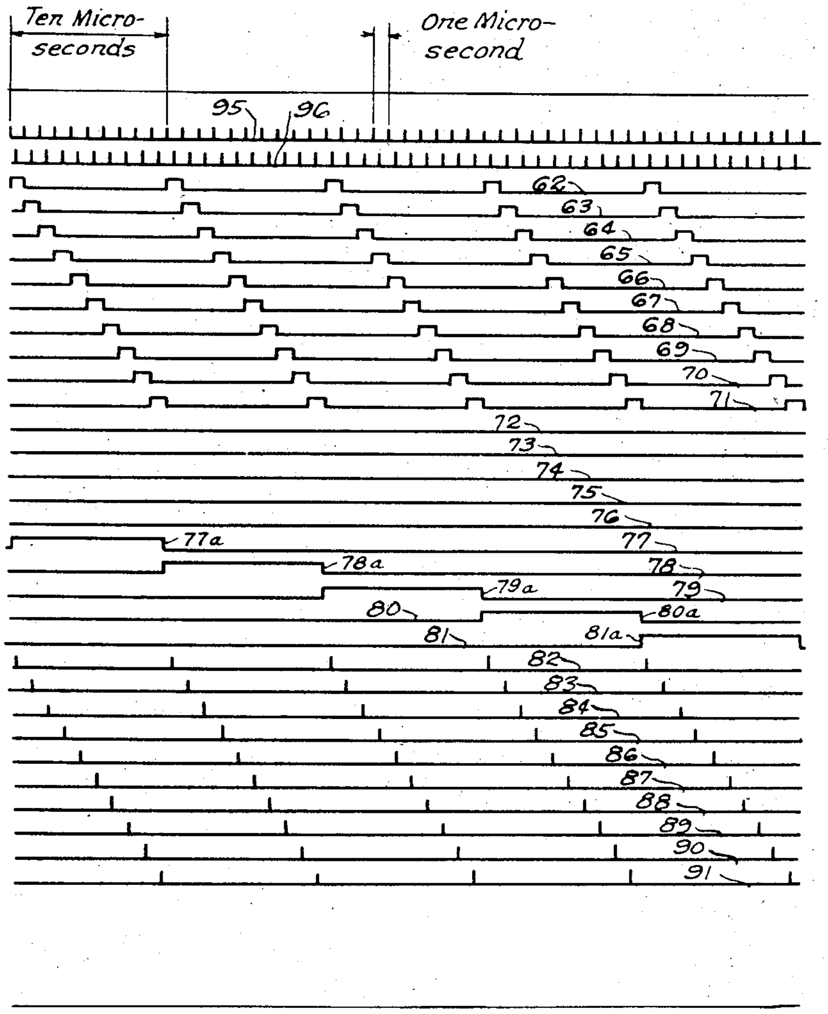
Figure 24:
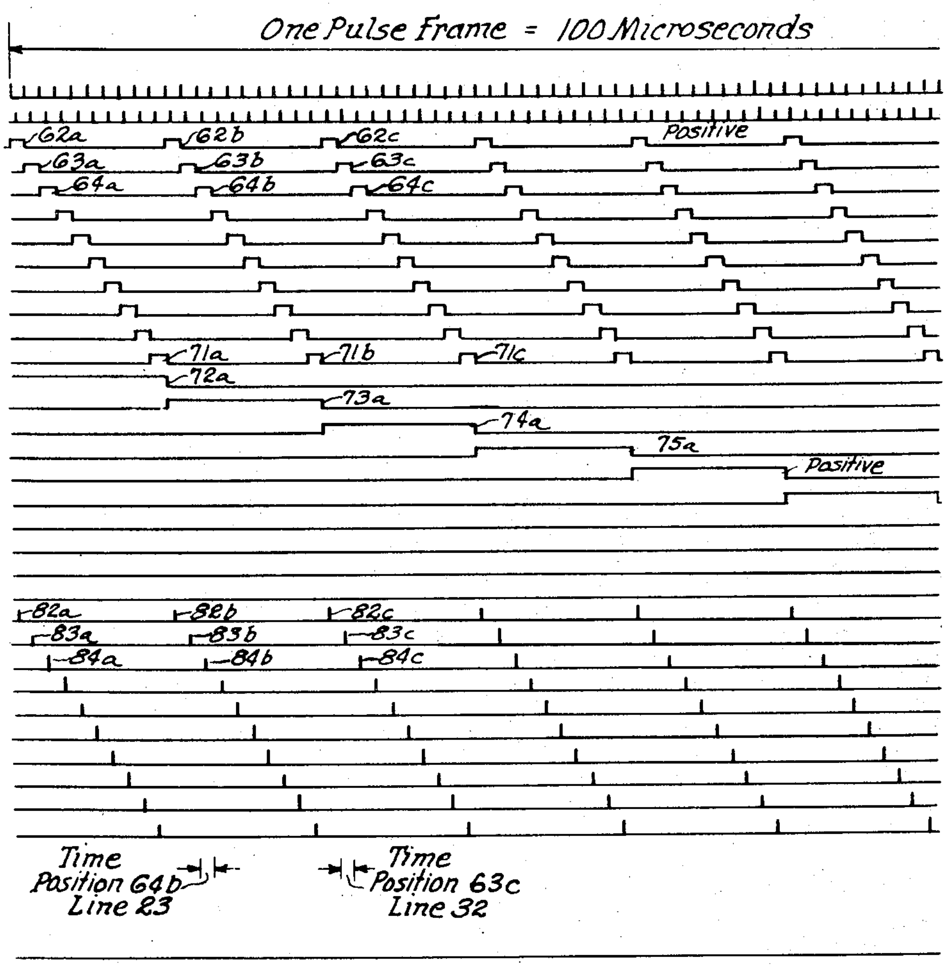
Figure 25:
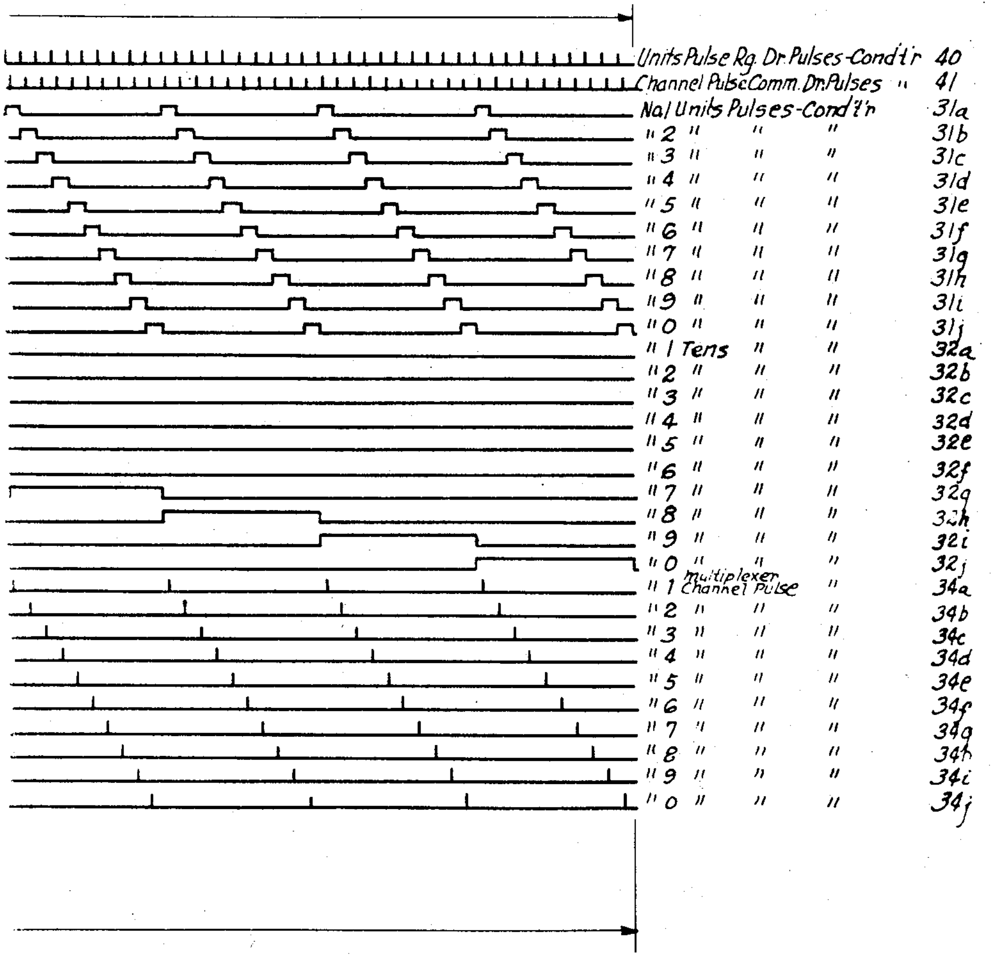

As discussed briefly in connection with the general description of the system, this generator, which is shown in detail in Fig. 21 of the drawings, performs the functions of developing conversation timing pulses which are supplied to all of the connectors of the system over the conductor **57*a* and also develops ringing timeout pulses which are supplied over the conductor 57*b* to all of the connectors in the system. Insofar as the development of conversation timing pulses by the generator 57 is concerned, this generator is substantially identical to the corresponding circuit shown and described in detail in my copending application Serial No. 301,215, identified above, and reference may be had to this application for a complete and detailed description of this portion of the generator 57. However, in order to provide ringing timeout facilities for terminating ringing on both revertive and nonrevertive calls, the generator 57** is also adapted to provide ringing timeout pulses which preferably occur at the rate of one pulse every two minutes.

More specifically, the timing pulse generator 57 includes a base frequency oscillator including the tube 2100 which produces output pulses having a frequency of .675 cycle per second. The base frequency pulses are supplied to a first ring circuit including the tubes 2101, 2102 and 2103 wherein the pulses are divided by three and a pulser tube 2104 is employed to develop pulses at one-third of the base frequency. These pulses are then supplied to a second ring circuit including the tubes 2105, 2111 and 2110 wherein a second frequency division of three is provided and the output of this ring circuit is supplied to a pulser tube 2109 which produces pulses at one-ninth of the base frequency. The output of the pulser tube 2109 is then supplied to a third ring circuit including the tubes 2106, 2107 and 2108 and the output of the third ring circuit is supplied to a pulser tube 2112 which produces pulses at one-twenty seventh of the base frequency, or one pulse approximately every 40 seconds. A selector switch 2117 is provided to select the output of any one of the above described ring circuits, although in actual practice the conductor **57*a* is normally connected to the output of the tube 2112 so that pulses are produced on the conductor 57*a*** at the rate of one pulse every 40 seconds.

In order to provide ringing timeout pulses the output of the pulser tube 2112 is also coupled to the ring drive conductor 2118 of a fourth ring circuit including the tubes 2113, 2114 and 2115, and this ring circuit provides an additional frequency division of three so that pulses are produced in this ring circuit at the rate of one pulse every two minutes. These pulses are supplied to a pulser tube 2116 which develops positive ringing timeout pulses on the conductor **57*b* at the rate of one pulse every two minutes. The operation of the ring circuit including the tubes 2113, 2114 and 2115 is identical to that of the other ring circuits described in detail in my copending application Serial No. 301,215, identified above, so that a detailed description of this ring circuit and the associated pulser tube 2116** is considered unnecessary herein.

*Revertive call busy tone generator 29e*

It will be recalled from the general description of the system that this generator is provided for the purpose of developing a revertive call busy tone signal which is transmitted to the calling party on a revertive call to inform him that he should hang up to permit completion of the revertive call. Preferably, this revertive call busy tone is of a different frequency from the normal, or nonrevertive busy tone signal so as to be distinguishable therefrom. Thus, if the revertive call busy tone signal is made distinctive from the normal busy tone the calling party will know that the revertive call is being successfully carried out and will not merely hang up the receiver under the impression that the called substation is busy. This is particularly important in the present application wherein uniform directory numbering is employed since the calling party may not be aware that the called party is on his own line. However, it will be understood that the normal busy tone signal may be employed instead of a distinctive revertive call busy tone signal, in which case the output conductor 46 of the busy tone generator **29*a* would be connected to the revertive call busy tone gate circuit 298 in each of the connectors 12***b*, 13*b*, 14*b*, etc., instead of the output conductor 49*a* of the illustrated revertive call busy tone generator 29*e*.

Insofar as the circuit details of the generator 29*e* are concerned, this generator may be identical to the circuit arrangement of the conversation timing warning tone generator 58, which generator is shown and described in detail in my copending application Serial No. 301,215, identified above, and reference may be had to this application for a detailed description of a suitable tone generator circuit. However, it will be understood that the frequency of the revertive call busy tone generator 29*e* may, if desired, be different from that of both of the generators 58 and 29*a*. In the alternative, the conversation timing warning tone generator 58 may be employed as a source of revertive call busy tone signal in which case the output conductor 58*a* of this generator may be connected to the revertive call busy tone gate circuits 298 in each of the connectors of the system. It will also be understood that any other suitable generator circuit arrangement may be employed to provide the requisite revertive call busy tone signal.

*Revertive call tone generator 29g*

It will be recalled from the general description of the system that this generator is provided for the purpose of developing a revertive call tone signal which is transmitted over the revertive calling line for a short time interval when the revertive call is answered to inform the answering party that the call is revertive and that he should remain off hook until the other party also comes on the line. The generator 29*g* may also be of the same circuit arrangement as the ton generator 58 and reference may be had to my co-pending application Serial No. 301,215, identified above, for a detailed description of a suitable generator circuit. The frequency or characteristics of this revertive call tone signal may be distinctive from the other tone signals of the system, or in the alternative, any one of the tone generators described above may be employed as a source of revertive call tone signal in which case the output conductor of the selected tone generator would be connected to the revertive call tone gate circuits 297 in each of the connectors of the system.

*Substations A′–J′, inclusive*

The substantions respectively terminating the various lines of the system, including party line substations as well as private line substations, are substantially identical in arrangement and these substations may be identical to the corresponding system components shown and described in detail in my co-pending application, Serial No. 301,215, identified above, reference being had to this co-pending application for a detailed description of these substations. In this connection, it will be understood that in the illustrated system wherein harmonic party line ringing is employed, the private line substation A is assigned a party line ringing digit of "1" to provide uniform directory numbering and is provided with harmonic ringing facilities which will respond to the frequency of the code #1 harmonic ringing signal of the system.

*Line circuits 10 and 16*

As previously indicated, the two identified line circuits are respectively utilized to terminate the private line 23 and the party line 32 at the exchange end of the system. These two line circuits, as well as the line circuits terminating the other lines of the system, are identical in circuitry and mode of operation and are substantially as shown and described in detail in my co-pending application, Serial No. 301,215, identified above, and reference may be had to this application for a detailed description of these line circuits.

It will also be understood that in the event a carrier ringing system is employed, such as shown and described in detail in my co-pending application, Serial No. 326,453 filed on December 17, 1952, and assigned to the same assignee as the present invention, the line circuits of the system should be provided with ringing control facilities which respond to such a carrier wave ringing system, as described in detail in my co-pending application, Serial No. 326,453, identified above. In such case a ringing carrier generator, identified by the reference character 29*f* in my co-pending application, Serial No. 326,453, identified above, would be employed in the common equipment 17 and a ringing carrier modulator circuit identified by the reference character 300 in my co-pend- would be employed in the connectors of the system, as described in detail in this co-pending application.

*Multiplexer 11*

As pointed out in the general description of the system, this circuit is provided for the general purpose of sampling control and intelligence signals developed on calling and called lines of the system in the time positions of each pulse frame individually assigned to the lines from which the signals are respectively derived and for transmitting multiplexer pulses modulated with the sampled control or intelligence signals over the multiplexer output conductor 50 to the finder-connector links 12, 13 and 14 of the system. The multiplexer circuit is capable of sampling signals appearing on each of the one hundred lines of the system at a sampling repetition rate of ten kilocycles.

Figures 3, 20:
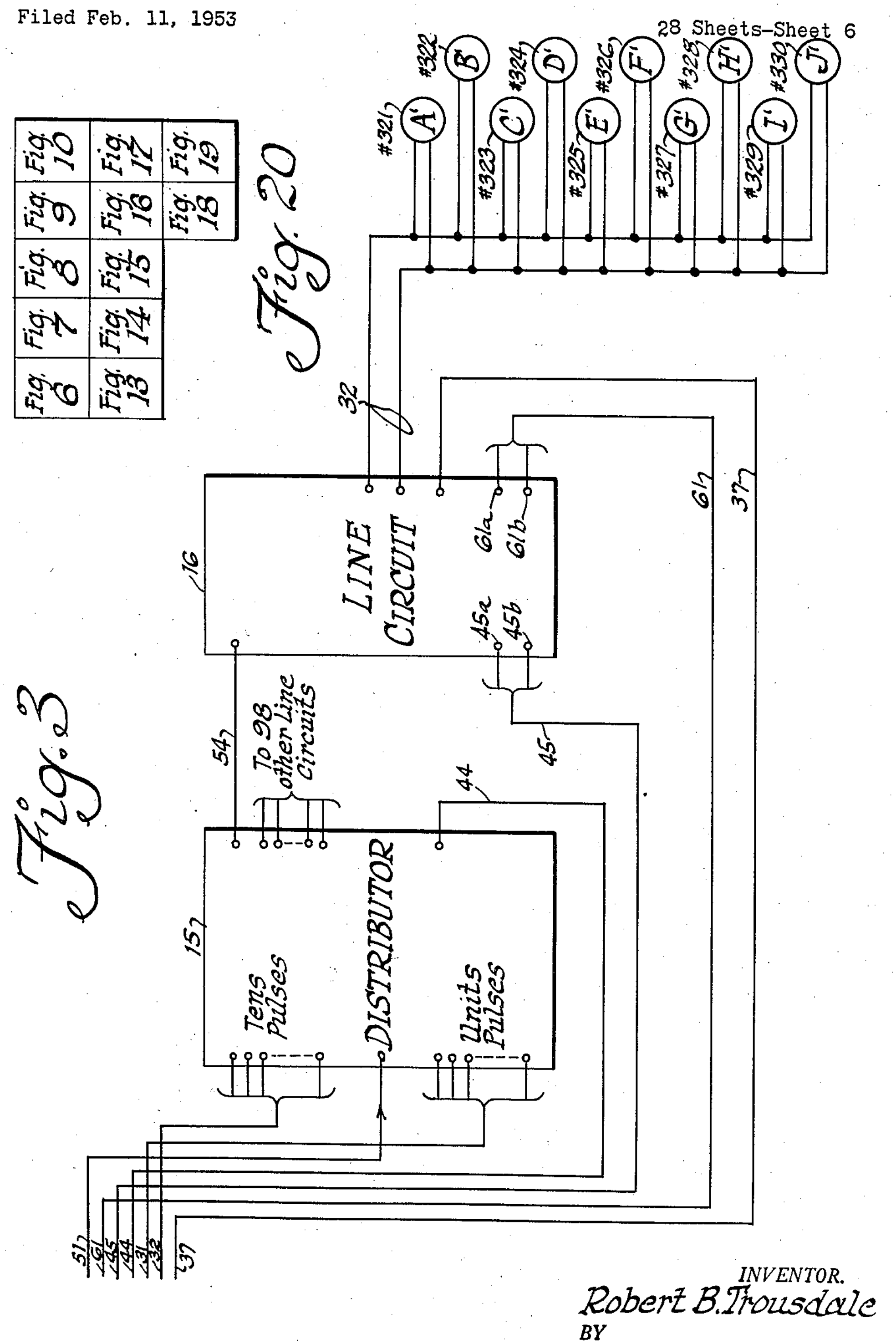
Figure 4:
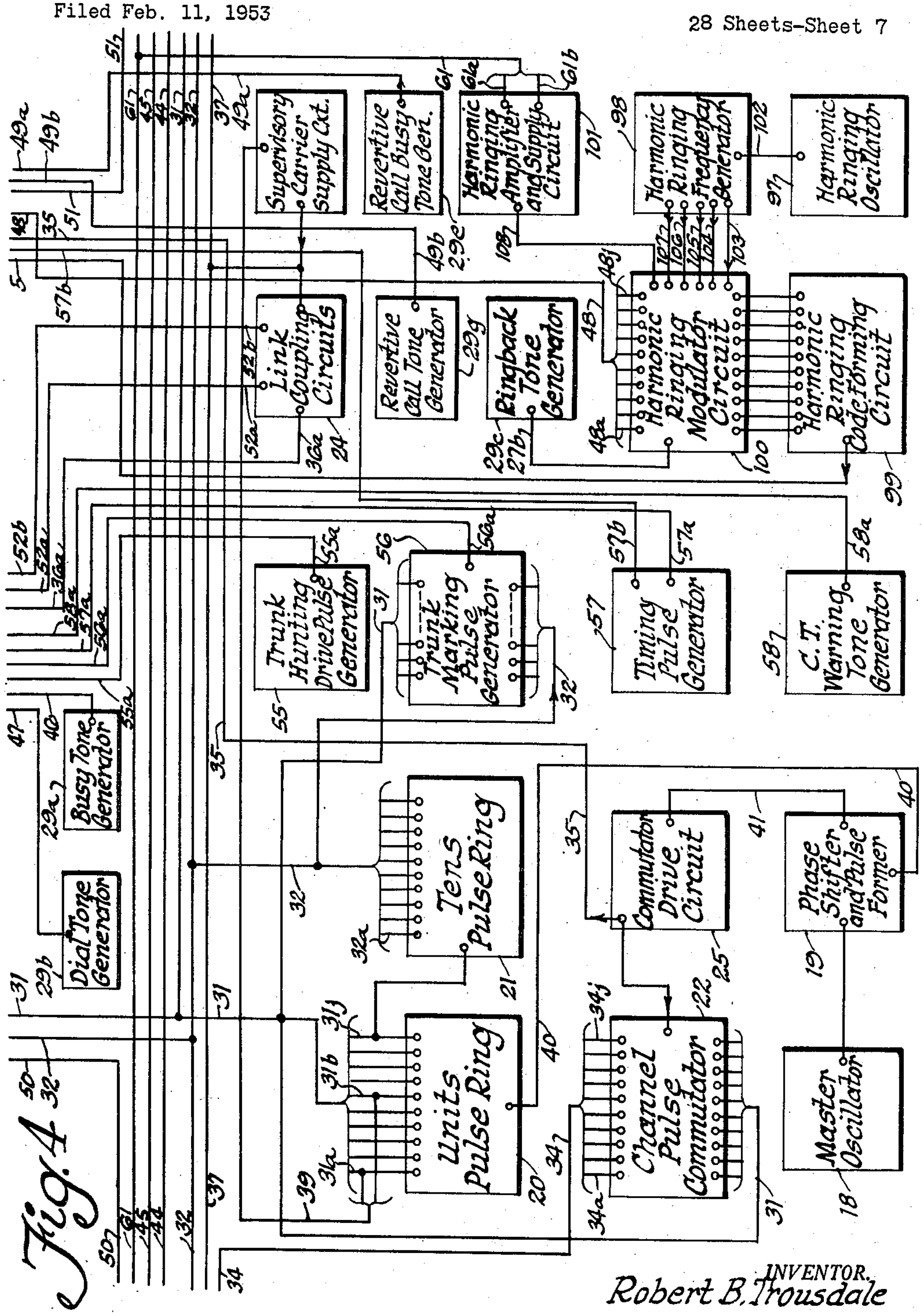

The multiplexer 11 may be identical to the corresponding system component described in the Patent No. 2,773,934, issued December 11, 1956, identified above, or my Patent No. 2,773,935, issued December 11, 1956, and assigned to the same assignee as the present invention. However, it will be understood that a given type of multiplexer is designed to operate with the intelligence and supervisory signal channels of a given type of line circuit. Thus, the type of line circuit disclosed in Patent No. 2,773,934, is adapted to supply the intelligence and control signals over the same conductor to the corresponding gate tube of the multiplexer 11, whereas in the Patent No. 2,773,935, identified above, the intelligence and control signals are supplied over separate paths to separate control grids of the corresponding gate tube in the multiplexer 11. Since the intelligence and supervisory signal channels of the line circuits 10 and 16, shown in Figs. 1 and 3 of the present invention, are of the latter type, it will be understood that a multiplexer of the type shown in Patent No. 2,773,935, is to be used with these line circuits. However, it will be understood that either type of line circuit and multiplexer combination may be employed insofar as the revertive call system of the present invention is concerned.

*Finder 12a.*

As generally explained heretofore, the finders 12*a*, 13*a* and 14*a* of the system of the present invention are provided with novel facilities for setting up a revertive call connection between different substations associated with the same line. More specifically, the finder 12*a* is provided with facilities for responding to a revertive call hold signal transmitted thereto over the conductor 12*f* from the connector 12*b* by remaining operatively associated with the revertive calling line even though a calling condition does not exist on this line. Also, the finder 12*a* is provided with facilities for transmitting a revertive ring start signal over the conductor 12*e* to the connector 12*b* in response to the transmission of a first disconnect signal over the calling line to condition the connector 12*b* for transmission of a revertive ringing signal over the revertive calling line.

Figure 2:
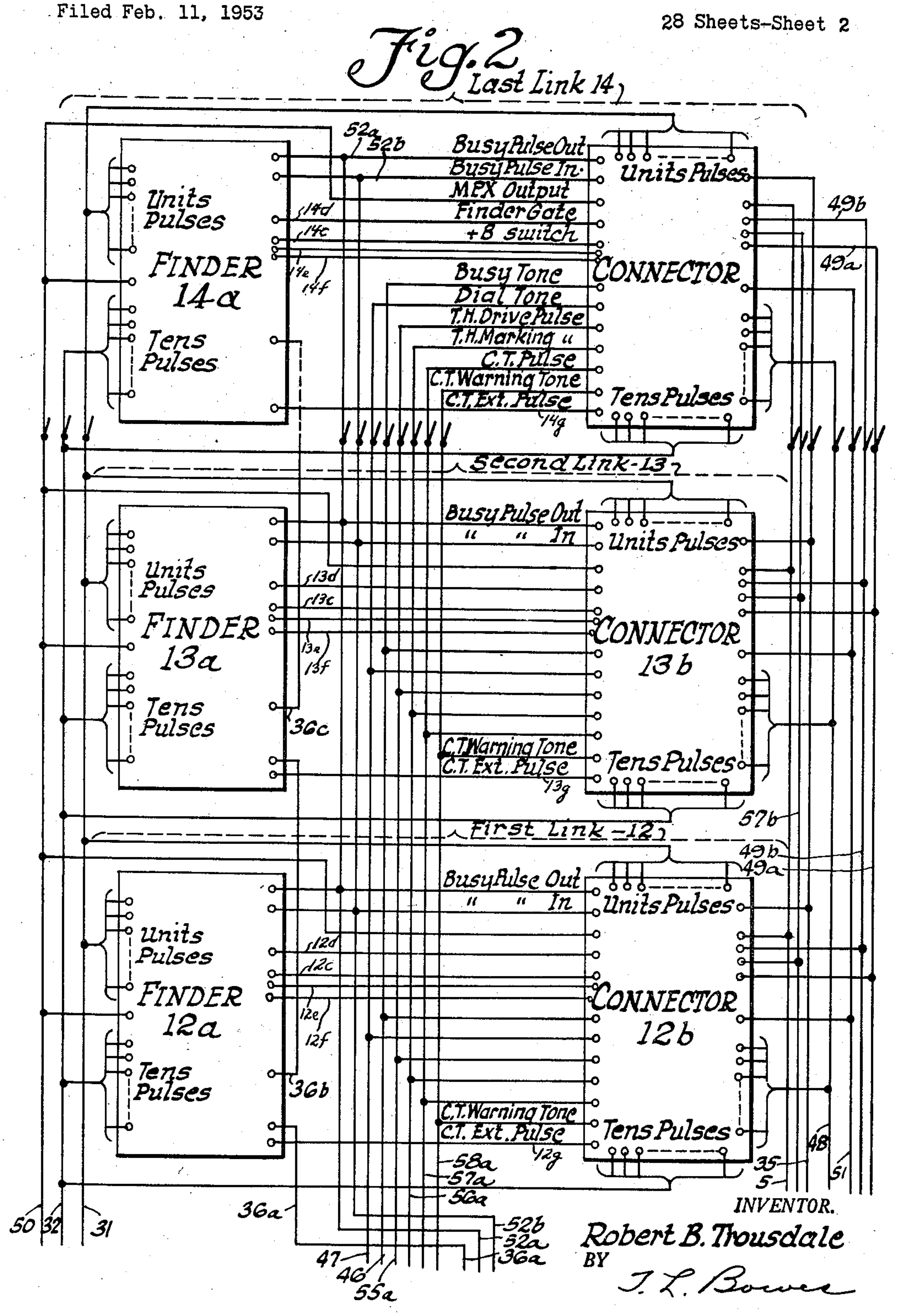
Figure 2A:
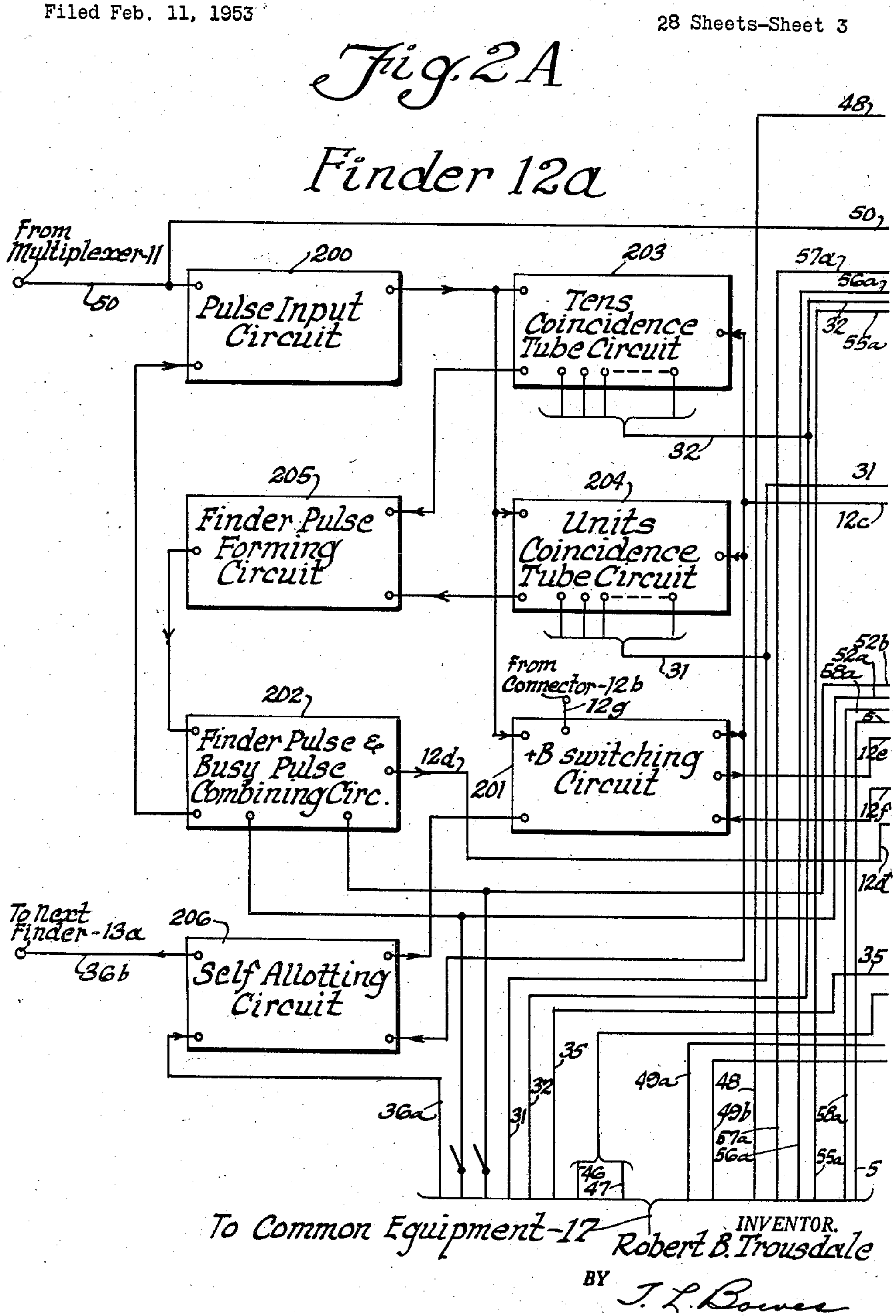
Figure 18:
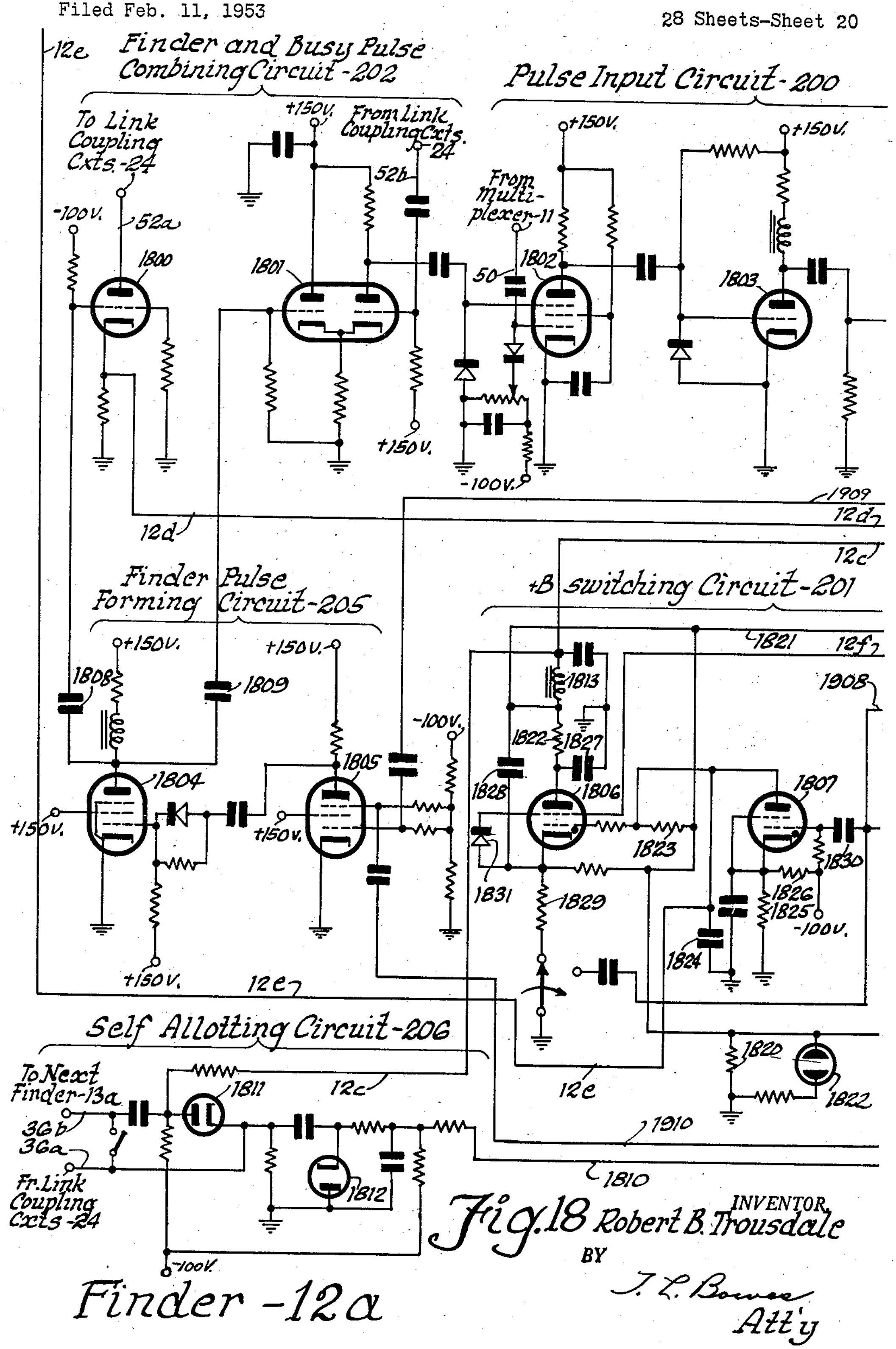

As previously explained in connection with Fig. 2A of the drawings, the finder 12*a*, which is shown in detail in Figs. 18 and 19 of the drawings, comprises a pulse input circuit 200, a +B switching circuit 201, a finder pulse and busy pulse combining circuit 202, a tens coincidence tube circuit 203, a units coincidence tube circuit 204, a finder pulse forming circuit 205 and a self-allotting circuit 206. More specifically, with reference to Figs. 18 and 19 of the drawings, the pulse input circuit 200 comprises a finder control gate tube 1802, an inverter tube 1803 and a cathode follower output tube 1900, which are connected in tandem in the order named and are arranged to impress multiplexer pulses gated therethrough upon a common output conductor 1908. These multiplexer pulses are distributed over the conductor 1908 to the input terminals of the tens coincidence tube circuit 203, the units coincidence tube circuit 204 and the +B switching circuit 201 in parallel.

In order to provide the above-described revertive call facilities, the +B switching circuit 201 is jointly controlled by the multiplexer pulses gated thereto from the pulse input circuit 200 over the conductor 1908, the revertive call hold signal transmitted thereto over the conductor **12*f* from the connector 12*b*, and the allotting signal developed by the circuit 206 and transmitted to the circuit 201 over the conductor 1810, and responds to these potentials in a manner described in more detail hereinafter by developing a +B switching potential on the conductor 12*c*. The circuit 201 comprises a +B switch tube 1904, a +B switch timing or discharge tube 1807 and a +B switch extinguishing tube 1806. The self-allotting circuit 206 comprises the diodes 1811 and 1812 and responds to an allotting signal developed on the conductor 36*a* in the link coupling circuits 24 by enabling the finder 12*a* by means of the above-described potential produced on the conductor 1810 and also diverts the supervisory carrier signal appearing on the conductor 36*a* over the conductor 36*b* to the next finder 13*a*** to enable this finder to handle the next call.

Figure 19:
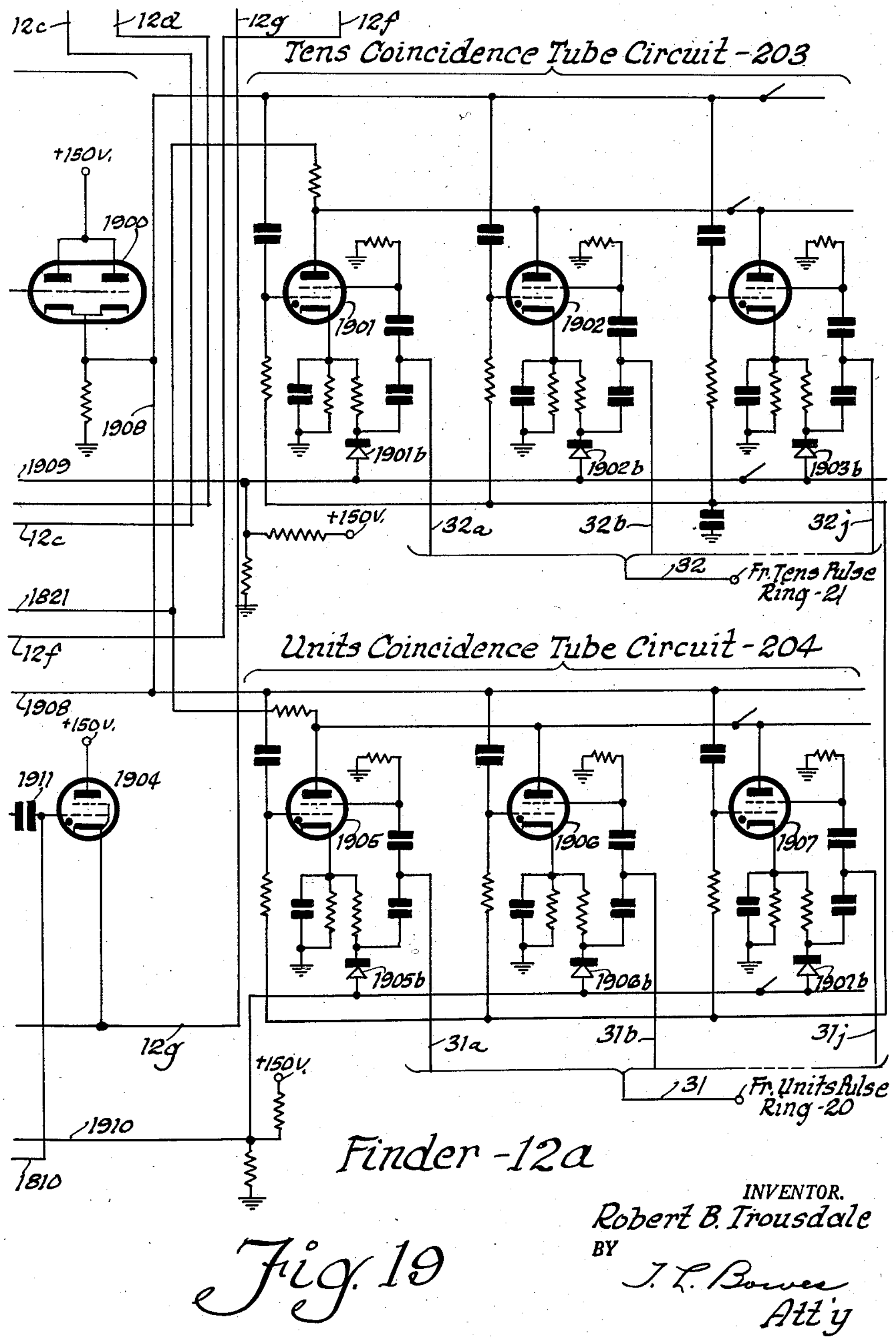

The tens coincidence tube circuit 203 comprises ten gate control tubes, of which the first second and third are indicated as the tubes 1901, 1902 and 1903 in Fig. 19. These gate control tubes have individually associated therewith the pulse gating rectifiers **1901*b*, 1902*b* and 1903*b* and the gate control tubes are arranged to be jointly controlled by pulses delivered thereto from the pulse input circuit 200 over the conductor 1908 and positive tens pulses successively transmitted thereto over the positive tens pulse conductors 32*a*, 32*b*–32*j*, inclusive, from the tens pulse ring circuit 21. The tens pulses gated by the "on" tube of the circuit 203 are impressed upon the finder pulse forming circuit 205 over a path which includes the conductor 1909. Similarly, the units coincidence tube circuit 204 comprises ten gate control tubes, of which the first, second and third tubes 1905, 1906 and 1907 are illustrated in Fig. 19, these tubes having pulse gating crystal rectifiers 1905*b*, 1906*b* and 1907*b* individually associated therewith. As jointly controlled by pulses delivered to the circuit 204 over the conductor 1908 and the positive units pulses successively transmitted thereto over the units pulse conductor 31*a*, 31*b*–31*j*, inclusive, from the units pulse ring circuit 20, the circuit 204 responds by gating units pulses to the finder pulse forming circuit 205 over a path which includes the conductor 1910**.

The finder pulse forming circuit 205 comprises a pulse forming tube 1805 and a pulse shaping and inverter tube 1804 connected in tandem in the order named. As shown, the pulse forming circuit 205 is controlled solely by pulses gated thereto from the two coincidence tube circuits 203 and 204. Pulses developed at the output side of the circuit 205 are impressed upon the pulse combining circuit 202 over the two paths which respectively include the coupling condensers 1808 and 1809. The pulse combining circuit 202 comprises a busy pulse and a finder gate pulse output tube 1800 and a pulse mixer tube 1801, both of which tubes are arranged to be controlled by the finder pulse forming circuit 205. The tube 1801 is also arranged to respond to busy pulses transmitted thereto over the busy pulse in conductor **52*b* from the busy pulse driver channel in the link coupling circuits 24. The circuit 202 functions to gate busy pulses to the busy pulse out conductor 52*a* when the finder 12*a* is operatively associated with a calling line and these busy pulses are transmitted over the conductor 52*b* to all of the finders and connectors of the system. The circuit 202 also functions to gate finder gate pulses to the connector 12*b* over the conductor 12*d* when the finder 12*a* is operatively associated with a calling line, and conditions the pulse input circuit 200 so that this circuit will accept only those multiplexer pulses which occur in the time position assigned to the calling line with which the finder 12*a*** is operatively associated.

The pulse input circuit 200, the finder pulse and busy pulse combining circuit 202, the tens coincidence tube circuit 203, the units coincidence tube circuit 204 and the finder pulse forming circuit 205 may all be substantially identical to the corresponding system circuit components shown and described in detail in my co-pending application, Serial No. 301,087, filed July 26, 1952, which is assigned to the same assignee as the present invention, so that these circuits will be described only in sufficient detail to facilitate an understanding of the revertive call operation of the finder **12*a*. With regard to the self-allotting circuit 206, this circuit may be identical to the corresponding circuit element shown in my co-pending application, Serial No. 257,712, filed November 23, 1951, which is assigned to the same assignee as the present invention, so that a detailed description of this circuit is considered unnecessary herein. The gas filled tubes embodied in the finder 12*a*, namely, the ten tubes of the tens coincidence tube circuit 203, the ten tubes of the units coincidence tube circuit 204 and the three tubes of the +B switching circuit 201 are highly sensitive thyratrons, preferably of the RCA commercial type 5696. The two dual triodes 1801 and 1900 are preferably of the commercial 6J6 type, the triodes 1800 and 1803 are preferably of the commercial 6C4 type, the pentode 1804 is preferably of the commercial 6AU6 type and the pentodes 1802 and 1805** are preferably of the 6AS6 commercial type.

Operational details of the components of the finder **12*a* may best be explained with reference to the functions performed by this finder in handling the above-described revertive call originating at the substation A′ and routed to the substation B′. In this regard, it will be recalled from the above general description of the system that when the revertive call is initiated on the line 32, multiplexer pulses 83*c* appearing in the time position 63*c* assigned to the revertive calling line 32 are transmitted from the multiplexer 11 over the conductor 50 to the first control grid of the finder control gate tube 1802. These multiplexer pulses are transmitted through the pulse input circuit 200 and over the conductor 1908 to the circuits 203, 204 and 201**.

Considering now the operation of the +B switching circuit 201, the first positive pulse repeated through the circuit 200 and impressed upon the conductor 1908 is coupled through the condenser 1911 to the control grid of the +B switch tube 1904 in the circuit 201 and has the effect of overcoming the negative bias potential produced on the conductor 1810 by the self-allotting circuit 206 so that the tube 1904 is fired. After the tube 1904 is fired current flows through the cathode resistor 1820 thereof and the grid of the tube 1904 loses control so that thereafter the presence or absence of multiplexer pulses on the conductor 1908 cannot directly affect the ionized condition of the tube 1904. With the tube 1904 conducting, the voltage of the +150 volt supply, less the voltage drop through the tube 1904, is impressed upon the conductor 1821 and is supplied to the tens coincidence tube circuit 203 and the units coincidence tube circuit 204. This voltage has a magnitude of the order of +140 volts which is impressed across the neon indicator tube 1822 so that this tube is fired to provide a visual indication that the finder 12*a* is in use. The voltage produced on the conductor 1821 is impressed upon the +B switch conductor 12*c* over a path which includes the series filter choke 1813. In addition, the potential produced on the conductor 1821 is applied to the anode of the +B extinguishing tube 1806 through the resistor 1822 and is also impressed upon the anode of the +B switch timing tube 1807 through the resistor 1823.

After the tube 1904 is fired in the manner described above by the multiplexer pulses appearing on the conductor 1908, deionization of the tube 1904 is under the control of the associated tubes 1806 and 1807. More specifically, the extinguishing tube 1806 is provided to deionize the tube 1904 when a normal or non-revertive call is abandoned or terminated, while the +B switch timing tube 1807 is provided to prevent undesired deionization of the tube 1904 during the open circuit periods of dial impulses dialed through operation of the impulse contacts at the calling substation, hook switch flashing intervals and other periods of short duration when the loop circuit including the conductors of the calling line may be interrupted. When the circuit 201 is inactive, the condenser 1824 is completely discharged through the resistors 1823 and 1820 so that the potential on the conductor 12*e* is substantially equal to ground potential. Also, with the circuit 201 inactive, the −100 volt supply is divided between the resistors 825 and 826 in the ratio of 5 volts across the resistor 1826 and 95 volts across the resistor 1825 so that the cathode of the tube 1807 is normally maintained at a potential which is 95 volts negative with respect to ground.

When the +B switch tube 1904 is fired in the manner explained above, the condenser 1827 is charged to the full value of the voltage across the resistor 1820 and operating anode potential is supplied to the tube 1806. Also, the condenser 1828 is charged through the cathode resistor 1829 to the full value of the voltage across the resistor 1820. Charging of the condenser 1828 over this path drives the cathode terminal of the resistor 1829 highly positive during the initial portion of the charging interval. Concurrently with charging of the condenser 1828, a charging path for the condenser 1824 is established from the cathode terminal of the resistor 1820 through the timing resistor 1823. Initially the major portion of the charging voltage appears across the resistor 1823 and a very small portion thereof appears across the condenser 1824. Similar the major portion of the charging voltage for the condenser 1828 initially appears across the cathode resistor 1829 immediately after the tube 1904 fires. Thus, during the initial portion of the condenser charging interval, the control grid of the tube 1806 is held at ground potential whereas the cathode of this tube is driven highly positive. The grid of the tube 1806 is thus effectively biased negative relative to the tube cathode by an amount equal to the voltage drop across the resistor 1829 so that the tube 1806 is prevented from firing.

The bias voltage on the cathode of the tube 1807 prevents this tube from firing in the absence of positive multiplexer pulses on the conductor 1908. However, immediately positive pulses are gated to this conductor by the pulse input circuit 200, they are impressed upon the control grid of the tube 1807 through the condenser 1830 and serve to drive this control grid positive relative to the tube cathode and fire the tube. Accordingly, when the finder 12*a* responds to multiplexer pulses appearing on the conductor 50, the tubes 1807 and 1804 are fired substantially simultaneously. When the tube 1807 is fired current flows through this tube and the condenser 1824 in a circuit which extends from the grounded terminal of the resistor 1825 through the condenser 1824 and the space current path of the tube 1807 to the cathode terminal of the resistor 1825. Thus the voltage across the resistor 1825 less the voltage drop through the tube 1807 is impressed across the condenser 1824 immediately the tube 1807 fires. As a consequence, the conductor 12*e* is driven approximately 80 volts negative with respect to ground. The negative potential thus developed on the conductor 12*e* is directly impressed upon the control grid of the tube 1806 to bias this grid highly negative with respect to the cathode of the tube and thus prevent the tube from firing regardless of the voltage across the resistor 1829. When the voltage across the condenser 1824 rises to approximately 80 volts negative, the current flow through the tube 1807 drops to the extinction point and is interrupted. The condenser 1824 now starts to charge through the resistor 1823 to the positive potential of 140 volts across the resistor 1820. Charging rate of the condenser 1824 is obviously determined by the time constant of the series circuit comprising this condenser and the resistor 1823. When the potential of this terminal is reduced to a value of approximately 60 volts negative, the voltage across the tube 1807 is increased to a value at which this tube refires. When the tube 1807 refires, the voltage across the condenser 1824 instantly changes to a value of −80 volts to again produce deionization of the tube 1807. The described relaxation type of operation of the tube 1807 and condenser 1824 continues so long as an off hook condition persists at the calling substation and multiplexer pulses are transmitted over the conductor 1908 to the control grid of the tube 1807.

During the open circuit or break period of each dial impulse, the transmission of multiplexer pulses to the finder 12*a* in the time position assigned to the revertive calling line 32 is arrested so that the tube 1807 cannot refire after it is first extinguished during the initial portion of the dial impulse break. Due to the long time constant of the condenser discharging circuit, the dial impulse break period is not long enough to charge the condenser to a point at which the negative bias on the control grid of the tube 1806 becomes insufficient to prevent this tube from firing. When the dial impulse break period ends to cause resumption of the pulse gating operation of the circuit 200, the tube 1807 immediately fires to recharge the condenser 1824 and raise the negative potential on the conductor 12*e* to the negative 80 volt value. During the closed circuit period of each impulse the described relaxation operation of the tube 1807 in condenser 1824 is resumed and this action continues after the dialing operation is completed and so long as the receiver at the calling substation is held off hook.

Considering first the operation of the circuit 201 when a non-revertive call is abandoned or terminated, gating of multiplexer pulses to the conductor 1908 by the pulse input circuit 200 is interrupted in the manner described above. Accordingly, the condenser 1824 is permitted to charge through the resistor 1823 from the cathode resistor 1820 so that the negative potential on the conductor 12*e* is decreased to a value such that the tube 1806 fires. In firing, the tube 1806 incidentally discharges the condenser 1827 through the space current path thereof and the resistor 1829. Thus, a voltage of approximately 130 volts is developed across the resistor 1829. This voltage spike is additively combined with the 140 volts across the charged condenser 1828 to produce a voltage across the cathode resistor 1820 of approximately 270 volts. Thus the cathode of the tube 1904 is driven positive relative to the anode of this tube and space current flow through the tube is interrupted and operating potentials are removed from the conductors 1821 and 12*c*. As a consequence, the tubes in the circuits 203 and 204 are deionized, the tubes 1806 and 1807 are deionized and all of the controlled gas filled tubes in the connector 12*b* are deionized.

In the above description of the circuit 201, it has been assumed that the potential on the conductor 12*f*, which is connected to the shield grid of the +B extinguishing tube 1806, is substantially equal to ground potential so that the tube 1806 is permitted to fire when the timing tube 1807 remains extinguished and the potential across the condenser 1824 increases positively by an amount sufficient to bring the main control grid of the tube 1806 into the conductive region of this tube. However, as described above in connection with the general description of the system, the connector 12*b* and more particularly the revertive call test circuit 296 thereof, is arranged to reduce the potential on the conductor 12*f* to a relatively high negative value when the revertive call test operation indicates that the call is revertive, this potential change being referred to as a revertive call hold signal. When the potential on the conductor 12*f* is thus reduced to a relatively large negative value, the +B extinguishing tube 1806 is prevented from firing even though multiplexer pulses are not transmitted to the +B switch timing tube 1807 and the condenser 1824 charges positively up to ground potential through the resistor 1823. Accordingly, the circuit 201 may be changed to a revertive call setting in which this circuit does not respond to termination of multiplexer pulse transmission by releasing the link 12, but instead, remains operatively associated with the calling line and continues to impress busy pulses upon the conductor 52*a* in the time position assigned to the calling line, finder gate pulses upon the conductor 12*d* and a +B switching potential on the conductor 12*c*. In this connection, it will be noted that the condenser 1824 will tend to be charged positively with respect to ground, through the resistor 1823 when the timing tube 1807 remains extinguished. However, a clamping rectifier 1612 (Fig. 16) in the code start circuit 268 of the connector 12*b* is connected between the conductor 12*e* and ground so as to prevent the potential across the condenser 1824 from increasing positively with respect to ground. Accordingly, the +B extinguishing tube 1806 is positively prevented from firing since the main control grid potential of this tube cannot increase above ground potential and the revertive call hold signal developed on the conductor 12*f* renders the shield grid of this tube highly negative so that conduction through the tube is prevented. It will thus be understood that by means of the above-described revertive call hold signal developed on the conductor 12*f*, the circuit 201 is prevented from releasing the link 12 during that portion of the revertive call when the calling party hangs up to permit the revertive calling line to be rung in accordance with the party line ringing signal assigned to the called substation on his line.

In order to provide an indication that the calling party has hung up so that revertive ringing of the calling line may be initiated, the circuit 201 is arranged to transmit a revertive ring start signal over the conductor 12*e* in response to the first disconnect signal transmitted over the revertive calling line 32. More specifically, when the revertive calling party hangs up and the loop circuit including the conductors of the line 32 is broken, multiplexer pulse transmission over the conductor 1908 is terminated and the potential across the condenser 1824, i.e., the potential on the conductor 12*e*, increases from its normal 60 to 80 volt negative value to ground potential. This positive increase on the conductor 12*e*, which may be called a revertive ring start signal, is transmitted over the conductor 12*e* to the connector 12*b*, and more particularly to the code start circuit 268 in this connector so that the circuit 268 is conditioned to initiate ringing of the revertive calling line 32.

After the revertive call is answered, it is desired to release the link 12 in response to the next disconnect signal transmitted over the revertive calling line since this disconnect signal will indicate termination of the revertive call. Accordingly, when the revertive call is answered, the connector 12*b* operates to change the potential on the revertive call hold conductor 12*f* to a value substantially equal to ground potential. Under these conditions, the +B extinguishing tube 1806 is permitted to respond to a positively increasing potential across the condenser 1824 when multiplexer pulse transmission is terminated at the end of the revertive call and the +B switch timing tube 1807 remains extinguished. As a result, the +B extinguishing tube 1806 is fired in response to the second disconnect signal transmitted over the revertive calling line 32 and the +B switch tube 1904 is extinguished so that operating anode potential is removed from the conductors 1821 and 12*c* and the link 12 is released.

When a non-revertive call is in progress the circuits in the connector 12*b* which control the potential on the conductor 12*f* are so arranged that the potential on this conductor will tend to increase positively with respect to ground. More specifically, when ringing trip occurs for a non-revertive call, the ring trip circuit 221 develops a ring trip potential on the conductor 253 which is connected to the conductor 12*f* in the revertive call test circuit 296 and this ring trip potential tends to increase the potential on the conductor 12*f* above ground potential. If the potential on the conductor 12*f* becomes positive with respect to ground, the shield grid potential on the +B extinguishing tube 1806 also becomes positive with respect to ground so that this tube may be fired after ringing trip for a non-revertive call. To prevent this, there is provided the rectifier 1831 which is connected between the shield grid and cathode of the +B extinguishing tube 1806. When the potential on the conductor 12*f* tries to increase positively with respect to ground potential, the rectifier 1831 conducts and prevents the shield grid of the tube 1806 from becoming positive with respect to the cathode potential of this tube. Also, the increase in cathode potential of the tube 1806 due to the flow of current through the rectifier 1831 is negligible due to the relative size of the cathode resistor 1829 as compared with the resistors associated with this conductor in the connector 12*b*. Accordingly, when ringing trip occurs the potential on the conductor 12*f* is prevented from increasing positively with respect to ground potential so that the extinguishing tube 1806 is prevented from firing and the link 12 remains operatively associated with the calling and called lines for the duration of the call.

*Connector 12b*

Figure 2B:
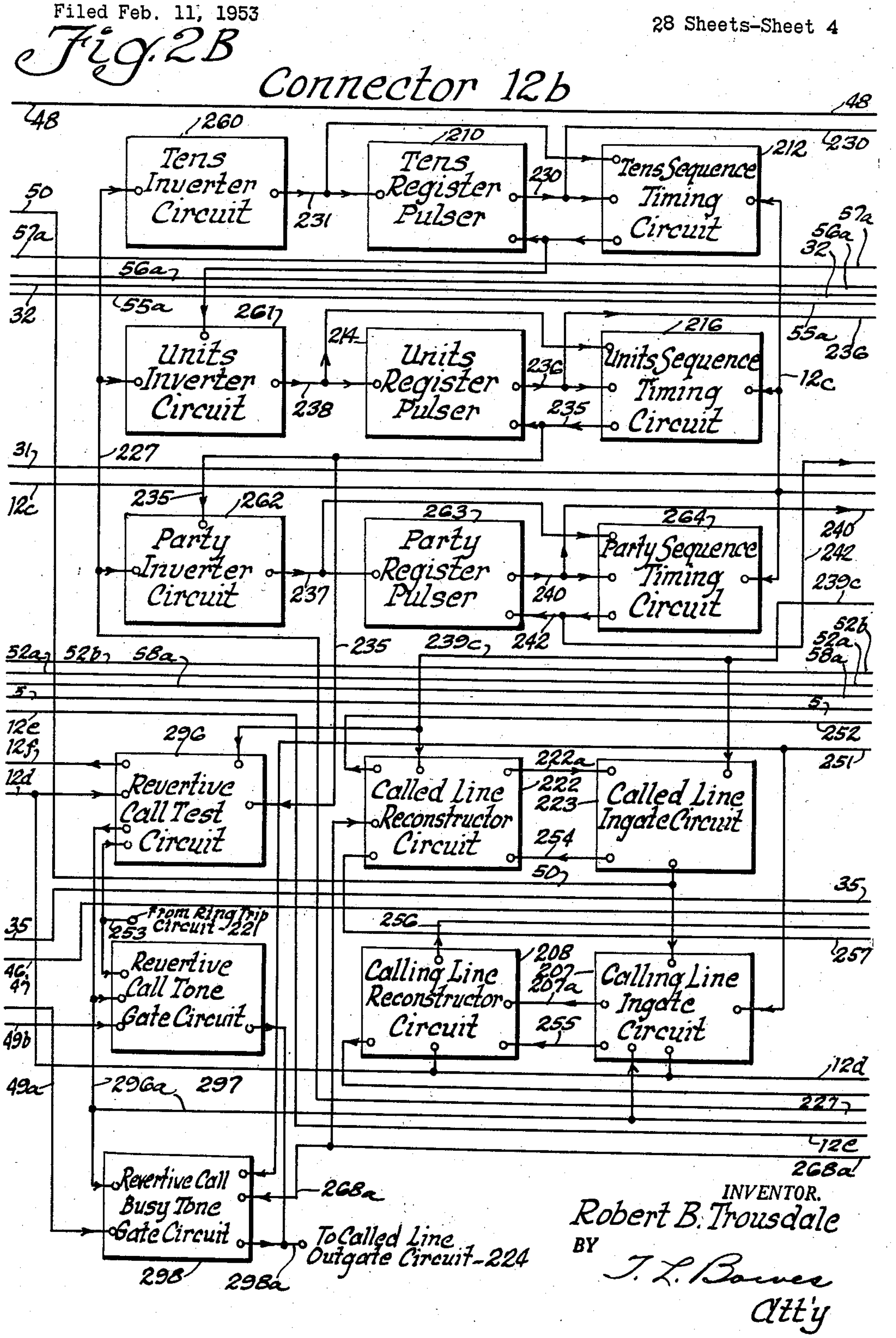
Figure 2C:
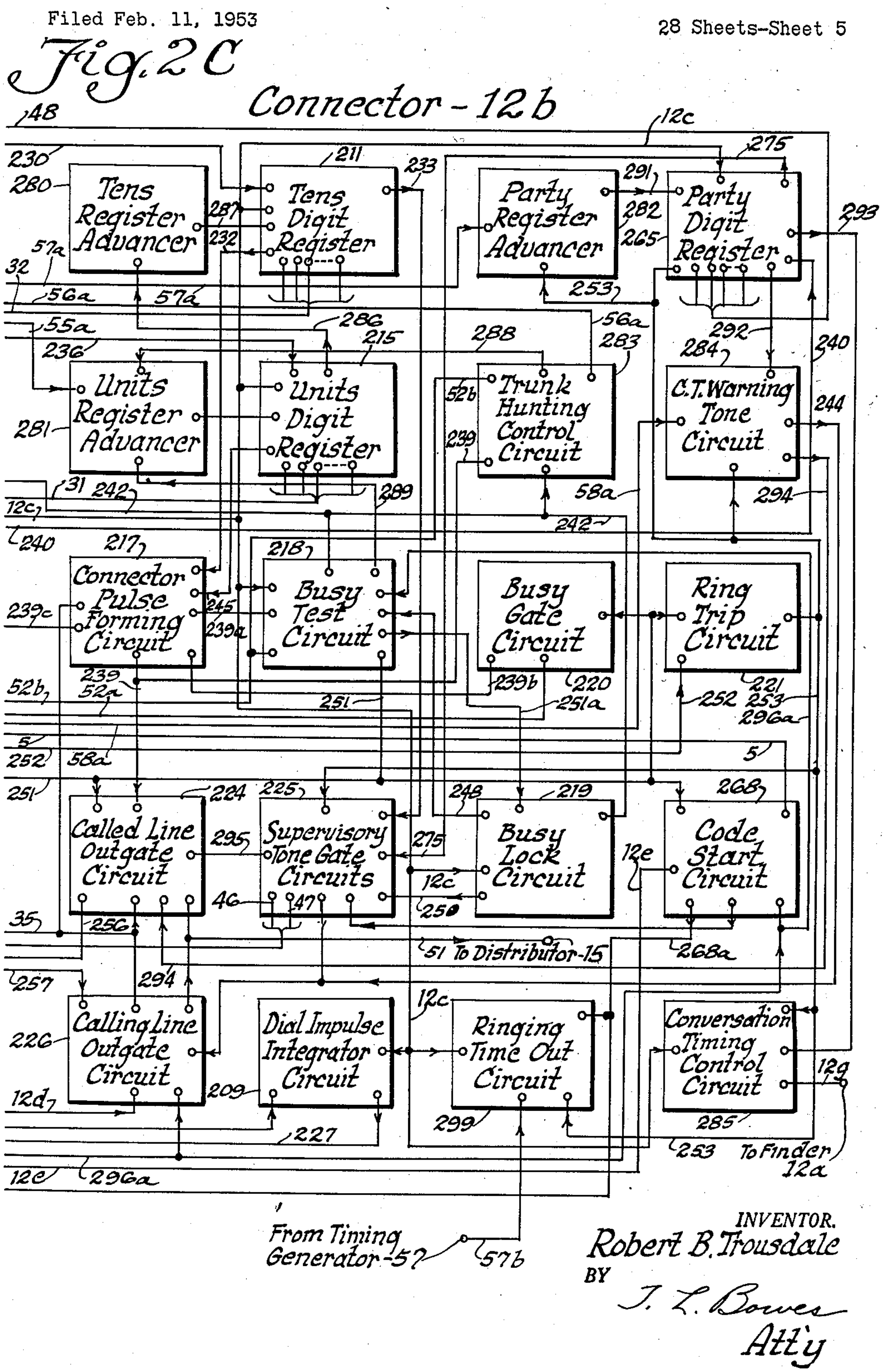

As explained generally heretofore in connection with Figs. 2B and 2C of the drawings, the connector 12*b* generally comprises the calling and called line in gate circuits 207 and 223, the calling and called line out gate circuits 226 and 224, the calling and called line reconstructor circuits 208 and 222, a dial impulse integrator circuit 209; tens, units and party register pulsers 210, 214 and 263; tens, units and party inverter circuits 260, 261 and 262; tens, units and party sequence timing circuits 212, 216 and 264; and tens, units and party digit registers 211, 215 and 265. The connector 12*b* is also diagrammatically illustrated in Figs. 2B and 2C of the drawings as comprising tens, units and party register advancers 280, 281 and 282; a connector pulse forming circuit 217, a busy test circuit 218, a busy lock circuit 219, a busy gate circuit 220, a ring trip circuit 221, a trunk hunting control circuit 283, a conversation timing warning tone circuit 284, supervisory tone gate circuits 225, a code start circuit 268, a conversation timing control circuit 285, a revertive call test circuit 296, a revertive call tone gate circuit 297, a revertive call busy tone gate circuit 298, and a ringing timeout circuit 299. The functions performed by the above-identified components of the connector 12*b* are also generally described above with reference to Figs. 2B and 2C of the drawings.

Referring now more particularly to Figs. 6–10, inclusive, and 13–17, inclusive, of the drawings, where the detailed circuitry of the connector 12*b* is illustrated, it will be readily understood that the details of this connector may best be understood in terms of the functional significance of the various components thereof.

Figure 6:
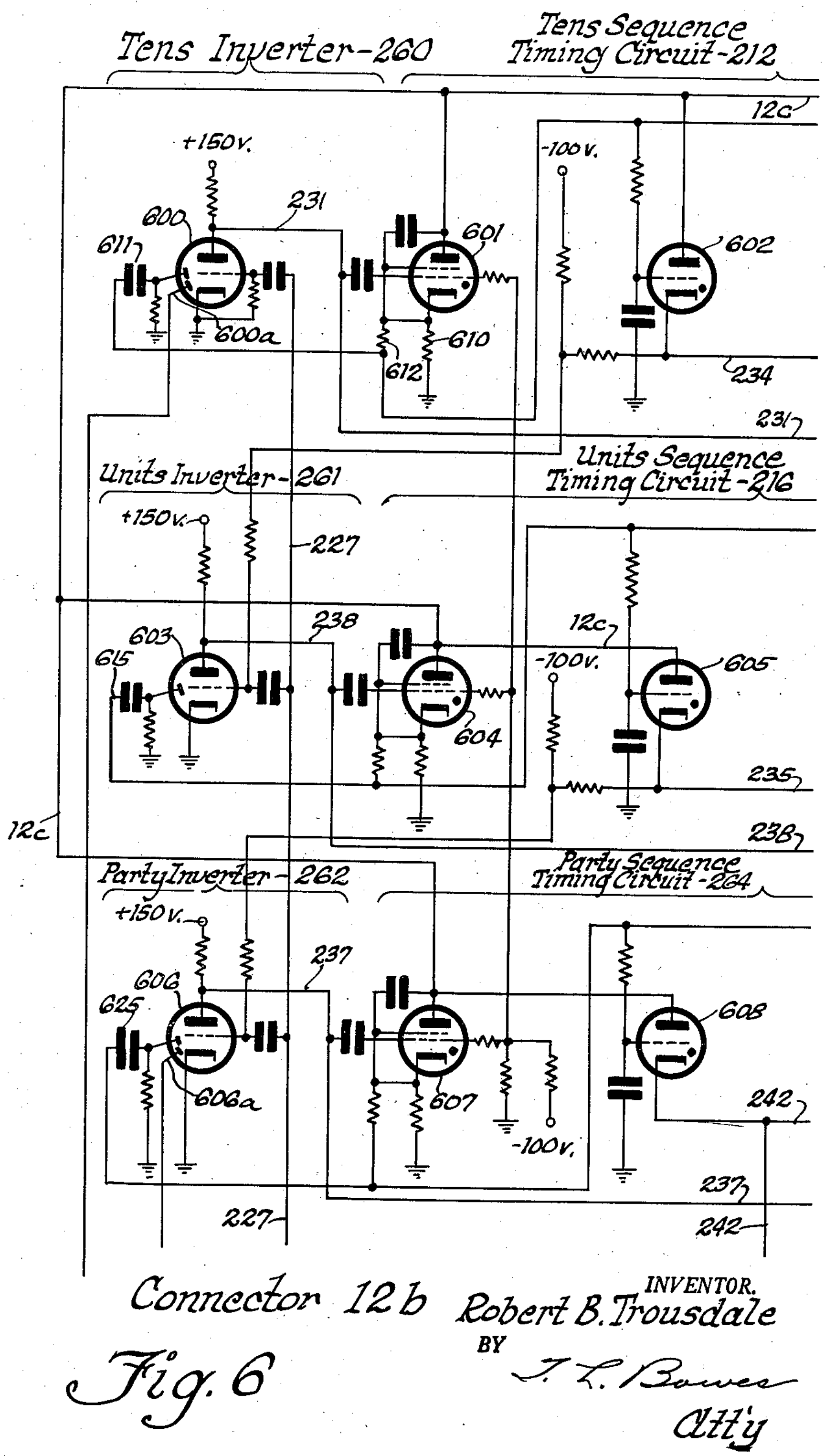
Figure 7:
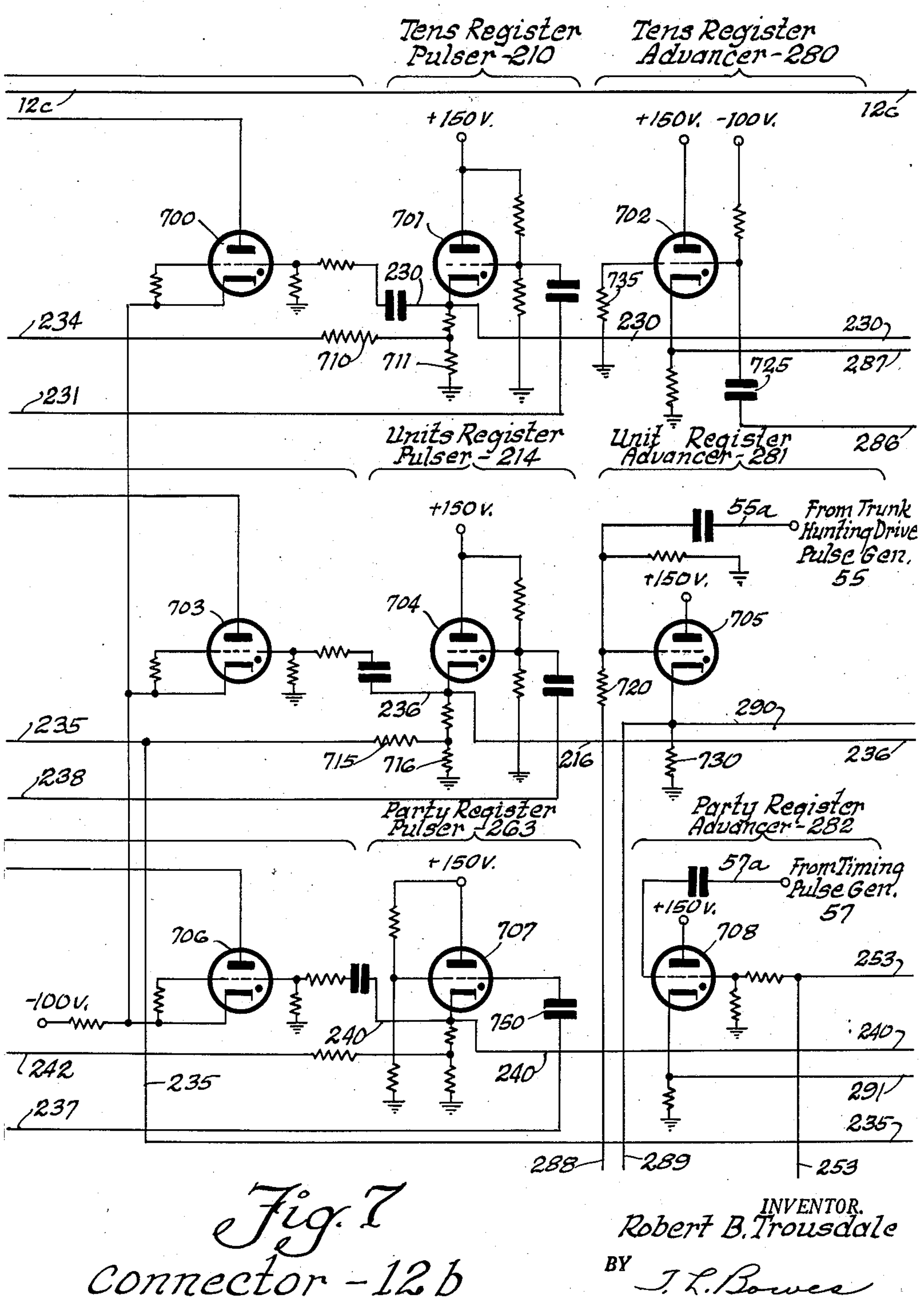
Figure 8:
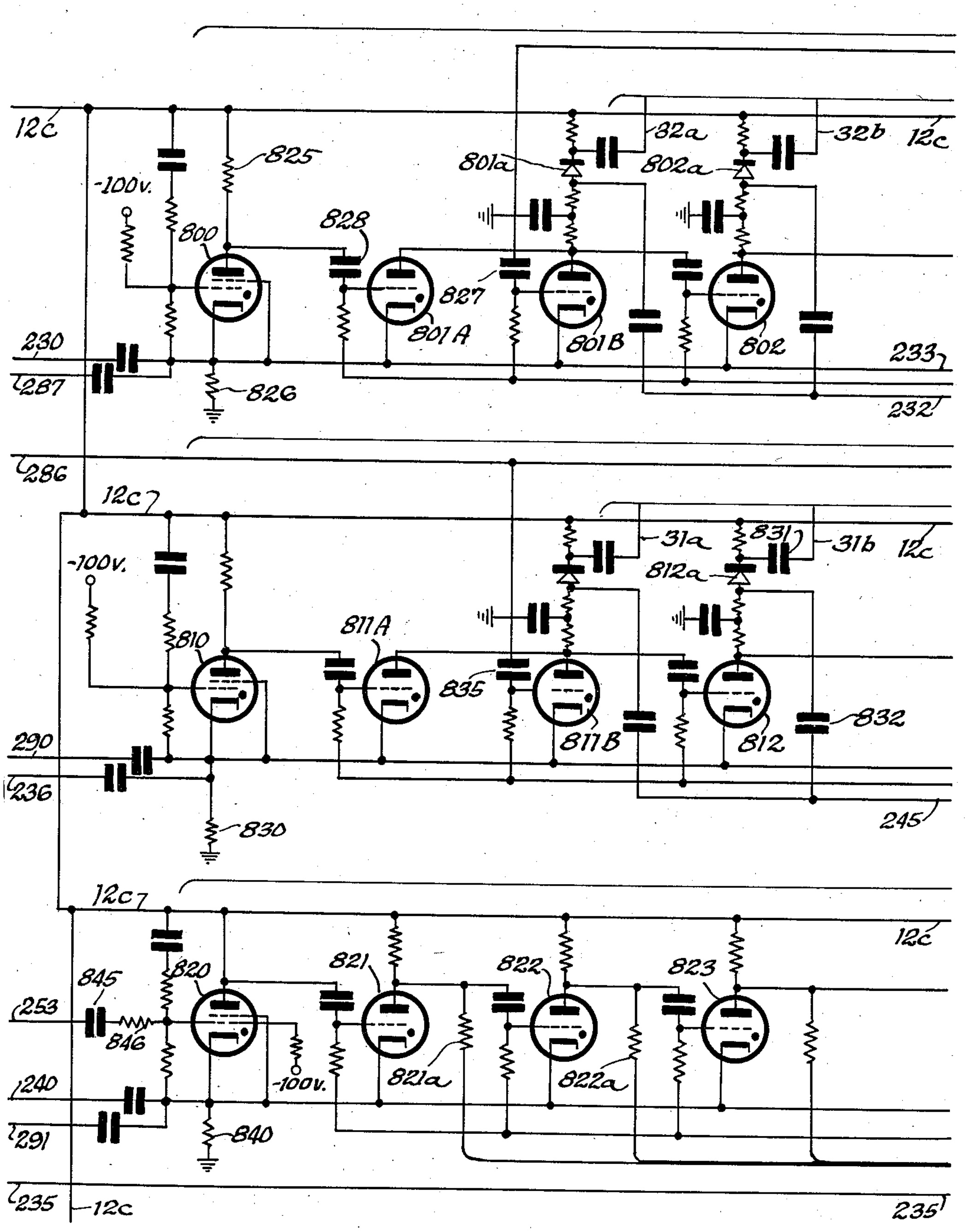
Figure 9:
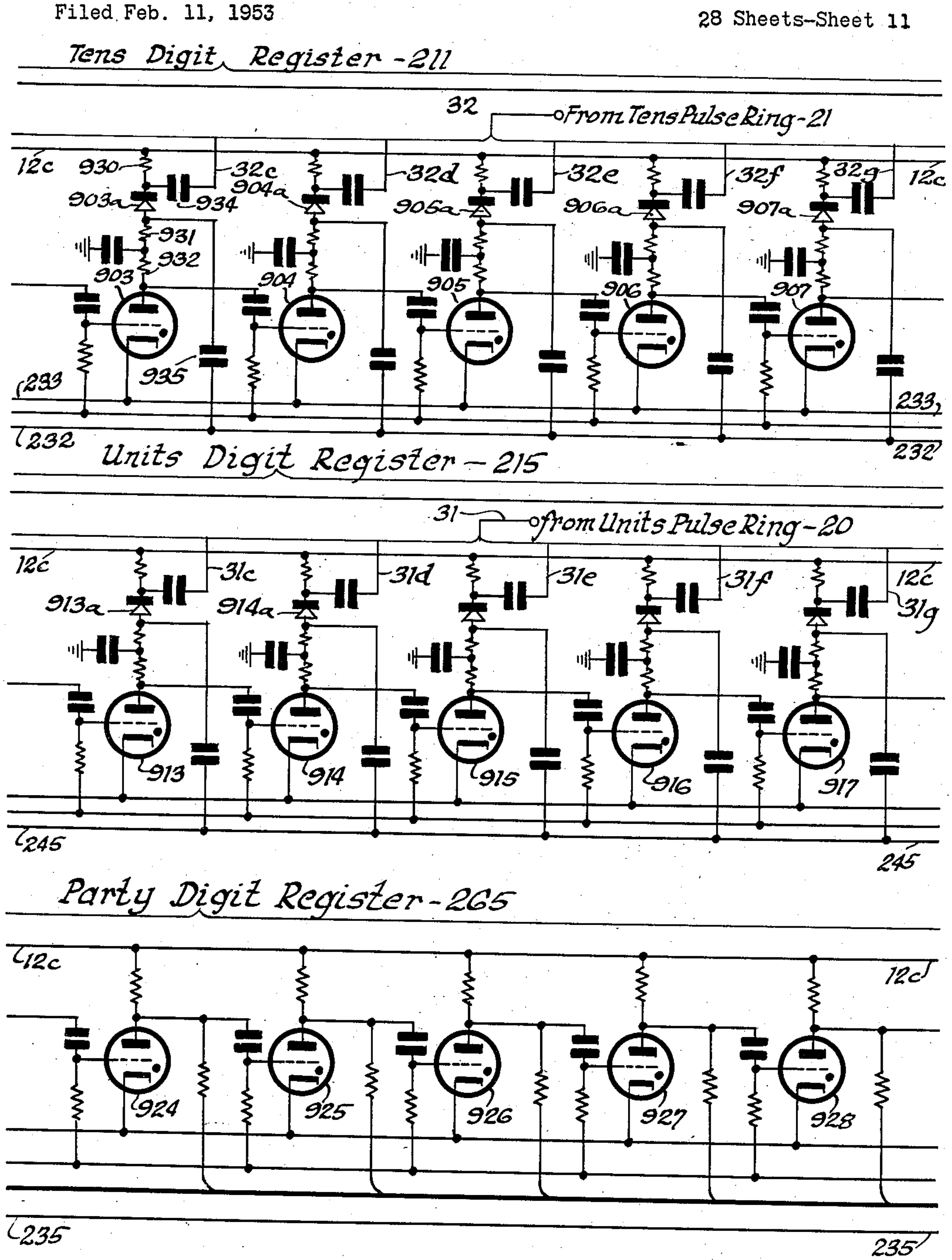
Figure 10:
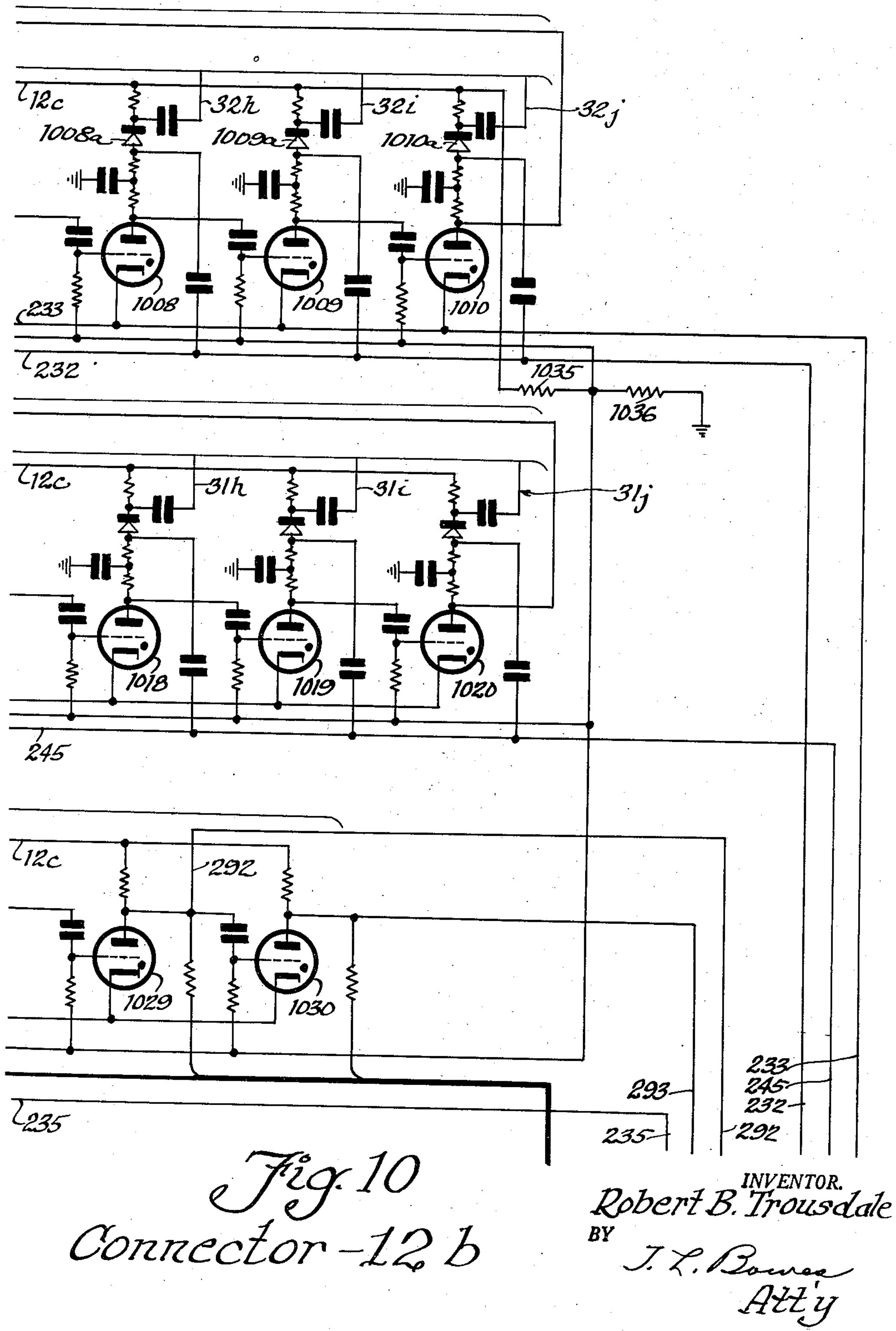
Figure 13:
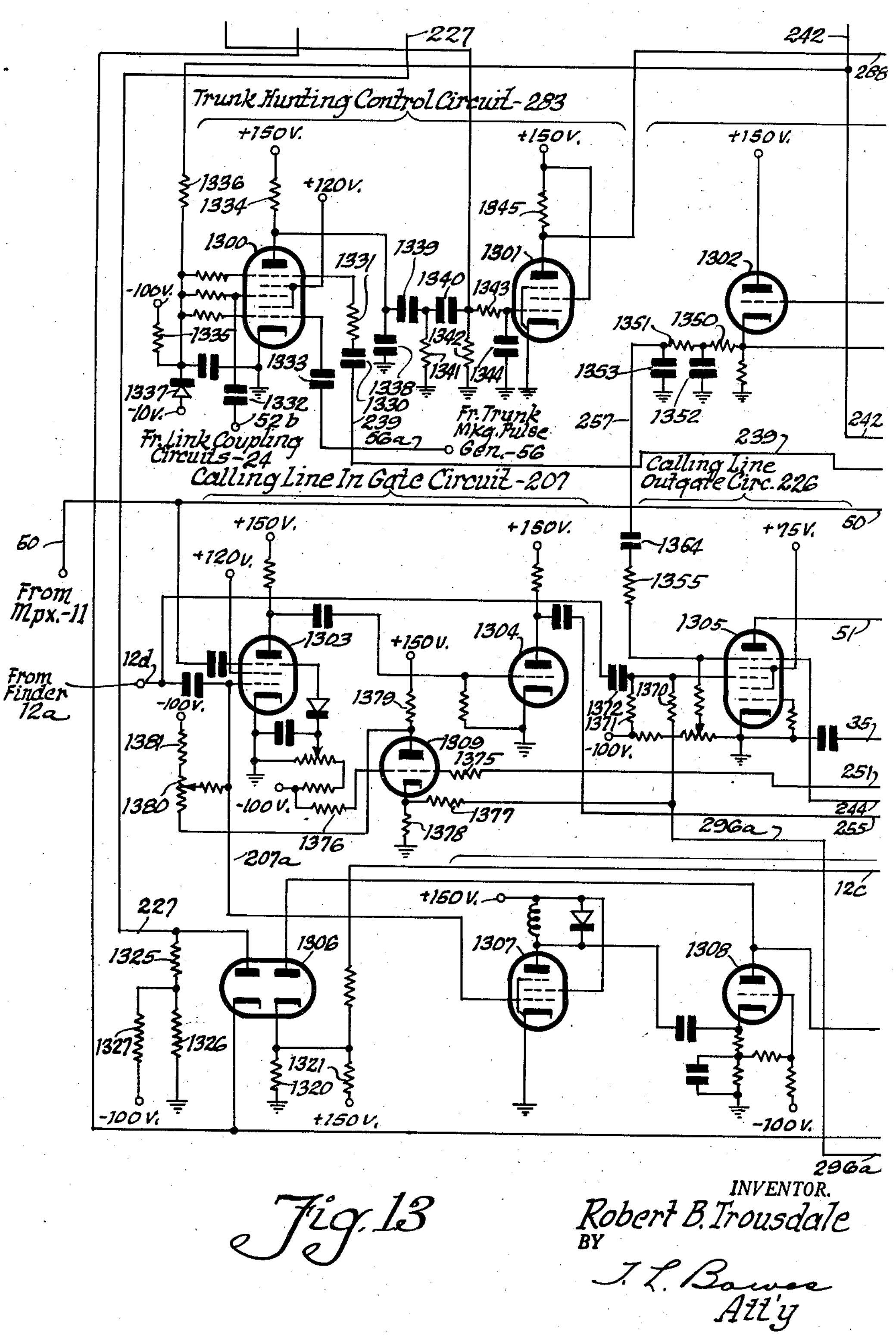
Figure 14:
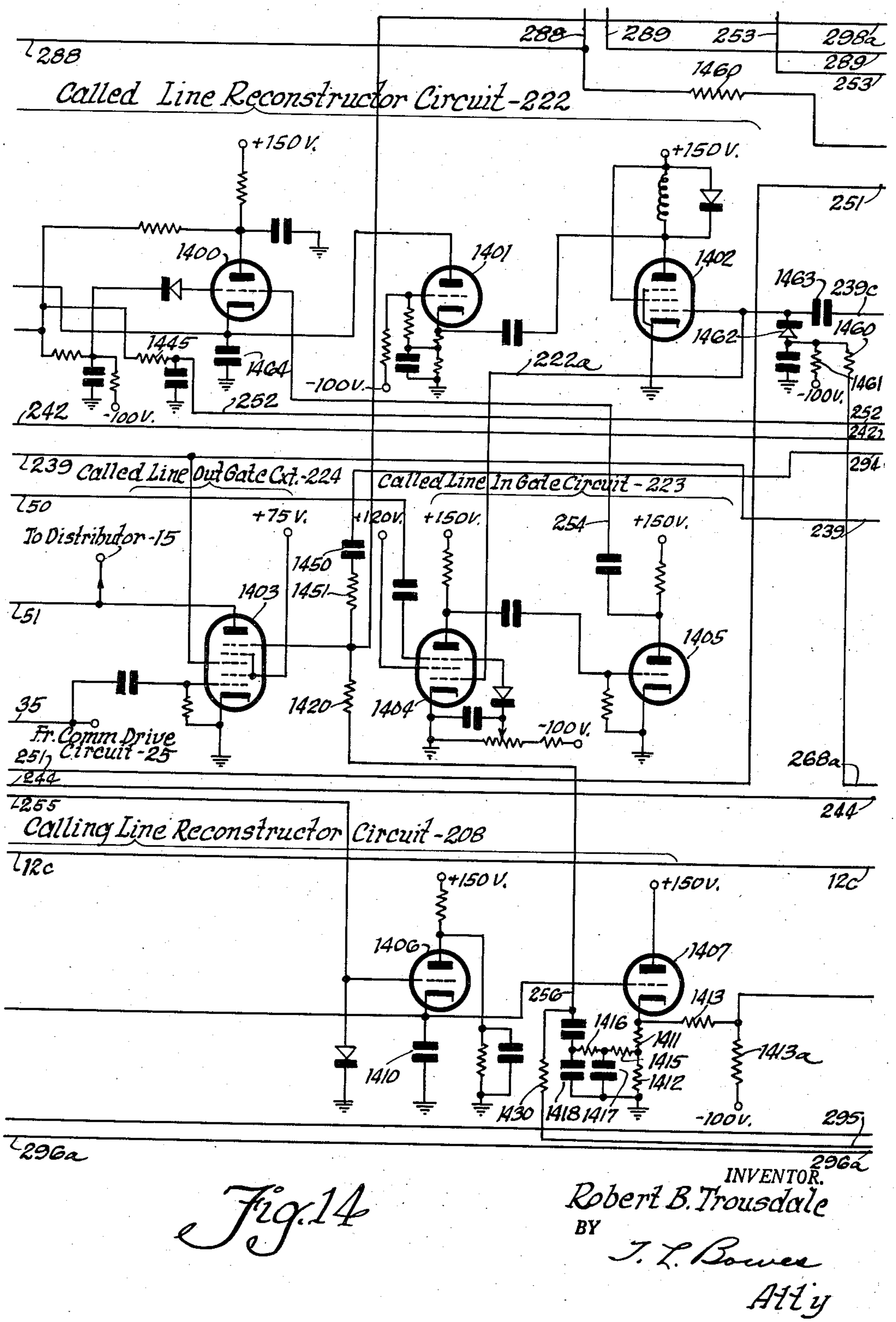
Figure 15:
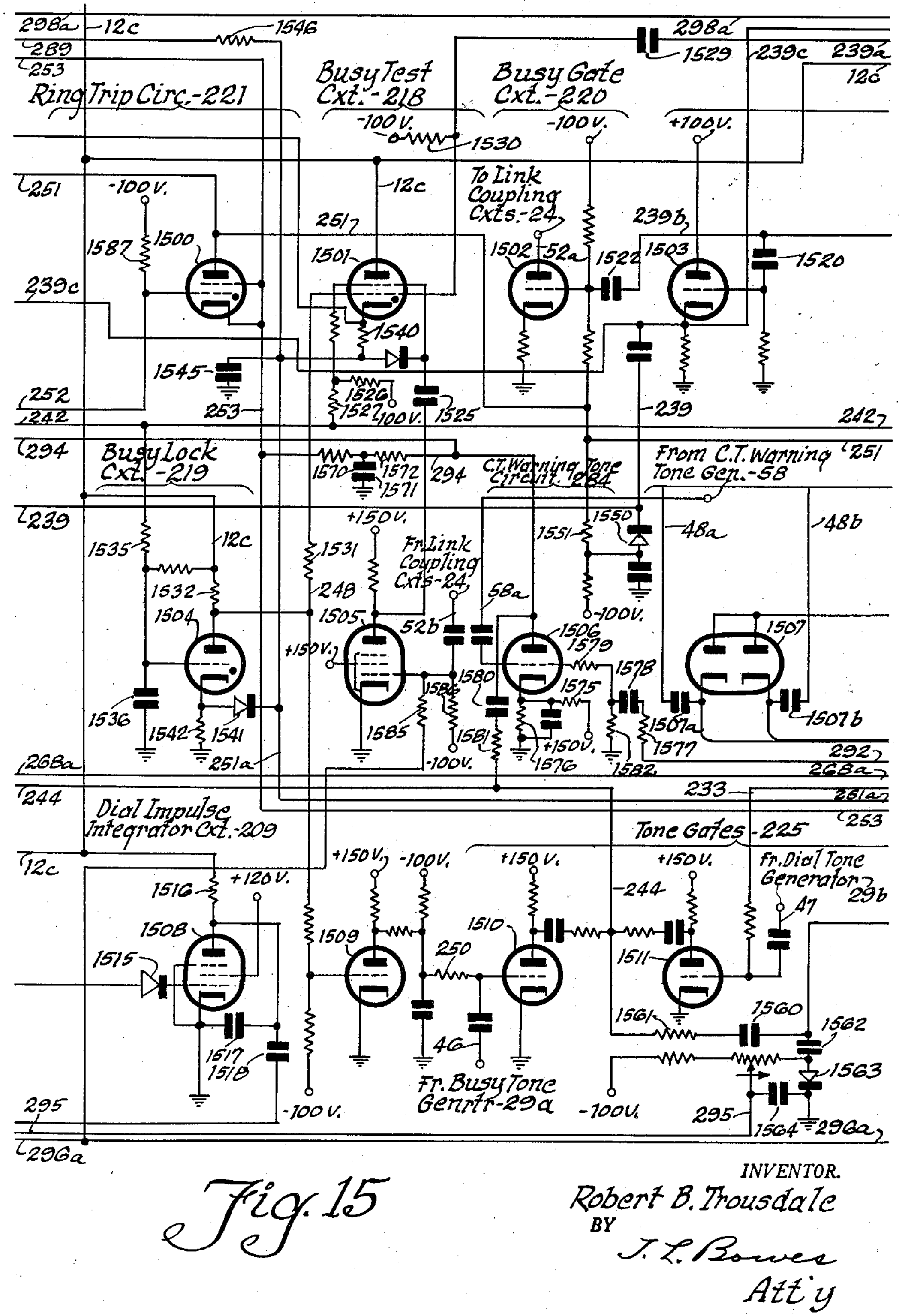
Figure 16:
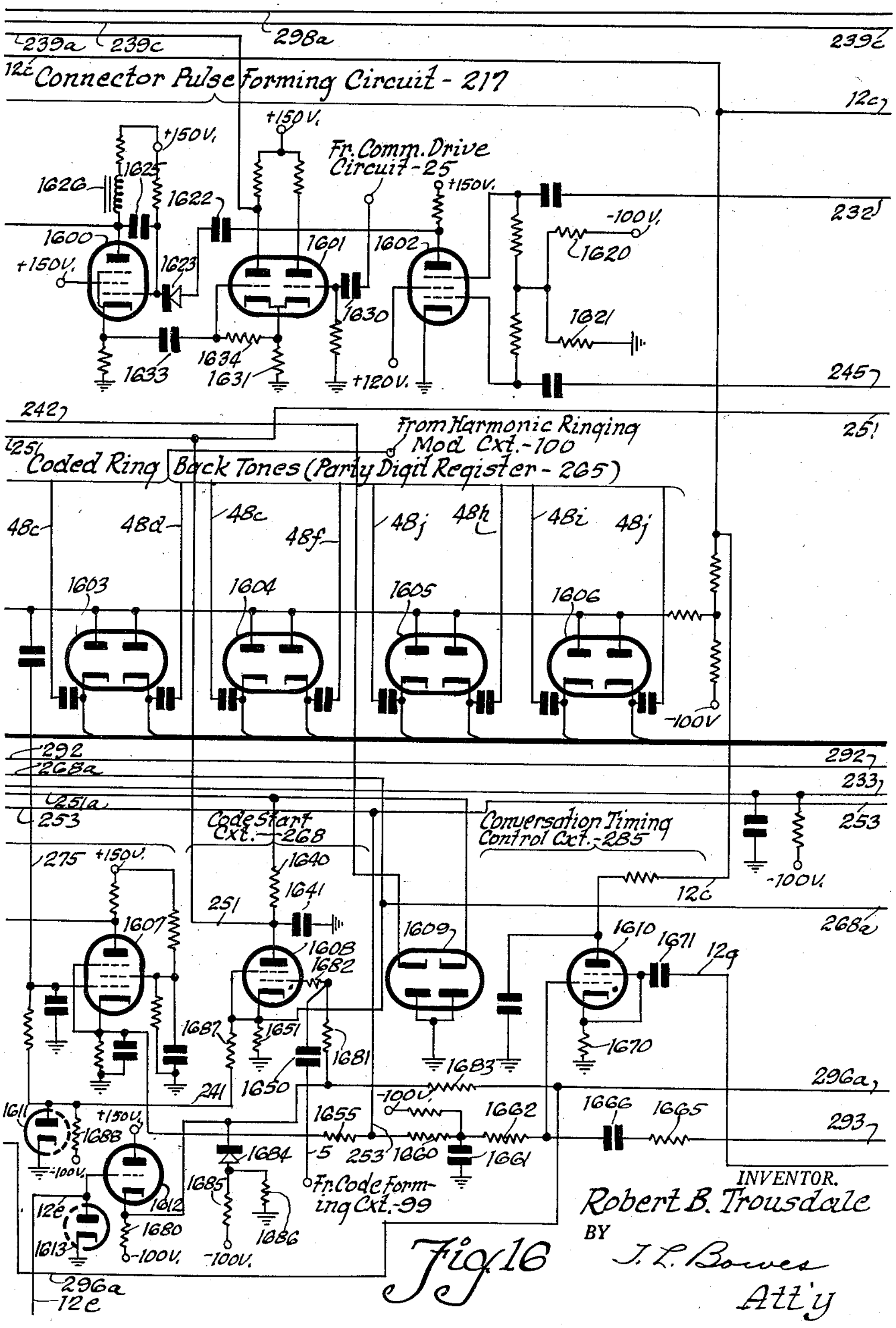
Figure 17:
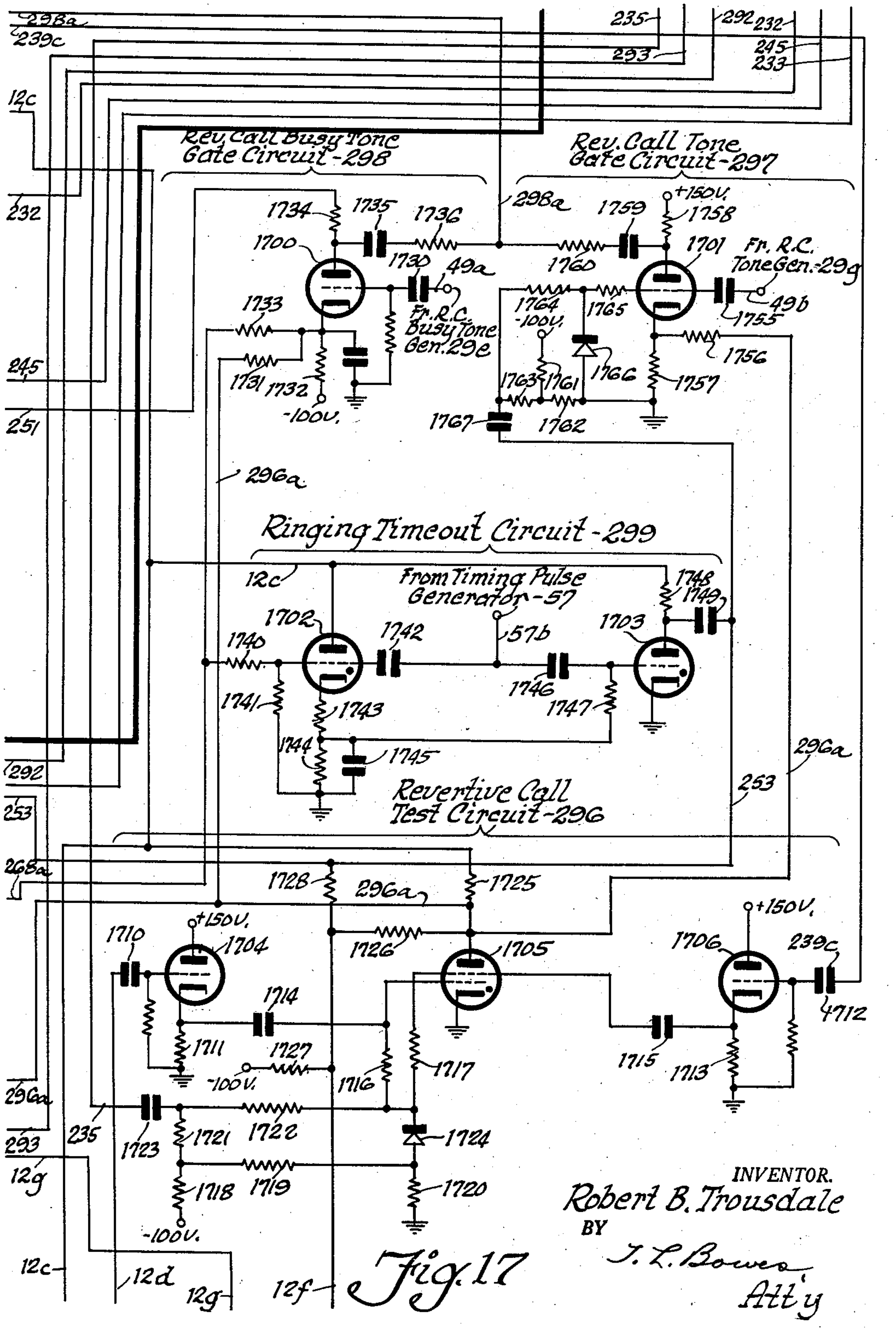

In order to correlate these ten figures with the diagrammatic showing of Figs. 2B and 2C, it may be pointed out that the tens, units and party inverters 260, 261 and 262 are shown in Fig. 6 as respectively including the inverter tubes 600, 603 and 606; the tens sequence timing circuit 212 is shown in Figs. 6 and 7 as comprising a start tube 601, a timing tube 602 and a condenser discharge tube 700; the units sequence timing circuit 216 is shown in Figs. 6 and 7 as comprising a start tube 604, a timing tube 605, and a condenser discharge tube 703; and the party sequence timing circuit 264 is shown in Figs. 6 and 7 as comprising a start tube 607, a timing tube 608 and a condenser discharge tube 706. The register pulsers 210, 214 and 263 are shown in Fig. 7 of the drawings as respectively including the pulser tubes 701, 704 and 707 and the tens, units and party register advancers 280, 281 and 282 are shown in Fig. 7 of the drawings as respectively including the pulser tubes 702, 705 and 708. The tens digit register 211 is shown in Figs. 8, 9 and 10 of the drawings as including the primer tube 800, the parallel connected impulse counting tubes 801A and 801B which together comprise the first impulse counting stage and nine other impulse counting tubes 802, 903–907, inclusive, and 1008–1010, inclusive. The units digit register 215 is shown in Figs. 8, 9 and 10 of the drawings as comprising the primer tube 810, the parallel connected tubes 811A and 811B which together comprise the first impulse counting stage, and nine other impulse counting tubes 812, 913–917, inclusive, and 1018–1020, inclusive. The party digit register 265 is shown in Figs. 8, 9, 10, 15 and 16 of the drawings as comprising the primer tube 820, ten impulse counting tubes 821–823, inclusive, 924–928, inclusive, 1029 and 1030, and five double diode gate tubes 1507 and 1603–1606, inclusive. The trunk hunting control circuit 283 is shown in Fig. 13 of the drawings as comprising the trunk hunting control tube 1300 and the trunk hunting inverter tube 1301; the calling line in gate circuit 207 is shown in Fig. 13 of the drawings as comprising the gate tube 1303, the inverter tube 1304, and a revertive call control tube 1309; the called line reconstructor circuit 222 is shown in Figs. 13 and 14 of the drawings as comprising a peaker tube 1402, a condenser discharging tube 1401, a condenser charging tube 1400 and a cathode follower output tube 1302; the calling line out gate circuit 226 is shown in Fig. 13 of the drawings as comprising a single triple-grid gate tube 1305; the calling line reconstructor circuit 208 is shown in Figs. 13 and 14 of the drawings as comprising the peaker tube 1307, the condenser discharging tube 1308, the condenser charging tube 1406, a clamping diode including the right-hand section of the duo-diode 1306 and a cathode follower tube 1407; the called line out gate circuit 224 is shown in Fig. 14 of the drawings as comprising the single triple-grid gate tube 1403; and the called line in gate circuit 223 is shown in Fig. 14 of the drawings as comprising the gate tube 1404 and the inverter tube 1405. The ring trip circuit 221 is shown in Fig. 15 of the drawings as comprising the ring trip tube 1500; the busy test circuit 218 is shown in Fig. 15 as comprising the busy test tube 1501 and the busy pulse inverter tube 1505; the busy lock circuit 219 is shown in Fig. 15 as comprising the busy lock tube 1504 and the inverter tube 1509; the dial impulse integrator circuit 209 is shown in Figs. 13 and 15 as comprising the dial impulse integrator tube 1508 and a diode clamping tube comprising the left-hand section of the duo-diode 1306; the busy gate circuit 220 is shown in Fig. 15 of the drawings as comprising the gate tube 1502; the connector pulse forming circuit 217 is shown in Figs. 15 and 16 as comprising a connector pulse mixer tube 1602, a connector pulse sharpening tube 1601, an inverter tube 1600 and a cathode follower output tube 1503; the conversation timing warning tone circuit 284 is shown in Fig. 15 as comprising the gate tube 1506; the dial tone gate circuit in the network 225 is shown in Fig. 15 as comprising the dial tone gate tube 1511 and the busy tone gate circuit in the network 225 is shown in Fig. 15 as comprising the busy tone gate tube 1510. The code start circuit 268 is shown in Fig. 16 as comprising a code start tube 1608, a revertive ring start control tube 1612 and a clamping diode 1613; the ring back tone gate circuit in the network 225 is shown in Fig. 16 as comprising the ring back tone gate tube 1607 and a clamping diode 1611; and the conversation timing control circuit 285 is shown in Fig. 16 as comprising the control tube 1610. The revertive call busy tone gate circuit 298 is shown in Fig. 17 as comprising the tone gate tube 1700; the revertive call tone gate circuit 297 is shown in Fig. 17 as comprising the tone gate tube 1701; the ringing timeout circuit 299 is shown in Fig. 17 as comprising the timeout primer tube 1702 and the timeout control tube 1703; and the revertive call test circuit 296 is shown in Fig. 17 as comprising the cathode follower tubes 1704 and 1706 and the revertive call test tube 1705.

The manner in which the identified tubes of the connector **12*b* are interconnected is pointed out more fully below with reference to the operation of the individual circuits. Although the identified tubes may be of any desired commercial type having the required operating characteristics, it is pointed out preferably the tubes 600, 603, 606, 1400, 1401, 1308 and 1406 are duo-diode triodes of the commercial type 6AQ6; the tubes 1302, 1304, 1309, 1405, 1407, 1502, 1503, 1506, 1509, 1510, 1511, 1612, 1700, 1701, 1704 and 1706 are triodes of the commercial type 6C4; the tube 1601 is a double triode of the commercial type 6J6; the tubes 1303, 1404 and 1602 are pentodes of the commercial type 6AS6; the tubes 1301, 1307, 1402, 1600, 1607, 1505 and 1508 are pentodes of the commercial type 6AU6; the tubes 1300, 1305 and 1403 are triple-grid tubes, preferably of the RCA developmental type A–5727; and the tubes 1306, 1507, 1603–1606, inclusive, 1609, 1611 and 1613 are hot cathode duo-diodes of the commercial type 6AL5. Preferably, the gas filled thyratrons of the hot cathode type included in the connector 12*b*, namely, the tubes 601, 604, 607, 800, 810, 820, 1500, 1501, 1608, 1610 and 1705 are of the RCA commercial type 5696. The cold cathode gas filled triodes included in the connector 12*b* are preferably of the commercial type 5823. This group includes the tubes 602, 605, 608, 700–708, inclusive, 801A, 801B, 802, 811A, 811B, 812, 821–823, inclusive, 903–907, inclusive, 913–917, inclusive, 924–928, inclusive, 1008–1010, inclusive, 1018–1020, inclusive, 1029, 1030, 1504, 1702 and 1703**.

Before considering the operation of the connector **12*b*, it is pointed out that certain of the circuits of this connector are identical to or substantially identical to the corresponding circuits in the connector disclosed and described in detail in my co-pending application, Serial No. 301,215, identified above. Specifically, the tens, units and party inverter circuits 260, 261 and 262; the tens, units and party sequence timing circuits 212, 216 and 264; the tens, units and party register pulsers 210, 214 and 263; the units and party register advancers 281 and 282; the tens, units and party digit registers 211, 215 and 265; the trunk hunting control circuit 283; the dial impulse integrating circuit 209; the busy lock circuit 219; the dial and busy tone gates in the network 225; the connector pulse forming circuit 217, the conversation timing warning tone circuit 284, the busy gate circuit 220 and the conversation timing control circuit 285 are all substantially identical to the corresponding circuits identified by the same reference numbers in my co-pending application, Serial No. 301,215, identified above. Accordingly, only a general description of these circuits will be made herein in connection with tracing of the above-described revertive and nonrevertive calls, reference being had to my above-identified copending application for a detailed description of the operation of these circuits. However, it will be understood that in order to function properly with the revertive call facilities of the present invention, the above-identified circuits may be employed to control, or are controlled by different circuit arrangements from those disclosed in the above-identified application, as will be described in more detail hereinafter. Code ringing may also be employed in the connector 12***b*, as described in my copending application Serial No. 257,712, identified above, in which case certain changes in the common equipment 17 are necessary, as described above. With code ringing all of the substations on the revertive calling line are rung during the "on" intervals of the selected code ring assigned to the called substation.

In considering the operation of the connector 12*b*, reference is again made to the above-described revertive call originating at the substation A' associated with the line 32 and routed by way of the link 12 to the called substation B' also associated with this line. From the general description of this call, it will be recalled that when the finder-connector link 12 is idle, the finder 12*a* withholds operating anode potential from the conductor 12*c* and also withholds finder gate pulses from the conductor 12*d*. Immediately the finder 12*a* is associated with the calling line 32, the +B switching circuit 201 thereof operates to impress a positive potential of 140 volts on the conductor 12*c* and almost immediately thereafter functions to impress finder gate pulses upon the conductor 12*d* in the time position 63*c* assigned to the calling line 32. When operating anode potential is thus applied to the conductor 12*c*, the primer tubes in the tens digit register 211, the units digit register 215 and the party digit register 265 are fired to prevent the counting tubes of these registers from firing prematurely. When the primer tube 800 in the tens digit register 211 is fired, a relatively large potential is developed across the resistor 826 and is transmitted over the conductor 233 to the control grid of the dial tone gate tube 1511, thereby rendering this tube operative to transmit therethrough a dial tone signal impressed upon the control grid thereof from the dial tone signal conductor 47. The dial tone signal gated through the tube 1511 is impressed upon the third control grid of the calling line out gate tube 1305 over the conductor 244.

At this stage of the revertive call, the potential developed by the revertive call test circuit 296 on the conductor 296*a* has the relatively high positive value 2613 (Fig. 11) and this potential is impressed upon the second control grid of the calling line out gate tube 1305 through the biasing network including the resistors 1370 and 1371 which are connected between the conductor 296*a* and the −100 volt potential source. When a potential of the value 2613 is present on the conductor 296*a*, the second control grid of the tube 1305 is biased correctly to respond to finder gate pulses impressed on this control grid from the conductor 12*d* through the coupling condenser 1372 so that the tube 1305 is conditioned to gate that one of the commutator drive pulses 96*a* appearing on the conductor 35 which coincides with the finder gate pulses appearing upon the conductor 12*d*. The pulses gated by the tube 1305 in the manner described above, which may now be called connector signal pulses and appear in the time position 63*c* assigned to the line 32, are modulated by the dial tone signal impressed upon the third control grid of the calling line out gate tube 1305 and this dial tone signal is transmitted by way of the distributor 15 and the line circuit 16 to the calling line 32 to signal the calling subscriber at the substation A' that the dialing operation may be started.

Referring now more particularly to the calling line in gate circuit 207, the finder gate pulses produced on the conductor 12*d* in the finder 12*a* are employed to control the circuit 207 so that it gates multiplexer pulses occurring on the multiplexer output conductor 50 in the time position 63*c* assigned to the calling line 32 and these gated multiplexer pulses are transmitted to the calling line reconstructor circuit 208 over the conductor 255. However, as discussed generally heretofore in connection with the general description of the system, the calling line in gate circuit 207 is disabled or blocked incident to cut-through on a revertive call so as to prevent audio or speech transmission through the linkage since this speech transmission during a revertive call is both unnecessary and undesirable from the standpoint of positive signal regeneration within the connector 12*b*. More specifically, the calling line in gate circuit 207 is provided with a revertive call control tube 1309 which is jointly controlled by the potentials on the conductors 296*a* and 251 and provides a bias potential for the first control grid of the calling line in gate tube 1303 in the circuit 207. Thus the conductor 251 is connected through the resistor 1375 to the control grid of the tube 1309 and a resistor 1376 is connected from this control grid to the −100 volt supply. A resistor 1377 is connected from the conductor 296*a* to the cathode of the tube 1309 and a resistor 1378 is connected from this cathode to ground.

It will be recalled from the general description of the system that the potential on the conductor 251 is substantially equal to ground potential until cut-through, after which the potential on the conductor 251 rises to the relatively high positive value 2618 and remains at this value for the remainder of the call. Furthermore, the potential value 2618 is produced on the conductor 251 incident to any cut-through operation on either a revertive or a nonrevertive call. The potential on the conductor 296*a* is normally at the relative high positive value 2613 (Fig. 11) and if the call is nonrevertive, the potential on the conductor 296*a* does not change during the entire call. However, if the call is revertive, the revertive call test circuit 296 operates to reduce the potential on the conductor 296*a* to the value 2614 (Fig. 11) and this value is maintained for the duration of the revertive call. The anode of the tube 1309 is connected through the resistor 1379 to the +150 volt supply and is also connected through the potentiometer 1380 and the resistor 1381 to the −100 volt supply.

During periods when the potential on the conductor 251 is substantially equal to ground potential, i.e., before the cut through operation, the operating potential of the control grid of the tube 1309 is sufficiently negative to bias this tube beyond cut-off, irrespective of potential changes on the cathode thereof. Accordingly, the tube 1309 remains cut off until cut-through occurs, irrespective of any potential change on the conductor 296*a*. If the tube 1309 is cut off, the potential at the anode thereof is equal to the +150 volt supply so that the potential at the arm of the potentiometer 1380 provides the correct biasing potential for the first control grid of the calling line in gate tube 1303 so that finder gate pulses impressed upon this control grid from the conductor 12*d* drive this control grid into the conductive region. If the call is non-revertive so that the potential on the conductor 296*a* remains at the relatively high positive value 2613, the tube 1309 remains beyond cut-off even after cut-through occurs and the potential on the conductor 251 increases, due to the fact that the values of the resistors 1377 and 1378 are so chosen that the cathode potential of the tube 1309 is sufficiently positive to hold this tube beyond cut-off even though the control grid potential is increased by the positive cut-through potential developed on the conductor 251. Accordingly, if the call is non-revertive, the tube 1309 remains cut off and the calling line in gate tube 1303 is continuously enabled and is biased correctly to transmit therethrough multiplexer pulses which occur in the time position assigned to the calling line.

On a revertive call, the potential on the conductor 296*a* is decreased by the revertive call test circuit 296 when the revertive call test operation is performed at the end of the second digit. This decreased the cathode potential of the tube 1309 but the control grid potential of the tube 1309 is still highly negative since the potential on the conductor 251 is zero so that the tube 1309 is still prevented from conducting. When cut-through occurs on a revertive call, the combination of a relatively low potential on the conductor 296a and a relatively high potential on the conductor 251 cooperate to cause the tube 1309 to conduct so that the anode potential thereof is decreased. When the anode potential of the tube 1309 is decreased in this manner, the potential at the arm of the potentiometer 1380 is reduced so that the first control grid of the calling line in gate tube is biased sufficiently beyond cut-off that the finder gate pulses appearing on the conductor 12c are not able to drive this control grid into the conductive region. Accordingly, after cut-through on a revertive call, the calling line in gate circuit 207 is completely blocked against transmission therethrough of multiplexer pulses appearing in the time position 63c assigned to the revertive calling line 32. However, it will be understood from the foregoing description that the revertive call control tube 1309 does not block the calling line in gate tube 1303 for non-revertive calls and during a non-revertive call the calling line in gate circuit remains open and gates multiplexer pulses appearing on the multiplexer output conductor 50 in the time position assigned to the calling line to the calling line reconstructor circuit 208. It will also be understood that for a revertive call, the calling line in gate circuit 207 is held open until cut-through so that the connector 12b can respond to the dial impulse modulation on the multiplexer pulses appearing on the conductor 50 in the time position 63c assigned to the calling line 32. Such an arrangement is necessary in order to permit the line selecting facilities, and more particularly the tens and units digit registers 211 and 215 and the party digit register 265 in the connector 12b to function properly and select the called line time position and the called party line ringing signal.

In considering the operational details of the calling line reconstructor circuit 208, it is pointed out that this circuit is identical in many respects to the corresponding circuit shown in my copending application, Serial No. 301,215, identified above. However, in accordance with the revertive call system of the present invention, the peaker tube 1307 in the circuit 208 is also controlled in accordance with the bias potential developed in the calling line in gate circuit 207 so that the peaker tube 1307 is blocked at the same time as the calling line in gate circuit 207 and speech transmission through the system in the calling-called line direction is positively prevented.

The calling line reconstructor circuit 208 functions to store the amplitude of the signal modulated multiplexer pulses transmitted thereto from the in gate circuit 207 for an interval equal to the duration of one pulse frame. In general, this is accomplished by charging the condenser 1410 through the charging tube 1406 in accordance with the amplitude of each pulse repeated to the reconstructor circuit 208 and by discharging this condenser through the discharging tube 1308 just prior to each condenser charging operation. The condenser 1410 is prevented from charging highly positive during periods when the connector 12b is not in use, by means of the voltage divider including the resistors 1320 and 1321 and the right hand diode section of the tube 1306 so that a false dial impulse is not produced when the connector 12b is seized. The discharging tube 1308 is controlled by control pulses which are derived from, and occur coincidentally with, the leading edge of the finder gate pulses which appear on the conductor 12d. More particularly, the peaker tube 1307 is employed to develop at the anode thereof a sharp negative control pulse coincident with the leading edge of each finder gate pulse appearing on the conductor 12d and these negative control pulses are impressed upon the cathode of the discharging tube 1308 so as to render this tube conductive and discharge the condenser 1410 therethrough. As the amplitude of the signal bearing multiplexer pulses impressed upon the control grid of the tube 1406 varies in accordance with intelligence, voice or other signals on the calling line, the voltage across the condenser 1410 is correspondingly varied to detect or reproduce the intelligence component of the multiplexer pulses. The circuit 208 is also arranged to discriminate between directive dial impulses and supervisory signals on the one hand, which are developed across the resistors 1411 and 1412 and are transmitted through the network 1413, 1413a and the rectifier 1515 to the dial impulse integrator circuit 209 and voice or intelligence signals on the other hand which are transmitted through the low pass filter 1415, 1416, 1417 and 1418 and over the conductor 256 to the called line out gate circuit 224.

As described above in connection with the calling line in gate circuit 207, the bias potential developed by the revertive call control tube 1309 does not change during a non-revertive call and, since this potential is coupled over the conductor 207a to the first control grid of the peaker tube 1307 in the calling line reconstructor circuit 208, the circuit 208 likewise remains fully operative during a non-revertive call. However, when a revertive call condition is assumed by the revertive call test circuit 296, the potential on the conductor 207a is reduced, in the manner described above in connection with the calling line in gate circuit 207, so that the peaker tube 1307 is held sufficiently beyond cut-through to prevent this tube from responding to finder gate pulses appearing on the conductor 12d. Accordingly, for a revertive call, the peaker tube 1307 is blocked after cut-through so as to prevent any speech or extraneous signal reconstruction in the circuit 208, thereby preventing speech transmission through the connector 12b in the calling-called line direction for a revertive call. However, it will be noted that the reconstructor circuit 208 is not blocked during a revertive call until after cut-through occurs so that the circuit 208 is operative to transmit dial impulse information to the dial impulse integrator circuit 209 during the initial stages of the revertive call so as to permit the line selecting facilities in the connector 12b to operate.

In considering the operation of the dial impulse integrator circuit 209, the tens inverter circuit 260, the tens register pulser 210, the tens sequence timing circuit 212, the tens digit register 211, the units inverter circuit 261, the units register pulser 214, the units sequence timing circuit 216 and the units digit register 215, it is pointed out that these circuits are substantially identical to the corresponding circuits described in detail in my copending application, Serial No. 301,215, identified above, and reference may be had to this specification for a complete understanding of these circuits. However, for the purposes of the present invention, it may be stated that the dial impulse integrator tube 1508 responds to dial impulse information developed in the reconstructor circuit 208 by developing corresponding control pulses in the anode circuit 1516, 1517 thereof and these control pulses are coupled through the condenser 1518, the left hand section of the tube 1306 and the conductor 227 to the tens and units inverter circuits 260 and 261, the network including the resistors 1325, 1326 and 1327 and the tube 1306 operating to clip off the undesired positive portion of these control pulses. During the first digit, these control pulses are diverted to the tens register pulser 210 which operated to drive the tens digit register 211 to a setting indicating the numerical value of the dialed tens digit, at which setting tens pulses appearing in the tens pulse time interval assigned to the called line are transmitted over the conductor 232 to the connector pulse forming circuit 217. At the start of the first digit the start tube 601 in the circuit 212 is fired so that current flows through the resistor 610 and the condenser 611 is charged through the resistor 612. At the end of the first digit, the tens sequence timing tube 602 fires and develops a positive potential across the resistors 710 and 711 so that the pulser tube 701 is held beyond cut off and the inverter tube 603 is enabled. The units register pulser 214 responds to the control pulses developed by the dial impulse integrator circuit 209 during the second digit by developing corresponding register drive pulses across the resistor 830 and the units digit register 215 is driven to a setting corresponding to the numerical value of the units digit of the called line, at which setting units pulses appearing in the units time position assigned to the called line are transmitted over the conductor 245 to the connector pulse forming circuit 217. At the end of the second or units digit, the units sequence timing tube 605 is fired and develops a positive potential having the value 2612 (Fig. 11) on the conductor 235 which is transmitted through the resistors 715 and 716 to the units register pulser tube cathode to block this tube and to the party inverter tube 606 so as to enable this tube. The potential on the conductor 235 is also transmitted to the revertive call test circuit 296.

In the connector pulse forming circuit 217 the first and third control grids of the tube 1602 are biased negatively by the network 1620, 1621 so that only units pulses appearing in the time position 63c appear at the anode thereof and are coupled through the condenser 1622 and the rectifier 1623 to the first control grid of the tube 1600. A regenerative circuit including the inductance 1626 and feedback condenser 1625 is provided to improve the waveform of the connector pulses developed at the anode of the tube 1600. These connector pulses are also coupled through the network 1633, 1634, 1631 to the tube 1601 wherein they are employed to gate one of the commutator drive pulses 96a over the conductor 239a and through the condenser 1529 and resistor 1530 to the busy test tube 1501. The connector pulses at the anode of the tube 1600 are coupled through the condenser 1520 to the tube 1503 and through the condenser 1522 to the control grid of the busy gate tube 1502. Also, in accordance with the revertive call system of the present invention, the circuit 217 is provided with an additional output conductor 239c, connected to the cathode of the tube 1503, over which connector pulses are transmitted to the revertive call test circuit 296, the called line in gate circuit 223 and the called line reconstructor circuit 222 for reasons which will be described in more detail in connection with these circuits.

Figure 11:
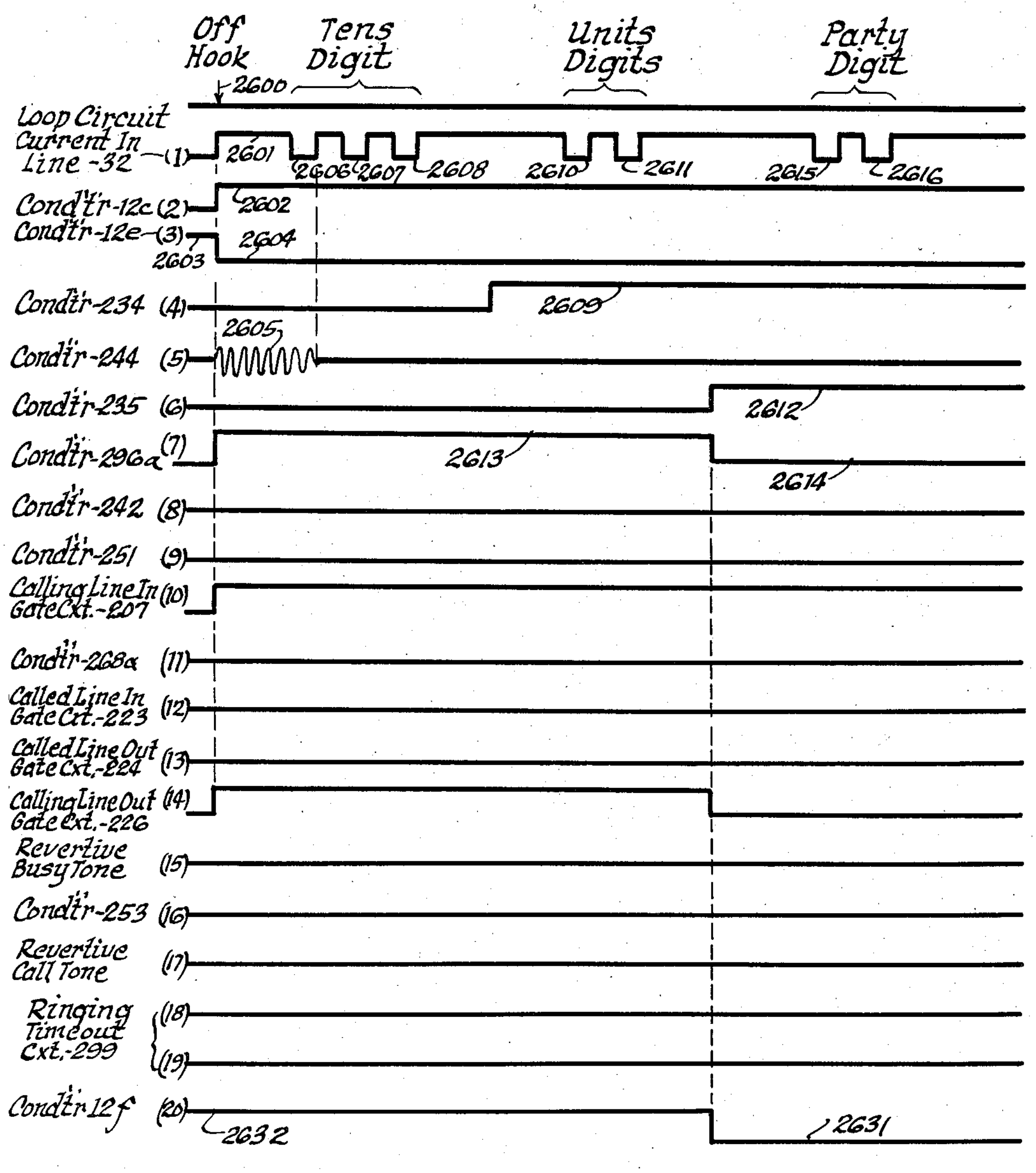
Figure 12:
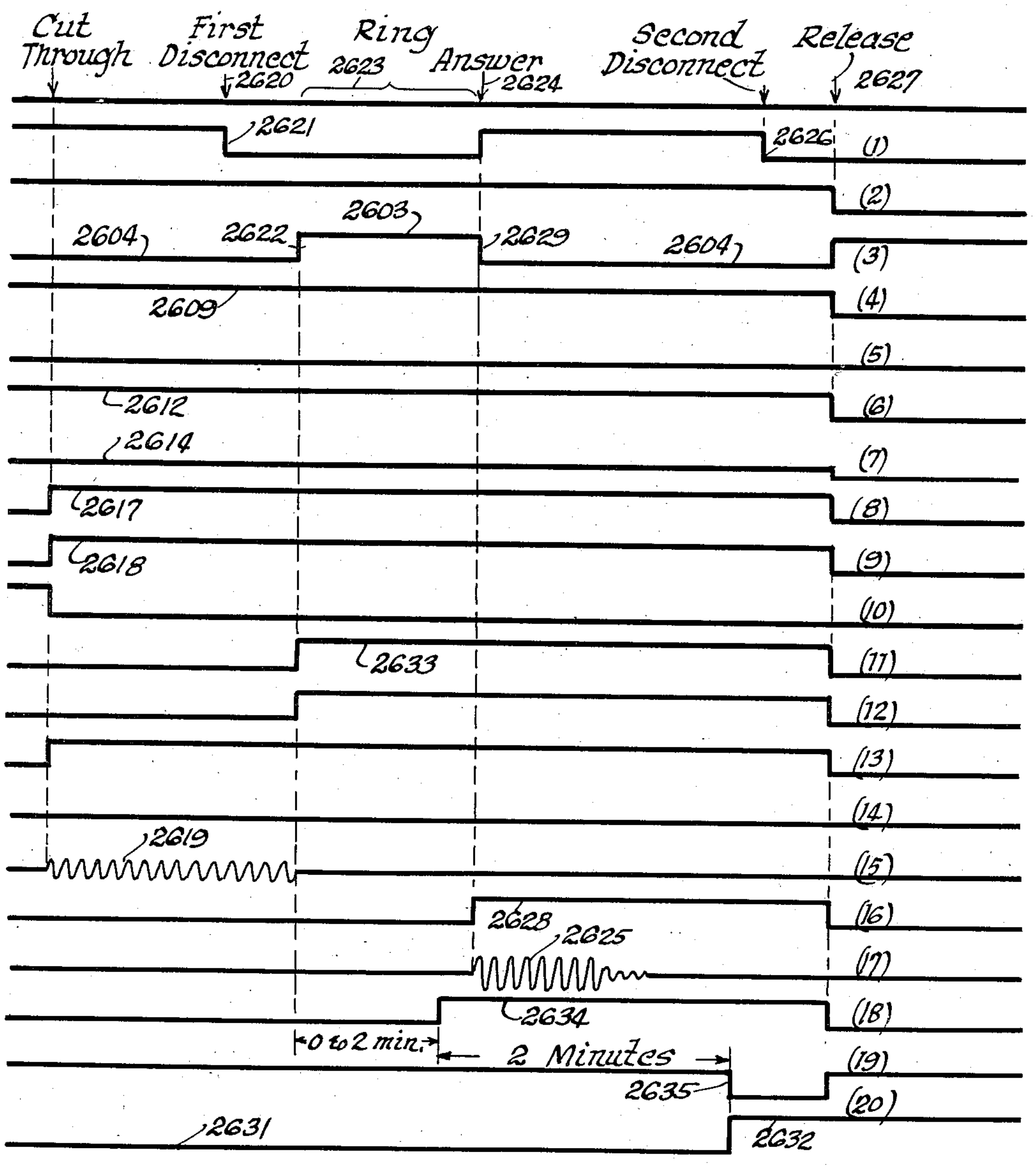

Referring now more particularly to the revertive call test circuit 296, it will be recalled from the general description of the system that the circuit 296 is provided for the purpose of determining whether the call is revertive or non-revertive and for effecting certain changes in the component circuits of the connector 12b so that a revertive call may be set up. In the illustrated embodiment, determination of the revertive or non-revertive character of the call is made by comparing the time position assigned to the calling line with the time position assigned to the called line, and, when these time positions coincide, the revertive call test circuit assumes a revertive call condition in which the potential on the conductor 296a is reduced from the value 2613 to the valve 2614 (Fig. 11).

More specifically, the finder gate pulses appearing on the conductor 12d are coupled through the condenser 1710 to the control grid of the cathode follower tube 1704 and are repeated in like phase across the cathode resistor 1711 of this tube. Also, the connector pulses, which are developed by the circuit 217 in the time position assigned to the called line and appear on the conductor 239c, are coupled through the condenser 1712 to the control grid of the cathode follower tube 1706 and are repeated in like phase across the cathode resistor 1713 of this tube. Both the finder gate pulses appearing on the conductor 12d and the connector pulses appearing on the conductor 239c are of positive polarity. The finder gate pulses produced across the resistor 1711 are coupled through the condenser 1714 to the main control grid of the revertive call test tube 1705, it being recalled that the tube 1705 is preferably a hot cathode gas-filled thyratron of the RCA commercial type 5696. The connector pulses appearing across the resistor 1713 are coupled through the condenser 1715 to the shield grid of the gas tube 1705. The grid resistors 1716 and 1717 of the main control grid and shield grid respectively of the tube 1705 are returned to a biasing network which is controlled by the potential produced on the conductor 235 by the units sequence timing circuit 216. More specifically, a voltage divided network including the resistors 1718, 1719 and 1720 is connected between the −100 volt supply and ground potential so as to establish at the junction point between the resistors 1718 and 1719 a relatively large negative potential which is impressed upon the grid resistors 1716 and 1717 through the series connected resistors 1721 and 1722. The potential at the junction point of the resistors 1718 and 1719 is sufficiently negative that the main control grid and shield grid of the tube 1705 are biased sufficiently beyond cut-off that these control grids cannot respond to finder gate pulses and connector pulses impressed thereon in the manner described above. Accordingly, in the absence of a controlling potential on the conductor 235, the main control grid and shield grid of the tube 1705 are held beyond cut-off so that this tube is prevented from firing.

At the end of the second digit, the units sequence timing circuit 216 functions to impress a relatively large positive potential on the conductor 235 and this potential is coupled through the condenser 1723 to the above-described biasing network so as to increase positively the bias potential on the main control grid and shield grid of the tube 1705. However, the bias potential increase due to the potential on the conductor 235 should not be sufficient to cause the tube 1705 to conduct without coincidence between the finder gate pulses impressed upon the main control grid and the connector pulses impressed upon the shield grid of the tube 1705. Accordingly, a limiting rectifier 1724 is provided, the cathode of which is connected to the junction point of the resistors 1719 and 1720 and the anode of which is connected to the junction point of the resistors 1716, 1717 and 1722. Thus, when a positive potential is coupled to the biasing network, the rectifier 1724 conducts when the bias potential is increased to the value of the potential produced at the junction point of the resistors 1719 and 1720 and operates to prevent any bias potential increase above this value so that the bias on the grids of the tube 1705 is held at a fixed level.

It will be understood that the bias potential value at which the rectifier 1724 conducts is below cut-off for both grids of the tube 1705 so that the controlling potential on the conductor 235 does not of itself cause conduction of the tube 1705. However, when a revertive call is initiated and the finder gate pulses and connector pulses coincide, the bias potential on the control grids of the tube 1705 is sufficiently positive to cause the tube 1705 to be fired. When the tube 1705 fires, the flow of anode current through the anode resistor 1725 thereof reduces the anode potential thereof to a relatively low positive value equal to the voltage drop across the conductive tube 1705. Accordingly, the potential on the conductor 296a, which is connected to the anode of the tube 1705, is reduced from the 140 volt potential appearing on the conductor 12c to a relatively small positive value when the revertive call test circuit 296 assumes a revertive call condition.

In order to provide revertive call facilities which are fully compatible with the trunk hunting operation in the connector 12b, the revertive call test operation is completed before the end of the third digit so that if the call is non-revertive, the normal operations of busy testing, cut-through, trunk hunting, etc., may be performed in the connector 12*b*. More specifically, the potential increase produced on the conductor 235 is differentiated in the coupling condenser 1723 and the associated resistors in the biasing network so that the above-described bias potential increase which is derived from the conductor 235 is of relatively short duration and disappears before the third or party digit is completed. In this connection, it will be understood that the positive potential produced on the conductor 235 by the units sequence timing circuit 216 persists for the duration of the call and if this potential were employed directly to increase the bias potential on the main control grid and shield grid of the tube 1705, the tube 1705 would remain enabled for the duration of the call and trunk hunting through the time position assigned to the calling line would cause the revertive call test circuit 296 to assume a revertive call condition such that the circuits controlled thereby would be thrown to a revertive call setting and the trunk hunting facilities would be rendered completely inoperative. However, by delaying the trunk hunting operation until after the end of the third digit and by enabling the revertive call test tube 1705 only for a short period of time which ends before the end of the third digit, the above-described interaction between the revertive call test facilities and the trunk hunting facilities is avoided. It will be noted that the revertive call test tube 1705 is energized from the +B switch conductor 12*c* so that when the link 12 is released and potential is removed from this conductor, the tube 1705 is extinguished and the revertive call test circuit 296 is reset to its initial or non-revertive call position.

In order to prevent the finder 12*a* from releasing the link 12 when the calling party hangs up to permit completion of the revertive call in the manner described generally heretofore, the revertive call test circuit 296 also functions to develop a revertive call hold signal on the conductor 12*f* which is transmitted to the +B switching circuit 201 in the finder 12*a* to prevent this circuit from releasing the link 12, as described in detail heretofore in connection with the finder 12*a*. More specifically, a voltage divider network including the series resistors 1726 and 1727 is connected from the anode of the tube 1705 to the −100 volt supply. When the revertive call test circuit 296 assumes a revertive call condition in the manner described immediately above, the potential decrease at the anode of the tube 1705 is impressed upon the divider network 1726, 1727 so that the potential on the conductor 12*f*, which is connected to the junction point of the resistors 1726 and 1727, is made highly negative. The junction point of the resistors 1726 and 1727 is also connected through the resistor 1728 to the ring trip conductor 253 associated with the ring trip circuit 221. However, it will be recalled from the general description of the system that the potential on the conductor 253 is substantially equal to ground potential until the revertive call is answered. Accordingly, the values of the resistors 1726, 1727 and 1728 are so chosen that a relatively high negative potential is produced on the conductor 12*f* when the tube 1705 is fired and the conductor 253 is at ground potential.

In considering the operation of the party inverter circuit 262, the party register pulser 263, the party sequence timing circuit 264, and the party digit register 265, it is pointed out that these circuits are substantially identical in their operation to the corresponding circuits described in detail in my copending application, Serial No. 301,215, identified above, and reference may be had to this application for a detailed description of these circuits. However, for the purposes of the present invention, it may be stated that during the third or party digit, the control pulses developed by the dial impulse integrator circuit 209 are transmitted through the party inverter circuit 262 and fire the party register pulser tube 707 so that corresponding register drive pulses are produced across the resistor 840 and the party digit register 265 is driven to a setting at which the interrupted ring back tone signal corresponding to the numerical value of the third digit is impressed upon the output conductor 275 of the register 265 and is transmitted to the ringback tone gate tube 1607. When the condenser 625 is charged at the end of the third digit, the party sequence timing circuit 264 operates to develop a positive potential on the conductor 242 which is transmitted to the party register pulser 263 to block this circuit from repeating further pulses, and is also transmitted to the busy test circuit 218, the busy lock circuit 219, and the trunk hunting control circuit 283 to condition these circuits to perform their respective functions.

Referring now more particularly to the busy test circuit 218, it is pointed out that this circuit in general performs the same functions and is similar to the corresponding circuit described in detail in my copending application, Serial No. 301,215, identified above. However, the busy test circuit 218 of the present invention is provided with revertive call responsive facilities for permitting completion of the revertive call, irrespective of the busy condition of the revertive line, as will be described in more detail hereinafter.

From the general description of the system, it will be recalled that the circuit 218 performs the function of comparing the time position of the busy test pulses developed by the connector pulse forming circuit 217 on the conductor 239*a* with the time positions of busy pulses which may be present on the busy pulse in conductor 52*b* to determine whether or not the called line is idle or busy. For a non-revertive call, if the called line is idle, coincidence is lacking between the time position of the busy test pulses produced by the circuit 217 and the time positions occupied by the busy pulses present on the conductor 52*b*. In such case, the circuit 218 functions to impress a cut-through potential on the conductors 251 and 251*a* which is employed to complete the call in the manner generally described heretofore. However, in the illustrated revertive call, the calling and called lines are one and the same and the finder 12*a* impresses busy pulses upon the conductor 52*b* in the time position 63*c* assigned to the revertive calling line 32 while, at the same time, the connector pulse forming circuit 217 develops busy test pulses on the conductor 239*a* in the same time position. Accordingly, without additional facilities the busy test circuit 218 would always indicate that the called line is busy and would not impress cut-through potentials on the conductors 251 and 251*a* so that the revertive call would be blocked at this point in the system.

In order to prevent blocking of the revertive call at the busy test circuit 218, there is provided in this circuit means responsive to the revertive call test operation for controlling the busy test operation so that the revertive call may be completed. More specifically, the potential change, produced on the conductor 296*a* by the revertive call test circuit 296 when a revertive call is in progress, is employed to bias the busy test inverter tube 1505 beyond cut-off. Thus, the conductor 296*a* is connected through the resistor 1585 to the control grid of the inverter tube 1505 and this control grid is connected through the resistor 1586 to the −100 volt supply. From the above description of the revertive call test circuit 296, it will be recalled that the potential on the conductor 296*a* is substantially equal to the +140 volt potential on the conductor 12*c* during non-revertive calls. Accordingly, the values of the resistors 1585 and 1586 are so chosen that the control grid of the tube 1505 is biased so that this tube responds to the busy pulses impressed thereon from the conductor 52*b*, these busy pulses appearing in the time positions assigned to other busy lines in the system. Accordingly, for a non-revertive call, the positive busy pulses appearing on the conductor 52*b* are amplified and inverted in the tube 1505 and are coupled through the condenser 1525 to the shield grid of the busy test tube 1501.

The shield grid of the tube 1501 is normally biased negatively by means of the voltage divider network including the resistors 1526 and 1527 which are connected between the conductor 242 and the −100 volt supply. However, at the end of the third digit, the positive potential impressed upon the conductor 242 by the party sequence timing circuit 264 increases the bias potential on the shield grid of the tube 1501 so that this shield grid is operated at substantially zero bias and the negative busy pulses impressed upon this shield grid serve to drive this grid negative with respect to the cathode potential thereof. At the same time, the positive busy test pulses developed by the connector pulse forming circuit 217 in the time position assigned to the called line are impressed upon the control grid of the tube 1501 through the coupling condenser 1529. If no busy pulse is present on the shield grid of the busy test tube 1501 coincidentally with a busy test pulse appearing on the control grid of this tube, the tube 1501 is fired by the busy test pulse so as to indicate the idle condition of the called line. However, if the busy pulses delivered to the shield grid of the tube 1501 coincide with the busy test pulse, the tube 1501 is prevented from firing and the busy condition of the called line is indicated.

On a revertive call, the called line is always indicated as being busy since the finder 12*a* impresses busy pulses occurring in the time position assigned to the revertive calling line on the conductor 52*b* and these pulses are impressed upon the shield grid of the tube 1501 to prevent this tube from firing. However, when a revertive call is in progress, the revertive call test circuit 296 operates to reduce the potential on the conductor 296*a* so that the bias conditions on the inverter tube 1505 are changed and the control grid of this tube is driven beyond cut-off so as to prevent transmission through this tube of any busy pulses appearing on the conductor 52*b*. Accordingly, the busy test tube 1501 responds to the busy test pulses impressed upon the main control grid thereof by firing so that a cut-through potential is produced upon the conductors 251 and 251*a* in a manner similar to the operation of the busy test circuit 218 on a non-revertive call when the called line is idle.

In the event that the call is a non-revertive call and the called line is busy, the tube 1501 is prevented from firing in the manner described above so that the called line is indicated as being busy. If the called line is marked as a private branch exchange trunk, the trunk hunting operation in the connector 12*b* is then initiated and the setting of the units digit register 215, and, if necessary, the setting of the tens digit register 211 is changed either to the time position of an idle line within the called line trunk group, or in the alternative, to the time position assigned to the last line within the called line trunk group.

In considering the operation of the units register advancer 281, the trunk hunting control circuit 283, and the tens register advancer 280, it is pointed out that these circuits are substantially identical to the corresponding circuits described in detail in my copending application, Serial No. 301,215, identified above, and reference may be had to this application for a detailed description of these circuits. However, for the purposes of the present invention it may be stated that the potential developed on the conductor 242 is impressed upon a voltage divider network 1335, 1336 and 1337 so that the three control grids of the tube 1300 are enabled. When busy pulses coupled to the second control grid through the condenser 1332 from the conductor 52*b*, trunk marking pulses coupled to the first control grid of the tube 1300 through the condenser 1333 from the conductor 56*a*, and connector pulses coupled to the third control grid of the tube 1300 through the condenser 1330 and the resistor 1331 all coincide, the tube 1300 conducts and a negative potential is developed across the anode resistor 1334 thereof. This potential is coupled through the network 1338, 1339, 1340, 1341, 1342, 1343 and 1344 to the control grid of the tube 1301 and appears as a positive signal across the anode resistor 1345 of this tube. This signal is transmitted over the conductor 288 and through the resistor 720 to the control grid of the units register advancer tube 705 so that this tube is permitted to respond to the trunk hunting drive pulses appearing on the conductor 55*a* by developing corresponding register drive pulses across the resistor 730 which step the register 215 by single time position increments until an idle line is found. If an idle line is not found within the called line tens level, a recycling pulse is coupled through the condenser 835 to the counting tube 811B in the register 215 and is also coupled through the condenser 725 to the control grid of the tens register advancer tube 702 to advance the setting of the register by one tens pulse interval.

As described above, the trunk hunting operation is not initiated until after the third digit has been completed so as to permit the above-described revertive call test operation at the end of the second digit. It will also be noted that the entire trunk hunting operation is entirely compatible with the above-described operation of the busy test circuit 218 on a revertive call since, under these conditions, the circuit 218 functions to impress a cut-through potential on the conductor 289 which prevents the units register advancer 281 from changing the settings of the units digit register 215 and the tens digit register 211. It will be noted that in the trunk hunting circuit of the present invention, the tens register advancer tube 702 is not controlled by the units sequence timing circuit 216, but instead is continuously conditioned to respond to a recycling pulse developed on the conductor 286 by the units digit register 215. Thus, the control grid of the tube 702 is connected to ground through the resistor 735 in the trunk hunting circuit of the present invention.

Considering now the operation of the busy lock circuit 219, it is pointed out that this circuit is substantially identical to the corresponding circuit shown and described in detail in my copending application, Serial No. 301,215, and reference may be had to this specification for a detailed description of this circuit. Insofar as the present invention is concerned, it is pointed out that for a non-revertive call the busy lock circuit 219 establishes a busy test interval at the end of which the busy test circuit is disabled if the called line is busy and a busy tone is transmitted to the calling subscriber to inform him that the called line is busy. Also, for a non-revertive call if the called line is a member of a trunk group and all of the lines in this trunk group are busy, the busy lock circuit 219 functions to disable the busy test circuit 218 and transmit a busy tone to the calling subscriber. However, for revertive calls, the busy test circuit 218 is operated in the manner described above so that a disabling potential is produced on the conductor 251*a* thereby preventing the busy lock circuit 219 from operating at the end of the normal busy test interval.

Considering now the details of the revertive call busy tone gate circuit 298, it will be recalled from the general description of the system, that this circuit responds to cut-through on a revertive call, by gating a revertive call busy tone derived from the generator 29*e* in the common equipment 17. More specifically, the revertive call busy tone signal produced by the generator 29*e* is transmitted over the conductor 49*a* and through the coupling condenser 1730, to the control grid of the revertive call busy tone gate tube 1700. The conductor 296*a* is connected to the cathode of the tube 1700 through the resistor 1731, and this cathode is connected to the −100 volt supply through the resistor 1732. The code start conductor 268*a* is also connected to the cathode of the tube 1700 through the resistor 1733. The anode of the tube 1700 is connected through the resistor 1734 to the cut-through conductor 251.

Considering now the operation of the revertive call busy tone gate circuit 298, when a revertive call is in progress the revertive call test circuit 296 assumes a revertive call condition wherein the potential on the conductor 296*a* is substantially reduced. The values of the resistor 1731 and 1732 are so chosen that under these conditions the cathode of the tube 1700 is biased so that the revertive call busy tone signal impressed upon the control grid thereof is transmitted through this tube and appears at the anode thereof. However, it will be noted that anode potential for the tube 1700 is derived from the cut-through conductor 251. Accordingly, the tube 1700 does not function to gate therethrough a revertive call busy tone signal until the busy test circuit 218 is operated in the manner described above, and a cut-through potential is impressed on the conductor 251 by the circuit 218. The revertive call busy tone signal gated by the tube 1700 is coupled through the condenser 1735 and the resistor 1736 to the conductor 298*a*, over which conductor this tone signal is transmitted to the third control grid of the called line outgate tube 1403 in the circuit 224.

Considering now the details of the called line outgate circuit 224, it is pointed out that this circuit is substantially identical to the corresponding circuit described in detail in my copending application, Serial No. 301,215, identified above, and responds to connector pulses delivered thereto over the conductor 239 and commutator drive pulses 96*a* delivered thereto over the conductor 35, by transmitting over the conductor 51 to the distributor 15 connector signal pulses which occur in the time position 63*c* assigned to the revertive calling line 32. More specifically, the commutator drive pulses appearing on the conductor 35 are coupled to the first control grid of the tube 1403, and the connector pulses which are developed on the conductor 239 by the connector pulse forming circuit 217 are impressed upon the second control grid of the tube 1403.

In order that the circuit 224 will not transmit therethrough pulses occurring in the time position assigned to the called line before the busy test operation is completed, the conductor 239 is connected to the cut-through conductor 251 through the illustrated resistor 1551, and the rectifier 1550. Accordingly, before the busy test operation is completed, the second control grid of the tube 1403 is highly negative so that the tube 1403 is prevented from gating therethrough any of the commutator drive pulses appearing on the conductor 35. However, after the busy test circuit 218 impresses a positive potential on the conductor 251, the tube 1403 is conditioned to transmit therethrough connector signal pulses which occur in the time position assigned to the called line. It will be noted that the tube 1403 is conditioned for pulse transmission after cut-through for both revertive and non-revertive calls so that this tube may be employed to transmit different supervisory tone signals to the revertive calling line while the revertive call is being set up.

As described immediately above, when cut-through occurs on a revertive call, the revertive call busy tone gate circuit 298 functions to impress a revertive call busy tone signal on the conductor 298*a* which is transmitted to the third control grid of the tube 1403 in the circuit 224. This revertive call busy tone signal is modulated on the connector signal pulses developed at the anode of the tube 1403 and these tone modulated connector signal pulses are transmitted over the conductor 51 to the distributor 15. In the distributor 15, the revertive call busy tone signal is reconstructed and transmitted by way of the line circuit 16 to the revertive calling line 32, so as to inform the calling party that a revertive call is in progress and that he should hang up for a short period of time while his line is being rung in accordance with the party line ringing signal assigned to the called substation B' and then come back off hook to complete the revertive call.

When the calling party at the substation A' hangs up in response to the above described revertive call busy tone signal, the loop circuit including the conductors of the line 32 is broken and the line circuit 16 immediately operates to increase the bias potential on the conductor 45*b* so that multiplexer pulse transmission over the conductor 50 in the time position 63*c* is terminated. As described above in connection with the finder 12*a*, the +B switching circuit 201 in this finder responds to multiplexer pulse termination by transmitting a revertive ring start signal over the conductor 12*e* to the code start circuit 268 in the connector 12*b*, to condition the circuit 268 to initiate ringing. Also, it will be noted that the revertive call test circuit 296 functions to reduce the potential on the conductor 296*a* at the end of the second digit when the revertive call test operation is successful so that the +B switching circuit 201 in the finder 12*a* is prevented from releasing the link 12 in response to multiplexer pulse termination when the calling subscriber hangs up in response to the above-described revertive call busy tone signal.

Considering now the details of the code start circuit 268, the revertive ring start signal impressed upon the conductor 12*e* is transmitted to the control grid of a code start control tube 1612. In order to prevent the potential on the conductor 12*e* from becoming positive with respect to ground potential, the anode of a diode 1613 is connected to the conductor 12*e* and the cathode of this diode is connected to ground. The anode of the tube 1612 is connected to the +150 volt supply and the cathode of this tube is connected through the resistor 1680 to the −100 volt supply. The cathode potential of the control tube 1612 is employed as a bias potential source for the code start tube 1608 and the cathode of the tube 1612 is connected through the resistors 1681 and 1682, to the main control grid of the tube 1608. Bias potential for the control grid 1608 is also determined in part by the potential on the conductor 296*a* which is connected to the resistor 1681 through the resistor 1683. The code start pulses developed by the code forming circuit 99 in the common equipment 17 at the start of each code ringing period, are transmitted over the conductor 5 and through the coupling condenser 1650 and the resistor 1682 to the main control grid of the code start tube 1608. The anode of the tube 1608 is energized from the cut-through conductor 251 which is coupled through the network 1640, 1641 to the conductor 251*a*.

Considering now the operation of the code start circuit 268, it will be understood from the foregoing general description of the system that the circuit 268 initiates ringing since this circuit controls the ringback tone gate tube 1607 which in turn controls the transmission of a ringing control signal to the line circuit associated with the called line. For a non-revertive call it is desirable to have the code start circuit operate immediately after cut-through, i.e., upon the occurrence of the first code start pulse after cut-through, in order to complete the call as soon as possible. However, for a revertive call, ringing must not be initiated until after the calling party has been informed by means of the above described revertive call busy tone signal that the call is revertive and the calling party has hung up. Since the revertive call busy tone signal is not transmitted until after cut-through and the subscriber may take several seconds to hang up, it will be evident that the code start circuit 268 is called upon to operate under different conditions for revertive and non-revertive calls.

Considering first the operation of the code start circuit 268 for a non-revertive call, when cut-through occurs and a positive potential is produced in the conductor 251, anode potential is supplied to the tube 1608. For a non-revertive call, the potential on the conductor 296*a* is at a high positive value such that the rectifier 1684 is conducting and the bias potential determined by the resistors 1685 and 1686 is impressed upon the control grid of the tube 1608. This bias potential is sufficiently positive to permit the tube 1608 to respond to code start pulses appearing on the conductor 5, so that the code start tube 1608 is fired in response to the first code start pulse appearing on the conductor 5 after cut-through potential is applied to the anode of the tube 1608. During this period of operation the potential on the conductor 12*e* is highly negative so that the control tube 1612 is cut off. Accordingly, the values of the resistors 1680 and 1683 are so chosen that with a relatively high positive value 2613 (Fig. 11) on the conductor 296*a* the potential at the junction point of these resistors is more positive than the potential of the junction point of the resistors 1685 and 1686 so that the rectifier 1684 conducts and the control grid of the tube 1608 is operated at the correct potential to permit this tube to respond to code start pulses appearing on the conductor 5, this correct operating point being determined by the resistors 1685 and 1686.

Considering now the operation of the code start circuit 268 for a revertive call, when the revertive call test circuit 296 assumes a revertive call condition, the potential on the conductor 296*a* is decreased to a relatively low positive value so that the potential at the junction point of the resistors 1680 and 1683 is negative with respect to ground and the crystal rectifier 1684 is rendered non-conductive. This negative value of potential is sufficient to hold the control grid of the tube 1608 beyond cut-off and prevent this tube from responding to code start pulses. Accordingly, when cut-through occurs on a revertive call, the control grid circuit of the tube 1608 is already biased highly negatively so that the tube 1608 does not immediately respond to code start pulses.

After cut-through on a revertive call, the above described revertive call busy tone signal is transmitted to the calling party and he responds thereto by hanging up, thereby breaking the loop circuit including the conductors of the line 32. When this loop circuit is broken, the +B switching circuit 201 in the finder 12*a* responds by increasing the potential on the conductor 12*e*, this increase in potential being referred to as a revertive ring start signal. When the potential on the conductor 12*e* is increased sufficiently in the positive direction, the control tube 1612 conducts so that the potential at the cathode of this tube is increased positively by an amount sufficient to cause the crystal rectifier 1684 to again become conductive. When this occurs, the bias potential for the control grid of the tube 1608 again becomes equal to the potential at the junction point of the resistors 1685 and 1686 so that the tube 1608 is conditioned to respond to the next code start pulse appearing on the conductor 5, and the tube 1608 is fired in response thereto. In this connection it will be noted that the diode rectifier 1612 connected between the conductor 12*e* and ground potential operates to prevent the potential on the conductor 12*e* from increasing positively relative to ground potential so that the positive limit of the revertive ring start signal produced on the conductor 12*e* is equal to ground potential. The circuit constants are so chosen that with the control grid potential of the tube 1612 equal to ground, the rectifier 1684 conducts and the bias potential on the control grid of the tube 1608 is suitable for permitting this tube to respond to code start pulses.

Assuming that the code start tube 1608 is fired, on either a revertive or a non-revertive call in the manner described above, when this tube fires a large positive potential is produced across the cathode resistor 1651 of this tube and this potential is impressed upon a voltage divider network including the resistors 1687 and 1688 connected between the cathode of the tube 1608 and the −100 volt supply. When the tube 1608 fires, the potential at the junction point of the resistors 1687 and 1688 increases positively until ground potential is reached at which point the rectifier 1611 conducts so as to hold this potential at ground. This potential is then transmitted over the conductor 241 and impressed upon the first control grid of the ringback tone gate tube 1607 in the network 225. As a result, this tube is conditioned to respond to the interrupted ringback tone signal transmitted thereto over the conductor 275.

The code start potential produced at the cathode of the tube 1608 when this tube fires is also transmitted over the conductor 268*a* to the ringing timeout circuit 299, the revertive call busy tone gate circuit 298, and the called line reconstructor circuit 222 to condition these circuits to perform their respective functions as described in more detail hereinafter. In the revertive call busy tone gate circuit 298, the positive code start potential produced on the conductors 268*a* is coupled through the resistor 1733 to the cathode of the tube 1700 so as to bias this tube beyond cut-off and terminate transmission therethrough of the revertive call busy tone signal. Accordingly, transmission of the revertive call busy tone signal over the line 32 is terminated after the calling party responds thereto by hanging up and the code start circuit 268 is operated in response to the revertive ring start signal produced on the conductor 12*e* in the manner described immediately above.

When the ring back tone gate tube 1607 is conditioned in the manner described above by the application of a code start potential to the control grid thereof, the tube 1607 transmits therethrough the interrupted ring back tone signal appearing on the conductor 275 in accordance with the party line ringing signal selected in the party digit register 265. The interrupted ring back tone signal gated through the tube 1607 is transmitted through the condenser 1560 and the resistor 1561 and over the conductor 244 to the third control grid of the calling line outgate tube 1305 in the circuit 226.

The calling line outgate circuit 226 is identical in many respects to the corresponding circuit shown and described in detail in my copending application, Serial No. 301,215, and reference may be had to this application for a detailed description of this circuit. However, for a revertive call, the calling line outgate circuit 226 is only required to return a dial tone signal when the call is first initiated. On a revertive call, the called line outgate circuit 224 develops a connector signal pulse which is in the same time position as the calling line connector signal pulses developed by the circuit 226 and the anode circuits of these tubes are connected together to the common distributor output conductor 51. Accordingly, the calling line outgate circuit 226 is disabled by the revertive call test circuit 296 on a revertive call, so that only a single connector signal pulse is produced in the calling-called line time position and the distributor 15 is not thrown out of its normal operating range. Thus, as soon as the revertive call test circuit 296 assumes a revertive call condition, i.e., at the end of the second digit, the potential on the conductor 296*a* is reduced so that the second control grid of the calling line outgate tube 1305 is biased well beyond cut-off such that this tube does not respond to finder gate pulses appearing on the conductor 12*d* and no connector signal pulses are produced at the anode of this tube.

It will therefore be evident that in the illustrated revertive call, when the interrupted tone signal is gated through the ring back tone gate tube 1607 this interrupted ring back tone signal is impressed upon the third control grid of the tube 1305 but is not transmitted through this tube since it is blocked in the manner described above for a revertive call. However, the interrupted ring back tone signal which is gated through the tube 1607 is rectified in the circuit including the rectifier 1563 so as to reproduce the ringing pulses constituting the selected party line ringing code and this rectified ringing signal is transmitted over the conductor 295 and through the resistors 1430 and 1420 to the third control grid of the called line out gate tube 1403.

Figure 26:
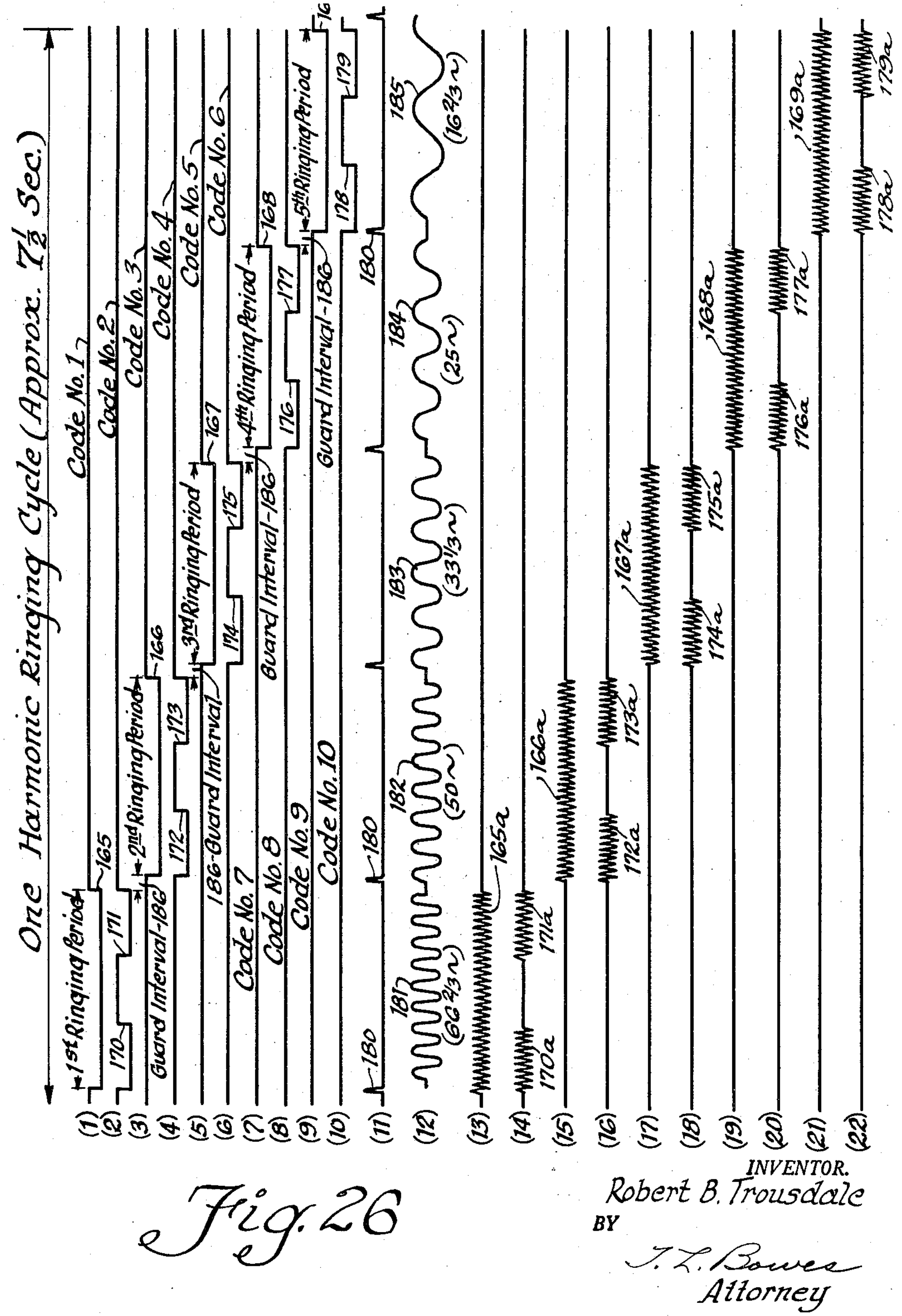
Figure 27:
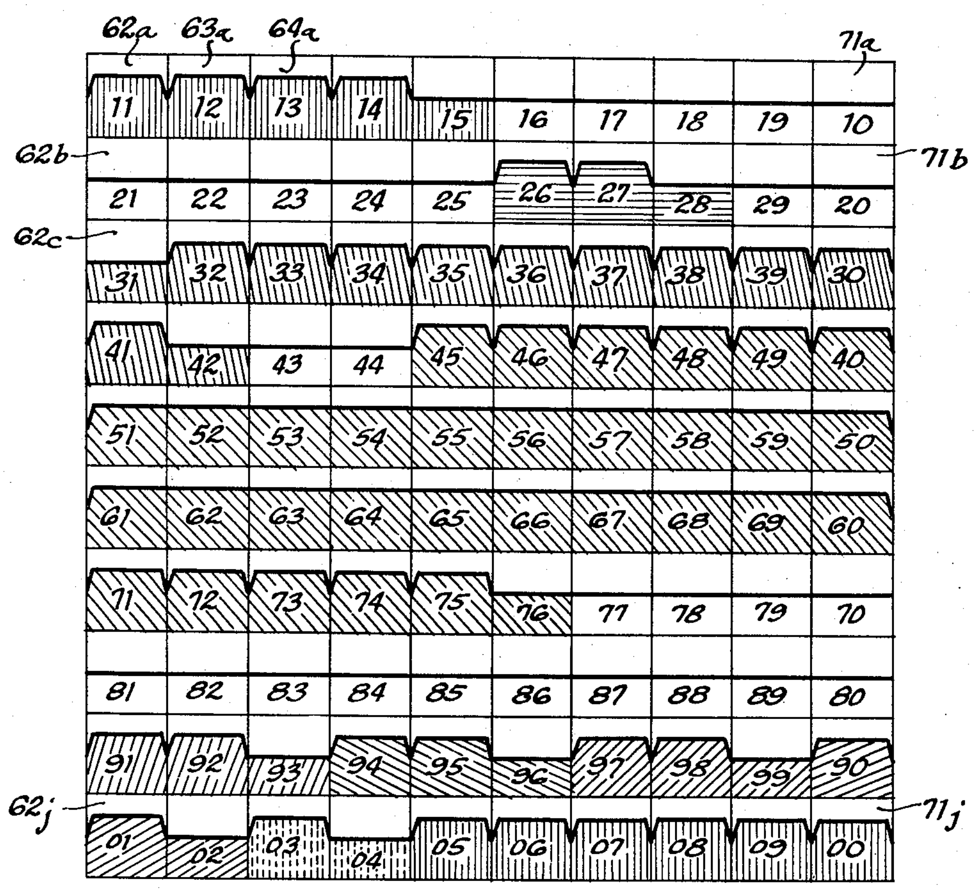

It will be recalled from the above description that the called line out gate tube 1403 is enabled incident to cut through on both revertive and non-revertive calls so that this tube is operative to develop connector signal pulses on the conductor 51 in the time position 63c assigned to the revertive calling line 32. The ringing pulses impressed upon the third control grid of the called line out gate tube 1403 are sufficiently large to render this tube highly conductive for the "on" intervals of these pulses so that during these intervals the tube 1403 releases connector signal pulses which are of approximately 50% greater amplitude than the amplitude of the normal connector signal pulses released by this tube. These large amplitude connector signal pulses are transmitted over the conductor 51 to the distributor 15 wherein they are detected and routed to the line circuit 16. The line ringing facilities in the line circuit 16 are actuated in accordance with the amplitude changes in the connector signal pulses so that during the intervals of the ringing pulses 170 and 171 (Fig. 26), which constitute the code #2 party line ringing signal selected in the party digit register 265, ringing current is transmitted over the line 32. In this connection it will be recalled that during the intervals of the pulses 170 and 171, a 66⅔ cycle per second ringing current is multiplexed to the conductor 61a so that only 66⅔ cycle per second ringing current is transmitted over the called line 32 and then only during the intervals of the ringing pulses 170 and 171 which constitute the code #2 party line ringing signal. As a result the ringers at both the substation A′ and the substation B′ are rung during the "on" intervals of the #2 party line ringing signal.

Ringing of both the party line substations A′ and B′ persists until the revertive call is answered at one of these substations. Since the link 12 is held operatively associated with the line 32 independently of whether or not a calling condition exists on this line, if the revertive call is abandoned at the substation A′ and is not answered at the called substation B′, the ringers at these substations would continue to be rung indefinitely and the link 12 would remain operatively associated with the line 32 and tie up both this line and the link 12. In order to prevent this situation there is provided the ringing timeout circuit 299 which is operative on both revertive and non-revertive calls to release the link 12 a predetermined time interval after ringing is initiated if the call is not answered at either the calling or called substation.

Considering now the details of the ringing timeout circuit 299, the code start potential produced on the conductor 268a by the code start circuit 268 in the manner described above is coupled through the resistor 1740 to the control grid of the ringing primer tube 1702, this control grid being connected to ground through the resistor 1741. Ringing timeout pulses developed by the generator 57, preferably at two minute intervals, are transmitted over the conductor 57b and through the condenser 1742 to the control grid of the ringing primer tube 1702. The anode of the tube 1702 is energized from the +B switch conductor 12c and the cathode of this tube is connected through the resistors 1743 and 1744 to ground, a condenser 1745 being connected across the bottom cathode resistor 1744. The ringing timeout pulses produced on the conductor 57b are also coupled through the condenser 1746 to the control grid of the ringing timeout control tube 1703, this control grid being connected through the resistor 1747 to the junction point of the cathode resistors 1743 and 1744 of the tube 1702. The cathode of the tube 1703 is connected to ground and the anode thereof is connected through the resistor 1748 to the +B switch conductor 12c.

Ringing timeout pulses developed on the conductor 57b are continuously impressed upon the control grids of the tubes 1702 and 1703. However, until a positive code start potential is developed on the conductor 268a, the values of the resistors 1740 and 1741 are such that the bias potential on the control grid of the tube 1702 is sufficiently negative that the tube 1702 does not respond to ringing timeout pulses impressed upon the control grid thereof. Also, until the tube 1702 fires the control grid potential of the tube 1703 is equal to ground potential so that this tube does not respond to ringing timeout pulses impressed upon the control grid thereof from the conductor 57b. In this connection it will be understood that the tubes 1702 and 1703 are cold cathode gas tubes preferably of the commercial type 5823, and the control grids thereof require a positive potential relative to the cathode thereof before the tube will fire.

As soon as the code start circuit 268 develops a code start potential on the conductor 268a, the potential on the control grid of the primer tube 1702 is increased positively so as to enable this tube to respond to the next occurring ringing timeout pulse impressed upon the control grid thereof from the conductor 57b so that the tube 1702 is fired in response to this pulse and a relatively large potential is produced across the cathode resistors 1743 and 1744 thereof. The potential developed across the resistor 1744 when the tube 1702 fires is employed by an enabling bias potential for the control tube 1703. However, in order to prevent the control tube 1703 from firing in response to the same timeout pulse which fires the primer tube 1702, there is provided the condenser 1745 which is connected across the resistor 1744. The resistor 1744 and condenser 1745 have a sufficiently long time constant to prevent the potential across the resistor 1744 from increasing positively by an amount sufficient to permit the tube 1703 to be fired until after the ringing timeout pulse has disappeared from the conductor 57b. However, this time constant is sufficiently short to establish the desired enabling bias potential for the control grid of the tube 1703 so that this tube will be fired in response to the next occurring ringing timeout pulse on the conductor 57b. Accordingly, approximately two minutes after the primer tube 1702 is fired the next occurring ringing timeout pulse fires the tube 1703 so that a negative potential is produced across the anode resistor 1748 of this tube. This negative change at the anode of the tube 1703 is in the form of a step function and the initial portion of this negative potential change is coupled through the condenser 1749 to the ring trip conductor 253 and is transmitted over this conductor to the ring trip circuit 221. It will thus be evident that the ringing timeout circuit 299 operates to develop a negative control pulse or signal on the ring trip conductor 253 a predetermined time interval, preferably between two and four minutes after the code start potential is developed on the conductor 268a.

Considering now the details of the ring trip circuit 221, it will be recalled from the general description of the system that this circuit is provided for the purpose of terminating ringing by disabling or blocking the ring back tone gate tube 1607 and enabling the conversation timing facilities of the connector 12b including the party register advancer 282, the party digit register 265, the conversation timing warning tone circuit 284 and the conversation timing control circuit 285. Also the ring trip circuit 221 functions to change the potential on the conductor 12f concurrently with ringing termination so that the finder 12a may release in response to the second disconnect signal transmitted over the revertive calling line, and also enables the revertive call tone gate circuit 297 so that a short revertive call tone signal may be transmitted over the revertive calling line to inform the answering party that the call is revertive and that he should await completion of the revertive call.

In considering the operation of the ring trip circuit 221, it is pointed out that this circuit in general functions in the same manner as the corresponding circuit shown and described in detail in my copending application Serial No. 301,215, identified above. However, the ring trip circuit 221 of the present invention is arranged to respond to additional control signals and is employed to control additional circuits in accordance with the revertive call facilities of the present invention as described generally heretofore in connection with the general description of the system. More specifically, the ring trip circuit 221 of the present invention is arranged to respond to the above described negative control signal impressed upon the ring trip conductor 253 by the ringing timeout circuit 299 and is also arranged to respond to a control signal developed on the conductor 252 in the called line reconstructor circuit 222 in response to a normal call answering operation at the called or revertive calling line.

Considering first the operation of the ring trip circuit 221 in response to the above described negative control signal developed by the circuit 299 on the conductor 253, the control grid of the ring trip tube 1500 is normally biased negatively by means of the resistor 1587 which is connected between the control grid of the tube 1500 and the −100 volt supply. Before the call is answered, the potential on the conductor 252 is also negative so that the tube 1500 is biased beyond cut-off even after an enabling potential is impressed upon the anode of this tube from the cut-through conductor 251 when cut-through occurs. However, after ringing continues for an interval of from two to four minutes, the ringing timeout circuit 299 develops a negative control signal on the conductor 253 and this negative control signal is impressed upon the cathode of the ring trip tube 1500 and drives this cathode sufficiently negatively to cause the tube 1500 to fire.

When the tube 1500 fires, a large positive potential is immediately produced on the ring trip conductor 253 and this potential persists on the conductor 253 for the remaining period during which the link 12 is operatively associated with the calling line. As described immediately above, this large positive potential on the conductor 253 is employed to enable the conversation timing facilities of the connector **12*b* and is also impressed upon the cathode of the ringback tone gate tube 1607 through the resistor 1655 so as to bias the tube 1607 beyond cut-off and terminate transmission therethrough of the interrupted ringback tone signal impressed upon the control grid of this tube from the conductor 275. As soon as transmission of the ringback tone signal through the tube 1607 is terminated, the amplitude of the connector signal pulses released by the called line outgate circuit 224 returns to normal and the line ringing facilities in the line circuit 16 respond to this reduction in pulse height of the connector signal pulses by terminating the transmission of ringing current over the line 32**.

From the general description of the system it will be recalled that for a revertive call the link 12 remains operatively associated with the revertive calling line even though ringing is terminated in the manner described above by the ring trip circuit 221 since the finder **12*a* is held operatively associated with the revertive calling line during the ringing period when a calling condition does not exist on this line. Accordingly, the ring trip potential developed on the conductor 253 by the circuit 221 is also employed to change the potential on the conductor 12*f* so that the fiinder 12*a* is permitted to respond to the absence of a calling condition on the revertive calling line by releasing the link 12. More specifically, the conductor 253 is connected through the resistor 1728 to the conductor 12*f* and when a large positive ring trip potential is developed on the conductor 253 this potential bucks out the negative potential developed on this conductor by the revertive call test tube 1705 when this tube is fired during the revertive call test operation. Accordingly, the values of the resistors 1726, 1727 and 1728 are so chosen that with a relatively large positive potential on the conductor 253 and a relatively small positive potential at the anode of the tube 1705, the potential on the conductor 12*f* is again substantially equal to ground potential. Effectively therefore, the development of a ring trip potential on the conductor 253 removes the revertive call hold signal from the conductor 12*f* so that the finder 12*a* is permitted to release the link 12 in the manner described in detail heretofore, if no calling condition exists on the calling line with which the finder 12*a* is operatively associated. It will be noted that the negative control signal developed on the conductor 253 by the ringing timeout circuit 299 affects only the ring trip circuit 221 since the other circuits connected to the conductor 253 respond only to a potential increase on the conductor 253. Also, it will be noted that on an abandoned revertive call the link 12 is released very shortly after the ring trip potential is produced on the conductor 253 so that the other circuits controlled by this potential are rendered inoperative by release of the link 12** and hence do not operate in their conventional manner.

Assuming that the revertive call is answered at either the substation A′ or the substation B′ during the ringing timeout interval and before the negative control signal is developed on the conductor 253 by the ringing timeout circuit 299, a calling condition again exists on the revertive calling line 32 and multiplexer pulses occurring in the time position 63c are again transmitted over the conductor 50 to the finder **12*a* and the connector 12*b*. In the connector 12*b* these multiplexer pulses are impressed upon the called line in gate circuit 223 and the calling line in gate circuit 207. However, as described above in connection with the circuit 207, this circuit is blocked by the cut-through potential developed on the conductor 251 when a revertive call is in progress so that these multiplexer pulses are prevented from being transmitted through the circuit 207**.

Considering now the details of the called line in gate circuit 223, it is pointed out that this circuit is in general similar to the corresponding circuit described in detail in my copending application, Serial No. 301,215, and reference may be had to this application for a detailed description of the circuit 223. However, in accordance with the present invention, the circuit 223 is not enabled upon cut-through but instead remains blocked until ringing is initiated when a code start potential is developed on the conductor **268*a* by the circuit 268. This arrangement is necessary for a revertive call system in order to prevent the ring trip circuit 221 from operating before the revertive call is answered. This requirement will be readily understood when it is realized that whereas the circuit 223 normally responds only to multiplexer pulses appearing in the called line time position and these pulses are not developed on the conductor 50 until the call is answered at the called line, on a revertive call the time position assigned to the calling and called lines is the same and as soon as the revertive call is initiated at the calling substation A′ multiplexer pulses in the time position 63*c* are transmitted over the conductor 50 to the called line in gate circuit 223. These multiplexer pulses coincide with the connector pulses developed by the connector pulse forming circuit 217 and hence would be transmitted through the circuit 223** and a false call answering indication would be given before ringing has even been initiated on the revertive calling line.

To prevent this condition, the circuit 223 is blocked until a code start potential is produced on the conductor **268*a*. Since this potential is not developed until after a first disconnect signal is transmitted over the revertive calling line and multiplexer pulse transmission in the time position 63*c* is terminated, it will be evident that the circuit 223 may thereafter be enabled so that it can respond to the subsequent development of multiplexer pulses in the time position 63*c* on the conductor 50 which corresponds to answering of the revertive call at either the calling or called substation. In this connection it will be understood that ringing trip prior to answering on a revertive call may be prevented by other suitable arrangements. For example, anode potential for the ring trip tube 1500 may be derived from the code start conductor 268a instead of from the cut through conductor 251 so that the ring trip tube 1500** is not energized until after revertive ringing is initiated.

Considering now the operation of the called line in gate circuit 223 when the revertive call is answered at either the calling or called substation, at this point in the call a positive potential appears on the code start conductor 268a and this potential is impressed upon the voltage divider network including the resistors 1460 and 1461 which are connected between the conductor 268a and the —100 volt supply. A clamping rectifier 1462 is connected between the junction point of the resistors 1460 and 1461 and the first control grid of the peaker tube 1402 in the called line reconstructor circuit 222. Also, the anode of the rectifier 1462 is connected over the conductor 222a to the first control grid of the called line in gate tube 1404 so that a common bias potential source for the tubes 1402 and 1404 is provided. Until the code start tube 1608 fires the potential on the conductor 268a is substantially equal to ground so that a large negative potential is impressed upon the control grid of the tube 1404 which prevents this tube from responding to multiplexer pulses impressed upon the third control grid of this tube over the conductor 50, as well as connector pulses coupled to the first control grid of the tube 1404 from the conductor 239c through the coupling condenser 1463. However, when a code start potential is developed on the conductor 268a the bias conditions on the first control grid of the tube 1404 change so that this tube is permitted to respond to the connector pulses impressed thereon from the conductor 239c and the multiplexer pulses appearing in the time position 63c appearing on the conductor 50 are gated through the tube 1404 and are amplified and inverted in the tube 1405 and transmitted over the conductor 254 to the charging tube 1400 in the called line reconstructor circuit 222.

Considering now the details of the called line reconstructor circuit 222, it is pointed out that this circuit is in general similar to the corresponding circuit described in detail in my copending application, Serial No. 301,215, and reference may be had to this application for a detailed description of the circuit 222. However, as described immediately above, the bias potential on the peaker tube 1402 in the circuit 222 is controlled in accordance with the potential developed on the code start conductor 268a so that the circuit 222 is prevented from responding to connector pulses appearing on the conductor 239c until after ringing is initiated. In the absence of multiplexer pulse transmission over the conductor 254 to the charging tube 1400, the potential across the storage condenser 1464 in the called line reconstructor circuit 222 is reduced to a very low value and the potential at the cathode of the tube 1302 is likewise reduced, this potential being connected through the resistor 1445 to the conductor 252.

Since the circuit 223 is controlled in the manner described above by the code start potential developed on the conductor 268a, multiplexer pulse transmission over the conductor 254 does not occur until the call is answered on either a revertive or a non-revertive call. When multiplexer pulses are transmitted over the conductor 254 to the charging tube 1400 the potential on the condenser 1464 immediately increases and a corresponding abrupt potential rise on the conductor 252 is produced. This abrupt potential increase on the conductor 252 is impressed upon the control grid of the ring trip tube 1500 and causes this tube to fire. In this connection it will be understood that under these conditions the call is answered and a potential increase is produced on the conductor 252 before the end of the ringing timeout interval and before a negative control signal is developed on the conductor 253 by the circuit 299 in the manner described in detail above. It will also be understood that speech signals in the called-to-calling line direction are transmitted from the cathode of the tube 1302 through the low pass filters 1350, 1351, 1352, 1353 and through the condenser 1354 and resistor 1355 to the third control grid of the calling line outgate tube 1305 and are gated through this tube on connector signal pulses when the tube is unblocked on non-revertive calls.

When the ring trip tube 1500 is fired by a call answering signal on the conductor 252 a large positive ring trip potential is produced on the conductor 253 in the manner described above in connection with the operation of the circuit 221 on ringing timeout. This potential is again impressed upon the resistor 1728 in the revertive call test circuit 296 and operates to increase the potential on the conductor 12f to ground potential in the manner described in detail heretofore. However, when the revertive call is answered by either the calling or called party, a calling condition again exists on the revertive calling line 32 and multiplexer pulses appearing in the time position 63c assigned to this line are transmitted over the conductor 50 to the finder 12a. Accordingly, even though the potential on the conductor 12f is returned to ground, i.e., the revertive call hold signal is removed therefrom, the +B switching circuit 201 in the finder 12a continues to respond to the multiplexer pulses in the time position 63c and continues to hold the link 12 operatively associated with the revertive calling line 32. Accordingly, the other circuits controlled by the ring trip potential developed on the conductor 253 are then permitted to function in their normal manner.

It will be recalled from the general description of the system, that when the revertive call is answered by either the calling or called party a revertive call tone of relatively short duration is transmitted to this party to inform him that a revertive call is in progress and that he should remain off hook to permit completion of the call. This function is performed by the revertive call tone gate circuit 297. More specifically, the revertive call tone developed on the conductor 49b by the tone generator 29g in the common equipment 17 is transmitted through the condenser 1755 to the control grid of the revertive call tone gate tube 1701. The conductor 296a is connected through the resistor 1756 to the cathode of the tube 1701 and this cathode is connected through the resistor 1757 to ground. The anode of the tube 1701 is connected through the resistor 1758 to the +150 volt supply and is also connected through the condenser 1759 and the resistor 1760 to the conductor 298a. A voltage divider network including the resistors 1761 and 1762 is connected between the —100 volt supply and ground potential and the voltage at the junction point of these resistors is connected through the series resistors 1763, 1764 and 1765 to the control grid of the tube 1701. A limiting rectifier 1766 is connected between the junction point of the resistors 1764 and 1765 and ground potential and the junction point between the resistors 1763 and 1764 is connected to the ring trip conductor 253 through the coupling condenser 1767.

Considering now the operation of the circuit 297, when a revertive call is in progress the potential on the conductor 296a is at a relatively small positive value so that the cathode potential of the tube 1701 is just slightly above ground potential. However, the negative potential established at the junction point of the resistors 1761 and 1762 is sufficient to prevent the tube 1701 from responding to the tone signal impressed upon the control grid thereof from the conductor 49b. When the ring trip tube 1500 fires in response to answering of the revertive call at the called or calling substation, a large positive ring trip potential is produced on the conductor 253 and this potential is differentiated in the condenser 1767 and the associated grid resistors so that a positive pulse, preferably having a duration of from one to two seconds is produced. This positive pulse is limited by the rectifier 1766 to provide a substantially constant amplitude pulse and the pulse is employed as an enabling bias potential for the control grid of the tube 1701. Accordingly, when a ring trip potential is produced on the conductor 253, the tube 1701 is permitted to pass the revertive call tone signal for a period of from one to two seconds after which the enabling bias potential for the control grid of the tube 1701 disappears and this tube is again cut off.

The revertive call tone signal passed by the tube 1701 is transmitted through the condenser 1759 and the resistor 1760 and over the conductor 298*a* to the third control grid of the called line out gate tube 1403 in the circuit 224. As described heretofore, the circuit 224 is unblocked by the cut through potential developed on the conductor 251 and remains unblocked for the duration of the call whether the call is revertive or non-revertive. Accordingly, the revertive call tone signal described above is modulated on the connector signal pulses developed at the anode of the tube 1403 in the time position 63*c* and this tone signal is transmitted by way of the distributor 15 and the line circuit 16 to the revertive calling line 32 so that the answering party is informed that a revertive call is in progress. When the other revertive call party also comes off hook, the talking circuit between the calling and called substations is completed.

In the event that a non-revertive call is in progress, the potential on the conductor 296*a* remains at a relatively high value such that the cathode of the tube 1701 is biased highly positively. Accordingly, when a ring trip potential is produced on the conductor 253 in response to a call answering operation at the non-revertive called substation, the tube 1701 remains biased beyond cut-off by means of the above described positive potential on the cathode thereof so that transmission therethrough of the revertive call tone signal is prevented.

When the revertive call is answered in the manner described above and a ring trip potential is produced on the conductor 253 this potential is employed to enable the conversation timing facilities of the connector 12*b*. However, if the revertive call is terminated before the end of the conversation timing interval by both parties on the revertive calling line hanging up, the transmission of multiplexer pulses in the time position 63*c* to the finder 12*a* is terminated. Since the potential on the conductor 12*f* is returned to ground by means of the ring trip potential developed on the conductor 253 in response to the call answering signal, the +B switching circuit 201 in the finder 12*a* is conditioned to respond to multiplexer pulse termination by releasing the link 12, i.e., by removing busy pulses in the time position 63*c* from the conductor 52*a* and removing operating anode potential from the conductor 12*c* and finder gate pulses from the conductor 12*d*. However, until the revertive call is terminated the line 32 is guarded against intrusion on a call incoming thereto by means of the busy pulses developed in the circuit 202 in the finder 12*a*.

Considering now the operation of the conversation timing facilities in the connector 12*b*, it is pointed out that the party register advancer 282, the party digit register 265, the conversation timing warning tone circuit 284 and the conversation timing control circuit 285 are substantially identical to the corresponding circuits described in detail in my copending application, Serial No. 301,215, identified above, and reference may be had to this application for a detailed description of these circuits. However, for the purposes of the present invention, it may be stated that the ring trip potential developed on the conductor 253 when the revertive call is answered is employed to enable the party register advancer 282 to respond to conversation timing pulses produced on the conductor 57*a* by the generator 57. This potential is also transmitted through the condenser 845 and the resistor 846 to the control grid of the primer tube 820 so as to fire this tube and reset the register 265. The potential on the conductor 253 is also coupled through the network 1660, 1661 and 1662 to the control grid of the conversation timing control tube 1610 to prevent premature operation of this circuit. The party digit register 265 is stepped at the rate of one stage every 40 seconds until the ninth counting stage is extinguished at which time a short enabling pulse is transmitted through the network 1577, 1578, 1579, 1582 to the control grid of the tube 1506 and overcomes the cathode bias developed by the resistors 1575 and 1576 so that the tube transmits therethrough a warning tone signal developed by the generator 58 for a short interval. It will be understood that the tube 1506 is energized from the ring trip conductor 253 through the network 1570, 1571 and 1572. This warning tone signal is transmitted over the conductor 294 to the third control grid of the called line out gate tube 1403. Since the tube 1403 remains unblocked after cut through for the duration of the revertive call this warning tone signal is modulated on the connector signal pulses developed at the anode of the tube 1403 and is transmitted over the line 32 so that the calling and called subscribers are informed that the revertive call conversation period has almost expired, and that the call is about to be terminated. This warning tone signal is also transmitted through the condenser 1580 and the resistor 1581 and over the conductor 244 to the third control grid of the calling line outgate tube 1305. However, as described above, this tube is blocked by the revertive test operation on a revertive call so that this warning tone signal is not transmitted through the tube 1305 on a revertive call. However, on a non-revertive call the tube 1305 remains unblocked and a warning tone signal is returned to the called subscriber.

When the tenth counting tube of the part digit register 265 is extinguished a positive signal is transmitted through the resistor 1665 and the condenser 1666 to the control grid of the tube 1610 so as to fire this tube. When the tube 1610 is fired a large positive pulse is developed across the resistor 1670 thereof which is coupled through the condenser 1671 and over the conductor 12*g* to the finder 12*a* wherein this positive pulse is impressed upon the cathode of the +B switch tube 1904 in the circuit 201 and has the effect of extinguishing this tube. When the tube 1904 is extinguished, the +B switch potential is removed from the conductors 1821 and 12*c* so that the link 12 is no longer operatively associated with the line 32 even though a calling condition still exists on this line. However, since a calling condition still exists on the line 32 after the link 12 is released, a new finder-connector link is called in, becomes operatively associated with the line 32 and returns a dial tone signal to this line in the manner described above in connection with the link 12. This dial tone signal overrides the speech signals transmitted between the substations A′ and B′ on the illustrated revertive call and discourages further continuation of the call.

Considering now the operation of the connector 12*b* for a non-revertive call initiated at the substation A associated with the line 23 and intended for the substation B associated with the line 32, the operation of this connector in response to the first two digits of "3" and "2" dialed at the calling substation A is substantially the same as the corresponding operation during this portion of a revertive call. At the end of the second digit the units sequence timing circuit 216 develops a positive potential on the conductor 235 which is transmitted to the revertive call test circuit 296 to initiate the revertive call test operation. However, for a non-revertive call the time position assigned to the called line is not the same as the time position assigned to the calling line so that the circuit 296 does not assume a revertive call condition but instead, the potential developed on the conductor 296*a* remains at a relatively high positive value.

Since the enabling bias potential for the control grids of the revertive call test tube 1705 disappears before the end of the third digit the tube 1705 remains extinguished for the remainder of the call even though a subsequent trunk hunting operation may set up a condition wherein the finder gate pulses appearing on the conductor **12*d* occur coincidently with connector pulses occurring on the conductor 239*c***.

Since the potential on the conductor **296*a* remains at a relatively high positive value during a non-revertive call the control tube 1309 in the calling line in gate circuit 207 remains cut off for the duration of the non-revertive call, irrespective of any cut through potential applied to the conductor 251 and the bias potential impressed upon the first control grid of the calling line in gate tube 1303 and the first control grid of the peaker tube 1307 remains at such a value that these tubes can respond to finder gate pulses appearing on the conductor 12*d*. Also, the potential on the second control grid of the calling line outgate tube 1305 remains at such value that this tube can respond to finder gate pulses appearing on the conductor 12*d*** for the duration of the non-revertive call.

The relatively high positive potential continuously developed on the conductor **296*a* during a non-revertive call also has the effect of biasing the tone gate circuits 297 and 298 against conduction and prevents the revertive call busy tone signal and the revertive call tone signal from being impressed upon the conductor 298*a* during the non-revertive call. Also, the potential on the conductor 12*f* is not decreased since the tube 1705 is not fired for a non-revertive call so that the finder 12*a* is continuously conditioned to respond to termination of multiplexer pulse transmission in the time position assigned to the calling line by releasing the link 12 under the control of the +B switching circuit 201** in this finder.

When the third digit of "2" is dialed into the connector **12*d* the interrupted ring back tone signal corresponding to the substation B′ is selected in the party digit register 265 and at the end of the third digit the party sequence timing circuit 264 conditions the busy test circuit 218 to initiate the busy test operation. Simultaneously therewith, the trunk hunting control circuit 283 is conditioned to initiate the trunk hunting operation if the called line tests busy and is a member of a trunk group. In the busy test circuit 218 the busy pulses impressed upon the conductor 52*b* in the time positions assigned to other busy lines of the system are transmitted through the tube 1505 since a relatively high potential is present on the conductor 296*a* and the bias conditions on the first control grid of this tube are correct for transmission therethrough of the busy pulses appearing on the conductor 52*b*. Accordingly, the busy test operation is performed and if the busy pulses impressed upon the shield of the tube 1501 do not coincide with the busy test pulses impressed upon the first control grid of this tube, the tube 1501 is fired and the cut through potential is impressed upon the conductors 251, 251*a* and 289**.

In the code start circuit 268, the control tube 1612 thereof remains cut off for a non-revertive call since the potential impressed upon the conductor **12*e* by the +B switching circuit 201 in the finder 12*a* is at a relatively high negative value. Accordingly, the bias conditions for the control grid of the code start tube 1608 are such that this tube responds to the first code start pulse which occurs on the conductor 5 after cut through potential is impressed upon the anode of the tube 1608 so that this tube is fired and the ringing operation is initiated in the manner identical to that described above in connection with a revertive call. However, it will be noted that the code start potential produced on the conductor 268*a* when the code start tube 1608 fires is ineffective to cause the revertive busy tone gate circuit 298 to operate since this circuit remains biased beyond cut off by the relatively high positive potential impressed upon the conductor 296*a*** throughout the non-revertive call.

The code start potential developed on the conductor **268*a* has the effect of initiating the ringing timeout interval since the circuit 299 is operative for both revertive and non-revertive calls. If the non-revertive call is not answered at the end of the ringing timeout interval, the circuit 299 develops a negative control signal on the conductor 253 which has the effect of firing the ring trip tube 1500 in a manner identical to that described above in connection with the revertive call. As a result, a positive ring trip potential is continuously produced on the conductor 253 which has the effect of blocking the ring back tone gate tube 1607 to terminate ringing and also has the effect of initiating the conversation timing facilities in a manner identical to that described above in connection with the revertive call. In addition, the ring trip potential developed on the conductor 253 is impressed upon the revertive call tone gate circuit 297. However, this circuit is prevented from responding to the ring trip potential by virtue of the relatively high potential impressed upon the conductor 296*a*. It will also be noted that the ring trip potential is connected through the resistor 1728 to the conductor 12*f* and tends to increase the potential on this conductor above ground potential. However, as described heretofore in connection with the +B switching circuit 201, the crystal rectifier 1831 connected between the shield grid and cathode of the +B extinguishing tube 1806 in the circuit 201 prevents the potential on the conductor 12*f*** from becoming positive with respect to ground by any substantial amount.

If the non-revertive call is abandoned at the calling substation A, multiplexer pulse transmission in the time position **64*b* is terminated and the finder 12*a* responds thereto by releasing the link 12. However, it will be noted that if a calling condition continues to exist on the calling line 23, the link 12 continues to be operatively associated with the calling line 23 until the end of the conversation timing interval at which time the link 12 is released by means of the positive extinguishing pulse developed by the circuit 285 on the conductor 12*g*** which has the effect of extinguishing the +*b* switch tube in the +B switching circuit 201 in the finder **12*a* so that the link is released in spite of a calling condition on the line 23**.

Assuming that the non-revertive call is answered at the called substation B′ before the ringing timeout interval expires, the ring trip tube 1500 is fired in response to the call answering signal developed on the conductor 252 so that a ring trip potential is again developed on the conductor 253. This potential again has the effect of terminating ringing and initiating the conversation timing facilities. After the ninth counting stage in the party digit register 265 is extinguished, the conversation timing warning tone circuit 284 transmits a warning tone signal over the conductor 294 to the called line outgate circuit 224 and also transmits a warning tone signal over the conductor 244 to the calling line out gate circuit 226. Since both of these circuits are enabled after cut through for a non-revertive call, these warning tone signals are transmitted by way of the distributor 15 to the line circuits 10 and 16 and are transmitted over the lines 23 and 32 so as to inform both the calling and called subscribers that the conversation timing period is about to be terminated. When the tenth counting stage in the party digit register is extinguished the control circuit 285 develops a positive control pulse on the conductor **12*g* which is transmitted to the finder 12*a* and has the effect of releasing the link 12. When the link 12** is released the talking path between the calling and called lines is broken so that further conversation on the non-revertive call is impossible.

When the link 12 is released, the revertive call busy test tube 1705, the ringing timeout primer tube 1702 and the ringing timeout control tube 1703 are all extinguished since these tubes are controlled from the +B switch conductor 12*c*. Accordingly, the circuits 296 and 299 are reset for the next succeeding call as are the other circuits in the connector 12*b* which are controlled by the +B switch conductor 12*c*.

It will be noted that since the ringing timeout circuit 299 operates to terminate ringing after a period of from two to four minutes for both revertive and non-revertive calls, the calling subscriber for a non-revertive call is informed by termination of ringing that the call is unanswered at the called line and that he should hang up to prevent tie-up of linkage in unanswered calls.

*Distributor 15*

As pointed out in the general description of the system, this circuit is provided for the general purpose of distributing signals derived from the signal sample modulated connector pulses developed in the connectors of the system in the time positions of each pulse frame respectively assigned to the calling and called lines of the system to the line circuits terminating these lines. More specifically, this circuit is capable of distributing signals derived from the signal modulated connector pulses appearing in different time positions on the common distributor channel input conductor 51 to the respective line circuits under the directive control of the connectors 12*b*, 13*b*, 14*b*, etc., embodied in the system.

The distributor 15 may be of the type described in detail in any one of the above identified copending applications, Serial No. 134,974, Serial No. 205,641, or Serial No. 326,453. However, it will be understood that a particular type of distributor is designed to operate with the particular type of line circuit, disclosed in conjunction with each of these distributors. In the present application the line circuits are connected to the distributor 15 by only a single conductor so that distributors of the type shown in either of the above identified copending applications, Serial No. 205,641, or Serial No. 326,453, may be employed with the type of line circuit disclosed diagrammatically in Figs. 1 and 3 of the present application.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In an automatic telephone system, a plurality of multiparty lines having individually assigned thereto different time positions in repetitive time position frames, means for producing pulses in the time positions assigned to calling ones of said lines, and calling pulse responsive signalling means for selectively signalling the substations associated with a calling one of said lines in setting up a revertive call connection between different substations associated therewith.

2. In an automatic telephone system, a plurality of multiparty lines each having a plurality of substations associated therewith identifiable by ringing signals having different substation indicating characteristics, means responsive to the initiation of a call on one of said lines for developing calling line pulses representing said calling line and distinguishable from pulses representing others of said lines, and means responsive to said calling line pulses and directively controllable over any calling one of said lines for setting up a revertive call connection between different substations associated therewith.

3. In an automatic telephone system, a multiparty subscriber's line having a plurality of substations associated therewith identifiable by ringing signals having different substation indicating characteristics, means responsive to the initiation of a call on said line for developing calling line pulses representing said calling line and distinguishable from pulses representing other lines of the system, means responsive to said calling line pulses for transmitting a supervisory tone signal over said line in response to completion of a revertive call dialing signal at a calling one of said substations to inform the calling subscriber that he should hang up, and means also responsive to said calling line pulses and directively controllable over said line for selectively signalling a different substation associated with said line in accordance with said revertive call signal after the calling subscriber has hung up.

4. In an automatic telephone system, a multiparty subscriber's line having a plurality of substations associated therewith identifiable by ringing signals having different substation indicating characteristics, means responsive to the initiation of a call on said line for developing calling line pulses representing said calling line and distinguishable from pulses representing other lines of the system, revertive call means responsive to said calling line pulses and directively controllable from a calling one of said substations for transmitting a ringing current over said line having the substation indicating characteristics identifying a called one of said substations on said line, said revertive call means including means for terminating transmission of said ringing current over said line in response to answering of the call at said called substation.

5. In an automatic telephone system, a plurality of multiparty subscriber's lines having individually assigned thereto different time positions in repetitive time position frames, means for producing pulses in the time positions assigned to calling ones of said lines, means for modulating said calling line pulses in accordance with dial impulses transmitted over the calling line, means responsive to said dial impulse modulation for developing pulses in the time position assigned to the called line, and revertive call connection means responsive to coincidence of said calling and called line pulses for setting up a revertive call connection between different substations associated with the calling line.

6. In an automatic telephone system, a multiparty subscriber's line having a plurality of substations associated therewith identifiable by ringing signals having different substation indicating characteristics, means for selectively signalling said substations in setting up a revertive call connection therebetween, and conversation timing means operative in response to the answering of said revertive call at one of said substations for timing the duration of said revertive call.

7. In an automatic telephone system, a multiparty subscriber's line having a plurality of substations associated therewith identifiable by ringing signals having different substation indicating characteristics, means for selectively signalling said substations in setting up a revertive call connection therebetween, conversation timing means operative in response to the answering of said revertive call at one of said substations for timing the duration of said revertive call, and means for transmitting a signal to at least one of the substations involved in said revertive call at the end of a predetermined conversation period to discourage continuance of said revertive call.

8. In an automatic telephone system, a multiparty subscriber's line having a plurality of substations associated therewith identifiable by ringing signals having different substation indicating characteristics, means for selectively signalling said substations in setting up a revertive call connection therebetween, and means for transmitting a signal to at least one of the substations involved in said revertive call at the end of a conversation timing period of predetermined duration to discourage continuance of said revertive call.

9. In an automatic telephone system, a plurality of lines having individually assigned thereto different time positions in repetitive time position frames, at least some of said lines having a plurality of substations associated therewith each identifiable by ringing signals having different substation indicating characteristics, signal sampling means for sampling signals produced on a calling one of said lines in the time position assigned to the calling line, line selecting means responsive to impulses produced on the calling line as successive line selecting impulses and carried by the signal samples produced by said last named means for selecting a called one of said lines, revertive call signalling means operative in the event the called and calling lines occupy the same time position for selectively signalling the substations associated with the calling line in accordance with the ringing signal assigned to the called substation, and means responsive to answering of the revertive call at the called substation for terminating the signalling of said called substation.

10. In an automatic telephone system, a plurality of lines having individually assigned thereto different time positions in repetitive time position frames, at least some of said lines having a plurality of substations associated therewith each identifiable by ringing signals having different substation indicating characteristics, signal sampling means for sampling signals produced on a calling one of said lines in the time position assigned to the calling line, line selecting means responsive to impulses produced on the calling line as successive line selecting impulses and carried by the signal samples produced by said last-named means for selecting a called one of said lines, signal sample converting means controlled by said last named means for converting the signal samples derived from the calling line into corresponding signal samples occurring in the time position assigned to the called line, means for disabling said signal sample converting means when the calling line is revertively called and selectively signalling the substations associated with the calling line in accordance with the ringing signal assigned to the called substation, and means responsive to answering of the revertive call at the called substation for terminating the signalling of said called substation.

11. In an automatic telephone system, a plurality of lines having individually assigned thereto different time positions in repetitive time position frames, at least some of said lines having a plurality of substations associated therewith each identifiable by ringing signals having different substation indicating characteristics, signal sampling means for sampling signals produced on a calling one of said lines in the time position assigned to the calling line, line selecting means responsive to impulses produced on the calling line as successive line selecting impulses and carried by the signal samples produced by said last named means for selecting a called one of said lines, revertive call signalling means operative in the event the called and calling lines occupy the same time position for selectively signalling the substations associated with the calling line in accordance with the ringing signal assigned to the called substation, means responsive to answering of the revertive call at the called substation for terminating the signalling of said called substation, and means responsive to signalling termination for transmitting a revertive call identification signal over the calling line to inform the answering party that the call is revertive.

12. In an automatic telephone system, a plurality of lines having individually assigned thereto different time positions in repetitive time position frames, at least some of said lines having a plurality of substations associated therewith each identifiable by ringing signals having different substation indicating characteristics, switching apparatus directively controllable in accordance with the time positions individually assigned to said lines for providing two-way communication connections between different pairs of lines at the same time, and revertive call means included in said apparatus for providing a revertive call connection between different substations associated with one of said lines.

13. In an automatic telephone system, a plurality of lines having individually assigned thereto different time positions in repetitive time position frames, at least some of said lines having a plurality of substations associated therewith each identifiable by ringing signals having different substation indicating characteristics, electronic switching apparatus directively controllable in accordance with the time positions individually assigned to said lines for providing two-way communication connections between different pairs of lines at the same time, signal sampling means included in said apparatus for sampling signals produced on a calling one of said lines in the position assigned to said one line, line busying means responsive to said signal samples for busying said calling line to at least a portion of said apparatus, and signal sample responsive revertive call means included in said apparatus and jointly responsive to said signal sampling means and said line busying means for setting up a revertive call connection between different substations associated with said calling line.

14. In an automatic telephone system, a plurality of lines having individually assigned thereto different time positions in repetitive time position frames, each of said lines having a different directory number assigned thereto, at least some of said lines having a plurality of substations associated therewith each identifiable by ringing signals having different substation indicating characteristics, electronic switching apparatus directively controllable in accordance with the time positions individually assigned to said lines for providing two-way communication connections between different pairs of lines at the same time, signal sampling means included in said apparatus for sampling signals produced on a calling one of said lines in the time position assigned to said one line, signal sample responsive revertive call signalling means for selectively signalling the substations associated with said calling line in response to the transmission of dial impulses over said calling line corresponding to the directory number assigned to said calling line, and means included in said apparatus and responsive to answering of the revertive call at the called substation for terminating signalling of the called substation.

15. In an automatic telephone system, a plurality of lines having individually assigned thereto different time positions in repetitive time position frames, at least some of said lines having a plurality of substations associated therewith identifiable by different ringing signals, signal sampling means for sampling signals produced on a calling one of said lines in the time position assigned to said one line, line selecting means responsive to impulses produced on said calling line as successive line selecting impulses and carried by the signal samples produced by said last named means for selecting the time position assigned to a called one of said lines, revertive call signalling means jointly responsive to selection of the calling line time position by said last named means and the transmission of a disconnect signal over said calling line for selectively signalling the substations associated with said calling line, and means responsive to the transmission of a seizure signal over said calling line for terminating signalling of said substation.

16. In an automatic telephone system, a plurality of lines having individually assigned thereto different time positions in repetitive time position frames, at least some of said lines having a plurality of substations associated therewith identifiable by different ringing signals, a plurality of impulse responsive links, means for developing pulses in the time positions individually assigned to said lines as said lines are taken into use, means responsive to the pulses developed by said last named means in the time position assigned to a calling one of said lines for operatively associating one of said links with said one calling line, means including said one link for setting up a two way communication connection between said one calling line and any different called one of said lines, means including said one link for setting up a revertive call connection between different substations associated with said one calling line, and means for holding said one link operatively associated with said one calling line while said revertive call connection is being set up.

17. In an automatic telephone system, a plurality of lines having individually assigned thereto different time positions in repetitive time position frames, at least some of said lines having a plurality of substations associated therewith identifiable by different ringing signals, a plurality of impulse responsive links, means for developing pulses in the time positions individually assigned to said lines as said lines are taken into use, means responsive to the pulses developed by said last named means in the time position assigned to a calling one of said lines for operatively associating one of said links with said one calling line, means including said one link for setting up a two way communication connection between said one calling line and any different called one of said lines, means including said one link for setting up a revertive call connection between different substations associated with said one calling line, and means for holding said one link operatively associated with said one calling line while said revertive call connection is being set up, and means for preventing other ones of said links from seizing said one calling line while said revertive call connection is being set up.

18. In an automatic telephone system, a plurality of lines having individually assigned thereto different time positions in repetitive time position frames, at least some of said lines having a plurality of substations associated therewith identifiable by different ringing signals, a plurality of impulse responsive links, means for developing pulses in the time positions individually assigned to said lines as said lines are taken into use, means responsive to the pulses developed by said last named means in the time position assigned to a calling one of said lines for operatively associating one of said links with said one calling line, means including said one link for setting up a revertive call connection between different substations associated with said one calling line, and means for holding said one link operatively associated with said one calling line while said revertive call connection is being set up.

19. In an automatic telephone system, a plurality of lines having individually assigned thereto different time positions in repetitive time position frames, at least some of said lines having a plurality of substations associated therewith identifiable by different ringing signals, a plurality of impulse responsive links, means for developing pulses in the time positions individually assigned to said lines as said lines are taken into use, means responsive to the pulses developed by said last named means in the time position assigned to a calling one of said lines for operatively associating one of said links with said one calling line, a busy pulse channel interconnecting said links, means for impressing busy pulses on said busy pulse channel in the time position assigned to said one calling line in response to operative association of said one link therewith, means included on said other links and responsive to busy pulses impressed on said busy pulse channel for preventing operative association of said other links with said one calling line, means including said one link for setting up a revertive call connection between different substations associated with said one calling line, and means included in said one link for preventing removal of busy pulses from said busy pulse channel in the time position assigned to said one calling line while said revertive call connection is being set up.

20. In an automatic telephone system, a plurality of lines having individually assigned thereto different time positions in repetitive time position frames, at least some of said lines having a plurality of substations associated therewith identifiable by different ringing signals, an impulse responsive link, a pulse path common to said lines and extending to said link, multiplexer means responsive to the initiation of a call on one of said lines for transmitting multiplexer pulses over said path in the time position assigned to the calling line, said multiplexer means also being operative to modulate said multiplexer pulses in accordance with disconnect signals transmitted to said multiplexer means over the calling line, means included in said link and responsive to said multiplexer pulses for operatively associating said link with the calling line, means including said link for setting up a revertive call connection between different substations associated with the calling line, means for preventing said link from releasing in response to a first disconnect signal transmitted over the calling line while said revertive call connection is being set up, and means operative after said reverted call connection has been set up for releasing said link in response to a second disconnect signal transmitted over the calling line.

21. In an automatic telephone system, a plurality of lines having individually assigned thereto different time positions in repetitive time position frames, at least some of said lines having a plurality of substations associated therewith identifiable by different ringing signals, a line finder, multiplexer means responsive to the initiation of a call on one of said lines for transmitting multiplexer pulses to said finder in the time position assigned to the calling line, said multiplexer means also being operative to modulate said multiplexer pulses in accordance with disconnect signals transmitted to said multiplexer means over the calling line, a control circuit in said finder responsive to multiplexer pulses transmitted to said finder for operatively associating said finder with the calling line, means for preventing said control circuit from responding to modulation of said multiplexer pulses with a first disconnect signal transmitted over the calling line incident to the setting up of a revertive call connection between different substations associated with the same calling line, and means for conditioning said control circuit to respond to a second disconnect signal transmitted over the calling line and indicating termination of the revertive call by releasing said calling line.

22. In an automatic telephone system, a plurality of lines having individually assigned thereto different time positions in repetitive time position frames, at least some of said lines having a plurality of substations associated therewith identifiable by different ringing signals, means for developing pulses in the time position assigned to a calling one of said lines, means for modulating said pulses in accordance with switch directing impulses transmitted over said calling line, means responsive to switch directing impulse modulation of said pulses for busying said calling line to the other lines of the system during a period when a calling condition does not exist on said calling line, and means for transmitting a party line ringing signal over said calling line during said period.

23. In an automatic telephone system, a plurality of lines having individually assigned thereto different time positions in repetitive time position frames, at least some of said lines having a plurality of substations associated therewith identifiable by different ringing signals, means for developing pulses in the time position assigned to a calling one of said lines, means for modulating said pulses in accordance with switch directing impulses transmitted over said calling line, means responsive to switch directing impulse modulation of said pulses for busying said calling line to the other lines of the system during a period when a calling condition does not exist on said calling line, means responsive to a first disconnect signal transmitted over said calling line for selecting a party line ringing signal in accordance with the switch directing impulse modulation of said pulses, and means for transmitting said selected party line ringing signal over said calling line during said period.

24. In an automatic telephone system, a plurality of lines having individually assigned thereto different time positions in repetitive time position frames, at least some of said lines having a plurality of substations associated therewith identifiable by different ringing signals, means for developing pulses in the time position assigned to a calling one of said lines, means for modulating said pulses in accordance with switch directing impulses transmitted over said calling line, means responsive to switch directing impulse modulation of said pulses for developing busy pulses in the time position assigned to said calling line during a period when a calling condition does not exist on said calling line, means responsive to said busy pulses for preventing other lines of the system from being connected to said calling line, means for transmitting a party line ringing signal over said calling line during said period, and means for terminating transmission of said ringing signal over said calling line in response to resumption of a calling condition on said line.

25. In an automatic telephone system, a plurality of lines having individually assigned thereto different time positions in repetitive time position frames, at least some of said lines having a plurality of substations associated therewith identifiable by different ringing signals, means for developing pulses in the time position assigned to a calling one of said lines, means for modulating said pulses in accordance with switch directing impulses transmitted over said calling line, means responsive to switch directing impulse modulation of said pulses for developing busy pulses in the time position assigned to said calling line during a period when a calling condition does not exist on said calling line, means responsive to said busy pulses for preventing other lines of the system from being connected to said calling line, means for transmitting a party line ringing signal over said calling line during said period, means for terminating transmission of said ringing signal over said calling line in response to resumption of a calling condition on said line, and means for transmitting a supervisory tone signal over said calling line after said calling condition is resumed.

26. In an automatic telephone system, a plurality of lines at least some of which have a plurality of substations associated therewith, a plurality of trunks arranged in groups, switching apparatus directively controllable over any calling one of said lines for setting up a two-way communication connection between the calling line and any called one of said lines, revertive call test means included in said apparatus for determining the nature of the call initiated at the calling line, means included in said apparatus and controlled in part by said revertive call test means for setting up a revertive call connection between different substations associated with the same line, trunk hunting means included in said apparatus for hunting for an idle trunk within a called one of said trunk groups, and means included in said apparatus for preventing said revertive call test means from operating during a trunk hunting operation performed by said trunk hunting means.

27. In an automatic telephone system, a plurality of lines at least some of which are multiparty lines, a plurality of trunks arranged in groups, means responsive to dialing at a calling one of said lines digits identifying a called one of said lines for setting up a two-way communication connection between said calling and called lines, means responsive to dialing at a calling one of said lines digits identifying one of said trunks for hunting for an idle trunk within the called trunk groups, revertive call means responsive to dialing at a calling one of said lines digits identifying the same calling line for setting up a revertive call connection between different parties on the same line, and means for preventing said trunk hunting means and said revertive call means from simultaneously responding to the same digits dialed at a calling one of said lines.

28. In an automatic telephone system, a plurality of lines at least some of which have a plurality of substations associated therewith each identifiable by different ringing digits, a plurality of trunks arranged in groups, means responsive to dialing at a calling one of said lines digits identifying a called one of said lines for setting up a two-way communication connection between said calling and called lines, means responsive to dialing at a calling one of said lines digits identifying one of said trunks for hunting for an idle trunk within the called trunk group, revertive call means responsive to dialing at a calling one of said lines digits identifying the same calling line for setting up a revertive call connection between different parties on the same line, means for disabling said revertive call means before dialing of the ringing digit is completed in the event the call is non-revertive, and means for preventing said trunk hunting means from operating until after dialing of the ringing digit has been completed, thereby to prevent said revertive call means from operating during a trunk hunting operation.

29. In an automatic telephone system, a plurality of lines at least some of which have a plurality of substations associated therewith, a plurality of trunks arranged in groups, means responsive to dialing at a calling one of said lines digits identifying a called one of said lines for setting up a two-way communication connection between said calling and called lines, means responsive to dialing at a calling one of said lines digits identifying one of said trunks for hunting for an idle trunk within the called trunk group, revertive call means responsive to dialing at a calling one of said lines digits identifying the same calling line for setting up a revertive call connection between different parties on the same line, means for disabling said revertive call means a predetermined time interval after dialing of the digits identifying the called line in the event the call is non-revertive, and means for preventing said trunk hunting means from performing a trunk hunting operation until said time interval has expired.

30. In an automatic telephone system, a plurality of lines having individually assigned thereto different time positions in repetitive time position frames, at least some of said lines having a plurality of substations associated therewith, means directively controllable over any calling one of said lines for selecting the time position assigned to a called one of said lines, line busying means for developing busy pulses in the time positions assigned to busy ones of said lines, busy test means controlled by said line selecting means and said line busying means for testing the time position assigned to the selected line to determine the idle or busy condition thereof, revertive call test means controlled in part by said line selecting means for developing a revertive call signal when the time position selected by said line selecting means coincides with the time position assigned to the calling line, and means controlled by said revertive call signal and operative independently of the setting of said busy test means for setting up a revertive call connection between different substations associated with the same calling line.

31. In an automatic telephone system, a plurality of lines having individually assigned thereto different time positions in repetitive time position frames, at least some of said lines having a plurality of substations associated therewith, means directively controllable over any calling one of said lines for selecting the time position assigned to a called one of said lines, line busying means for developing busy pulses in the time positions assigned to calling and called ones of said lines, busy test means jointly controlled by said line selecting means and said line busying means for developing a control signal unless said busy pulses occur in the time position assigned to the selected line, means controlled by said control signal for setting up a non-revertive connection between the calling and called lines, revertive call test means for developing a revertive call signal when the time position assigned to the selected line coincides with the time position assigned to the calling line, means controlled by said revertive call signal for withholding busy pulses from said busy test means in the time position assigned to the calling line, and means responsive to the control signal developed by said busy test means when busy pulses are withheld therefrom for setting up a revertive call connection between different substations associated with the same calling line.

32. In an automatic telephone system, a plurality of lines having individually assigned thereto different time positions in repetitive time position frames, at least some of said lines having a plurality of substations associated therewith, means directively controllable over any calling one of said lines for selecting the time position assigned to a called one of said lines, line busying means for developing busy pulses in the time positions assigned to calling and called ones of said lines, busy test means jointly controlled by said line selecting means and said line busying means for developing a control signal unless said busy pulses occur in the time position assigned to the selected line, means controlled by said control signal for setting up a non-revertive connection between the calling and called lines, revertive call test means for developing a revertive call signal when the time position assigned to the selected line coincides with the time position assigned to the calling line, means controlled by said revertive call signal for withholding busy pulses from said busy test means in the time position assigned to the calling line, means responsive to the control potential developed by said busy test means when busy pulses are withheld therefrom for transmitting a revertive call busy tone over the calling line to remind the calling subscriber that he should hang up, and means responsive to a first disconnect signal transmitted over said calling line when the calling subscriber hangs up for transmitting a revertive ringing signal over the calling line.

33. In an automatic telephone system, a plurality of lines having individually assigned thereto different time positions in repetitive time position frames, at least some of said lines having a plurality of substations associated therewith each identifiable by different party line ringing signals which are repeated during successive ringing cycles, means for developing code start pulses during successive ringing cycles, means directively controllable over any calling one of said lines for selecting the time position assigned to a called one of said lines, line busying means for developing busy pulses in the time positions assigned to calling and called ones of said lines, busy test means jointly controlled by said line selecting means and said line busying means for developing a cut through potential unless said busy pulses occur in the time position assigned to the selected line, code start means controlled in part by said code start pulses and said cut through potential for developing a code start potential in response to the first code start pulse which occurs after development of said cut through potential when a non-revertive call is initiated by the calling subscriber, means controlled by said code start potential for transmitting a ringing signal over the called line, revertive call test means for developing a revertive call signal when the time position assigned to the selected line coincides with the time position assigned to the calling line, means controlled by said revertive call signal for withholding busy pulses from said busy test means in the time position assigned to the calling line, means controlled by said revertive call signal for preventing said code start means from responding to said code start pulses, means for developing a ring start signal in response to a first disconnect signal transmitted over the calling line when the calling subscriber hangs up, means controlled by said ring start signal for reconditioning said code start means to respond to said code start pulses, and means controlled in part by the code start potential developed by said code start means after reconditioning thereof for transmitting a revertive ringing signal over the calling line.

34. In an automatic telephone system, a plurality of lines having individually assigned thereto different time positions in repetitive time position frames, at least some of said lines having a plurality of substations associated therewith each identifiable by different party line ringing signals which are repeated during successive ringing cycles, means for developing code start pulses during successive ringing cycles, means directively controllable over any calling one of said lines for selecting the time position assigned to a called one of said lines, revertive call test means controlled in part by said line selecting means for developing a revertive call signal when the time position assigned to the selected line coincides with the time position assigned to the calling line, means for developing a ring start signal in response to a first disconnect signal transmitted over the calling line when the calling subscriber hangs up, and means jointly controlled by said revertive call signal, said code start pulses and said ring start signal for transmitting a revertive ringing signal over the calling line after the calling subscriber has hung up.

35. In an automatic telephone system, a plurality of lines having individually assigned thereto different time positions in repetitive time position frames, at least some of said lines having a plurality of substations associated therewith each identifiable by different party line ringing signals which are repeated during successive ringing cycles, means for developing code start pulses during successive ringing cycles, means directively controllable over any calling one of said lines for selecting the time position assigned to a called one of said lines, revertive call test means controlled in part by said line selecting means for developing a revertive call signal when the time position assigned to the selected line coincides with the time position assigned to the calling line, means controlled in part by said line selecting means and said code start pulses for initiating transmission of a ringing signal over the called line at the start of a ringing cycle when dialing of a non-revertive call has been completed by the calling subscriber, means for developing a revertive ring start signal in response to a first disconnect signal transmitted over the calling line when the calling subscriber hangs up to permit completion of a revertive call, and means controlled by said revertive call signal and said ring start signal for delaying the operation of said line ringing means on a revertive call until after the calling subscriber has hung up.

36. In an automatic telephone system, a plurality of lines having individually assigned thereto different time positions in repetitive time position frames, at least some of said lines having a plurality of substations associated therewith, means directively controllable over any calling one of said lines for selecting the time position assigned to a called one of said lines, signal transmission gating means controlled in accordance with the time positions assigned to said calling and called lines for providing a communication connection therebetween, and means for blocking said signal transmission gating means incident to the setting up of a revertive call between different substations associated with the same calling line to prevent signal transmission therethrough.

37. In an automatic telephone system, a plurality of lines having individually assigned thereto different time positions in repetitive time position frames, at least some of said lines having a plurality of substations associated therewith, means directively controllable over any calling one of said lines for selecting the time position assigned to a called one of said lines, signal transmission gating means controlled in accordance with the time positions assigned to said calling and called lines for providing a communication connection therebetween, revertive call test means controlled in part by said line selecting means for developing a revertive call signal when the time position assigned to the selected line coincides with the time position assigned to the calling line, and means controlled by said revertive call signal for blocking said signal transmission gating means to prevent signal transmission therethrough during a revertive call.

38. In an automatic telephone system, a plurality of lines having individually assigned thereto different time positions in repetitive time position frames, at least some of said lines having a plurality of substations associated therewith, means directively controllable over any calling one of said lines for selecting the time position assigned to a called one of said lines, a pair of tandem related signal transmission gate circuits controlled in accordance with the time positions assigned to said calling and called lines, means including said gate circuits for setting up a communication connection between said calling and called lines, revertive call test means for developing a revertive call signal when the time position assigned to the selected line coincides with the time position assigned to the calling line, means controlled by said revertive call signal for blocking one of said gate circuits to prevent signal transmission therethrough during a revertive call, and means controlled in part by said revertive call signal for transmitting a revertive call busy tone signal through the other of said gate circuits to inform the calling subscriber that he should hang up.

39. In an automatic telephone system, a plurality of lines having individually assigned thereto different time positions in repetitive time position frames, at least some of said lines having a plurality of substations associated therewith, means directively controllable over any calling one of said lines for selecting the time position assigned to a called one of said lines, a first pair of signal transmission gate circuits controlled in accordance with the time position assigned to the calling line, a second pair of signal transmission gate circuits controlled in accordance with the time position assigned to the called line, means including tandem related pairs of said gate circuits for setting up a two-way communication connection between said calling and called lines, and means responsive to dialing of a revertive call number by the calling subscriber for blocking at least one gate circuit in each tandem related pair to prevent signal transmission therethrough during a revertive call.

40. In an automatic telephone system, a plurality of lines having individually assigned thereto different time positions in repetitive time position frames, at least some of said lines having a plurality of substations associated therewith, means directively controllable over any calling one of said lines for selecting the time position assigned to a called one of said lines, first and second signal transmission gate circuits controlled in accordance with the time position assigned to the calling line, third and fourth signal transmission gate circuits controlled in accordance with the time position assigned to the called line, means including said first and third gate circuits for setting up a communication connection in the calling-to-called line direction, means including said second and fourth gate circuits for setting up a communication connection in the called-to-calling line direction, means normally blocking said second and fourth gate circuits to prevent signal transmission therethrough, revertive call test means for developing a revertive call signal when the time position assigned to the selected line coincides with the time position assigned to the calling line, means for developing a dial tone signal in response to initiation of the call at the calling line, means for transmitting said dial tone signal through said third gate circuit to inform the calling subscriber that dialing may be initiated, means controlled by said revertive call signal for blocking said third gate circuit to prevent signal transmission therethrough, means responsive to completion of dialing by the calling subscriber for blocking said first gate circuit to prevent signal transmission therethrough, means responsive to completion of dialing by the calling subscriber for enabling said second gate circuit to permit signal transmission therethrough, means for transmitting a revertive call busy tone signal through said second gate circuit to inform the calling subscriber that he should hang up to permit completion of the call, means responsive to a first disconnect signal transmitted over the calling line when the calling subscriber hangs up for transmitting a ringing signal through said second gate circuit identifying the called substation, means responsive to said first disconnect signal for enabling said fourth gate circuit to permit signal transmission therethrough, means responsive to transmission of a call answering signal through said fourth gate circuit when the call is answered for terminating transmission of said ringing signal, and means responsive to said call answering signal for transmitting a revertive call tone signal through said second gate circuit to inform the answering party that the call is revertive.

41. In an automatic telephone system, a plurality of lines having individually assigned thereto different time positions in repetitive time position frames, time position responsive means directively controllable over any calling one of said lines for transmitting a ringing signal over any called one of said lines, and means for terminating transmission of said ringing signal after a ringing timeout interval of predetermined duration.

42. In an automatic telephone system, a plurality of lines, electronic means directively controllable over any calling one of said lines for transmitting a ringing signal over any called one of said lines, electronic means for concurrently transmitting a ringback tone signal over the calling line to inform the calling subscriber that the called line is being rung, electronic means for terminating transmission of said ringing signal after a ringing timeout interval, and electronic means for concurrently terminating transmission of said ringback tone signal to the calling subscriber to inform him of the unavailability of the called subscriber.

43. In an automatic telephone system, a plurality of lines having individually assigned thereto different time positions in repetitive time position frames, at least some of said lines having a plurality of substations associated therewith each identifiable by different party line ringing signals, a plurality of impulse responsive links, means for developing pulses in the time positions individually assigned to said lines as said lines are taken into use, means responsive to the pulses developed by said last named means in the time position assigned to a calling one of said lines for operatively associating one of said links with said one calling line, means included in said link and responsive to initiation of a revertive call on said calling line for transmitting a ringing current over said calling line after the calling party has hung up, means for holding said link operatively associated with said calling line after the calling party has hung up, means for terminating transmission of said ringing current after a ringing timeout interval of predetermined duration if the call is unanswered, and means for releasing said link from operative association with said calling line at the end of said ringing timeout interval.

44. In an automatic telephone system, a plurality of lines having individually assigned thereto different time positions in repetitive time position frames, at least some of said lines having a plurality of substations associated therewith each identifiable by different party line ringing signals, a plurality of impulse responsive links, means for developing pulses in the time positions individually assigned to said lines as said lines are taken into use, means responsive to the pulses developed by said last named means in the time position assigned to a calling one of said lines for operatively associating one of said links with said one calling line, a busy pulse channel interconnecting said links, means for impressing busy pulses on said busy pulse channel in the time position assigned to said one calling line in response to operative association of said one link therewith, means responsive to busy pulses impressed on said busy pulse channel for preventing operative association of said other links with said one calling line, means included in said one link and responsive to initiation of a revertive call on said one calling line for transmitting a ringing current over said one calling line after the calling party has hung up, means for maintaining transmission of said busy pulses to said busy pulse channel in the time position assigned to said one calling line after the calling party has hung up, means included in said one link for terminating transmission of said ringing current after a ringing timeout interval of predetermined duration if the call is unanswered, and means for discontinuing transmission of said busy pulses to said busy pulse channel in the time position assigned to said one calling line at the end of said ringing timeout interval.

45. In an automatic telephone system of the type including a plurality of lines having individually assigned thereto different time positions in repetitive time position frames, at least some of said lines having a plurality of substations associated therewith each identifiable by a different party line ringing signal, the method of determining when a revertive call is initiated on a calling one of said lines which comprises the steps of, determining the time position assigned to the calling line, selecting the time position assigned to the called line in accordance with dial impulses transmitted over the calling line, and comparing the time positions assigned to the calling and called lines to determine by coincidence thereof when a revertive call is initiated on the calling line.

46. In an automatic telephone system of the type including a plurality of lines having individually assigned thereto different time positions in repetitive time position frames, at least some of said lines having a plurality of substations associated therewith each identifiable by a different party line ringing signal, the method of determining when a revertive call is initiated on a calling one of said lines which comprises the steps of, registering the time position assigned to the calling line, registering the time position assigned to the called line in accordance with dial impulses transmitted over the calling line, and comparing the registered time positions assigned to the calling and called lines to determine by coincidence thereof when a revertive call is initiated on the calling line.

References Cited in the file of this patent

UNITED STATES PATENTS

| | | |
|---|---|---|
| 2,490,833 | Ransom | Dec. 13, 1949 |
| 2,619,548 | Lesti | Nov. 25, 1952 |
| 2,633,497 | Denny | Mar. 31, 1953 |
| 2,707,725 | Elliott et al. | May 3, 1955 |
| 2,809,235 | Trousdale | Oct. 8, 1957 |